(12) United States Patent
Miller et al.

(10) Patent No.: US 8,896,969 B1
(45) Date of Patent: Nov. 25, 2014

(54) TWO-MOTOR CO-LOCATED GIMBAL-BASED DUAL STAGE ACTUATION DISK DRIVE SUSPENSIONS WITH MOTOR STIFFENERS

(71) Applicant: Hutchinson Technology Incorporated, Hutchinson, MN (US)

(72) Inventors: Mark A. Miller, Darwin, MN (US); Yasushi Sakamoto, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 14/056,481

(22) Filed: Oct. 17, 2013

Related U.S. Application Data

(60) Provisional application No. 61/826,865, filed on May 23, 2013.

(51) Int. Cl.
*G11B 5/596* (2006.01)
*G11B 5/48* (2006.01)

(52) U.S. Cl.
CPC .................... *G11B 5/4833* (2013.01)
USPC ....................................... 360/294.4

(58) Field of Classification Search
CPC ........ G11B 5/482; G11B 5/4873; G11B 5/58; G11B 5/596
USPC .................... 360/291.9, 292, 294.4
See application file for complete search history.

(56) References Cited

U.S. PATENT DOCUMENTS

| | | | |
|---|---|---|---|
| 3,320,556 A | 5/1967 | Schneider | |
| 4,418,239 A | 11/1983 | Larson et al. | |
| 4,422,906 A | 12/1983 | Kobayashi | |
| 4,659,438 A | 4/1987 | Kuhn et al. | |
| 5,140,288 A | 8/1992 | Grunwell | |
| 5,320,272 A | 6/1994 | Melton et al. | |
| 5,321,568 A | 6/1994 | Hatam-Tabrizi | |
| 5,333,085 A | 7/1994 | Prentice et al. | |
| 5,427,848 A | 6/1995 | Baer et al. | |

(Continued)

FOREIGN PATENT DOCUMENTS

| | | |
|---|---|---|
| EP | 0591954 B1 | 4/1994 |
| EP | 0834867 B1 | 5/2007 |

(Continued)

OTHER PUBLICATIONS

International Search Report and Written Opinion issued in PCT/US2013/031484, mailed May 30, 2013, 13 pages.

(Continued)

*Primary Examiner* — Craig A. Renner
(74) *Attorney, Agent, or Firm* — Faegre Baker Daniels LLP

(57) ABSTRACT

Various embodiments concern a dual stage actuation flexure. The dual stage actuation flexure comprises a flexure having a gimbal. The gimbal comprising a pair of spring arms, a tongue between the spring arms, and a pair of linkages respectively connecting the pair of spring arms to the tongue. The dual stage actuation flexure further comprises a pair of motors mounted on the gimbal and a pair of stiffeners respectively mounted on the motors. The dual stage actuation flexure further comprises a slider mounting. Electrical activation of the motors bends the pair of linkages to move the slider mounting about a tracking axis while the stiffeners limit the degree of bending of the motors during the electrical activation.

28 Claims, 58 Drawing Sheets

(56) References Cited

U.S. PATENT DOCUMENTS

| | | | |
|---|---|---|---|
| 5,459,921 A | 10/1995 | Hudson et al. |
| 5,485,053 A | 1/1996 | Baz |
| 5,491,597 A | 2/1996 | Bennin et al. |
| 5,521,778 A | 5/1996 | Boutaghou et al. |
| 5,598,307 A | 1/1997 | Bennin |
| 5,608,590 A | 3/1997 | Ziegler et al. |
| 5,608,591 A | 3/1997 | Klaassen |
| 5,631,786 A | 5/1997 | Erpelding |
| 5,636,089 A | 6/1997 | Jurgenson et al. |
| 5,657,186 A | 8/1997 | Kudo et al. |
| 5,657,188 A | 8/1997 | Jurgenson et al. |
| 5,666,241 A | 9/1997 | Summers |
| 5,666,717 A | 9/1997 | Matsumoto et al. |
| 5,694,270 A | 12/1997 | Sone et al. |
| 5,717,547 A | 2/1998 | Young |
| 5,734,526 A | 3/1998 | Symons |
| 5,737,152 A | 4/1998 | Balakrishnan |
| 5,754,368 A | 5/1998 | Shiraishi et al. |
| 5,764,444 A | 6/1998 | Imamura et al. |
| 5,773,889 A | 6/1998 | Love et al. |
| 5,790,347 A | 8/1998 | Girard |
| 5,796,552 A | 8/1998 | Akin, Jr. et al. |
| 5,805,382 A | 9/1998 | Lee et al. |
| 5,812,344 A | 9/1998 | Balakrishnan |
| 5,818,662 A | 10/1998 | Shum |
| 5,862,010 A | 1/1999 | Simmons et al. |
| 5,892,637 A | 4/1999 | Brooks, Jr. et al. |
| 5,898,544 A | 4/1999 | Krinke et al. |
| 5,914,834 A | 6/1999 | Gustafson |
| 5,921,131 A | 7/1999 | Stange |
| 5,924,187 A | 7/1999 | Matz |
| 5,973,882 A | 10/1999 | Tangren |
| 5,973,884 A | 10/1999 | Hagen |
| 5,986,853 A | 11/1999 | Simmons et al. |
| 5,995,328 A | 11/1999 | Balakrishnan |
| 6,011,671 A | 1/2000 | Masse et al. |
| 6,038,102 A | 3/2000 | Balakrishnan et al. |
| 6,046,887 A | 4/2000 | Uozumi et al. |
| 6,055,132 A | 4/2000 | Arya et al. |
| 6,075,676 A | 6/2000 | Hiraoka et al. |
| 6,078,470 A | 6/2000 | Danielson et al. |
| 6,108,175 A | 8/2000 | Hawwa et al. |
| 6,118,637 A | 9/2000 | Wright et al. |
| 6,144,531 A | 11/2000 | Sawai |
| 6,146,813 A | 11/2000 | Girard et al. |
| 6,156,982 A | 12/2000 | Dawson |
| 6,157,522 A | 12/2000 | Murphy et al. |
| 6,172,853 B1 | 1/2001 | Davis et al. |
| 6,195,227 B1 | 2/2001 | Fan et al. |
| 6,215,622 B1 | 4/2001 | Ruiz et al. |
| 6,229,673 B1 | 5/2001 | Shinohara et al. |
| 6,233,124 B1 | 5/2001 | Budde et al. |
| 6,239,953 B1 | 5/2001 | Mei |
| 6,246,546 B1 | 6/2001 | Tangren |
| 6,246,552 B1 | 6/2001 | Soeno et al. |
| 6,249,404 B1 | 6/2001 | Doundakov et al. |
| 6,262,868 B1 | 7/2001 | Arya et al. |
| 6,275,358 B1 | 8/2001 | Balakrishnan et al. |
| 6,278,587 B1 | 8/2001 | Mei |
| 6,282,062 B1 | 8/2001 | Shiraishi |
| 6,295,185 B1 | 9/2001 | Stefansky |
| 6,297,936 B1 | 10/2001 | Kant et al. |
| 6,300,846 B1 | 10/2001 | Brunker |
| 6,307,715 B1 | 10/2001 | Berding et al. |
| 6,320,730 B1 | 11/2001 | Stefansky et al. |
| 6,330,132 B1 | 12/2001 | Honda |
| 6,349,017 B1 | 2/2002 | Schott |
| 6,376,964 B1 | 4/2002 | Young et al. |
| 6,396,667 B1 | 5/2002 | Zhang et al. |
| 6,399,899 B1 | 6/2002 | Ohkawa et al. |
| 6,400,532 B1 | 6/2002 | Mei |
| 6,404,594 B1 | 6/2002 | Maruyama et al. |
| 6,424,500 B1 | 7/2002 | Coon et al. |
| 6,445,546 B1 | 9/2002 | Coon |
| 6,459,549 B1 | 10/2002 | Tsuchiya et al. |
| 6,490,228 B2 | 12/2002 | Killam |
| 6,493,190 B1 | 12/2002 | Coon |
| 6,493,192 B2 | 12/2002 | Crane et al. |
| 6,539,609 B2 | 4/2003 | Palmer et al. |
| 6,549,376 B1 | 4/2003 | Scura et al. |
| 6,549,736 B2 | 4/2003 | Miyabe et al. |
| 6,563,676 B1 | 5/2003 | Chew et al. |
| 6,596,184 B1 | 7/2003 | Shum et al. |
| 6,597,541 B2 | 7/2003 | Nishida et al. |
| 6,600,631 B1 | 7/2003 | Berding et al. |
| 6,621,653 B1 | 9/2003 | Schirle |
| 6,621,658 B1 | 9/2003 | Nashif |
| 6,636,388 B2 | 10/2003 | Stefansky |
| 6,639,761 B1 | 10/2003 | Boutaghou et al. |
| 6,647,621 B1 | 11/2003 | Roen et al. |
| 6,661,617 B1 | 12/2003 | Wissman et al. |
| 6,661,618 B2 | 12/2003 | Fujiwara et al. |
| 6,704,157 B2 | 3/2004 | Himes et al. |
| 6,704,158 B2 | 3/2004 | Hawwa et al. |
| 6,714,384 B2 | 3/2004 | Himes et al. |
| 6,714,385 B1 | 3/2004 | Even et al. |
| 6,728,057 B2 | 4/2004 | Putnam |
| 6,728,077 B1 | 4/2004 | Murphy |
| 6,731,472 B2 | 5/2004 | Okamoto et al. |
| 6,735,052 B2 | 5/2004 | Dunn et al. |
| 6,735,055 B1 | 5/2004 | Crane et al. |
| 6,737,931 B2 | 5/2004 | Amparan et al. |
| 6,738,225 B1 | 5/2004 | Summers et al. |
| 6,741,424 B1 | 5/2004 | Danielson et al. |
| 6,751,062 B2 | 6/2004 | Kasajima et al. |
| 6,760,182 B2 | 7/2004 | Bement et al. |
| 6,760,194 B2 | 7/2004 | Shiraishi et al. |
| 6,760,196 B1 | 7/2004 | Niu et al. |
| 6,762,913 B1 | 7/2004 | Even et al. |
| 6,765,761 B2 | 7/2004 | Arya |
| 6,771,466 B2 | 8/2004 | Kasajima et al. |
| 6,771,467 B2 | 8/2004 | Kasajima et al. |
| 6,791,802 B2 | 9/2004 | Watanabe et al. |
| 6,798,597 B1 | 9/2004 | Aram et al. |
| 6,801,402 B1 | 10/2004 | Subrahmanyam et al. |
| 6,831,539 B1 | 12/2004 | Hipwell, Jr. et al. |
| 6,833,978 B2 | 12/2004 | Shum et al. |
| 6,839,204 B2 | 1/2005 | Shiraishi et al. |
| 6,841,737 B2 | 1/2005 | Komatsubara et al. |
| 6,856,075 B1 | 2/2005 | Houk et al. |
| 6,898,042 B2 | 5/2005 | Subrahmanyan |
| 6,900,967 B1 | 5/2005 | Coon et al. |
| 6,922,305 B2 | 7/2005 | Price |
| 6,934,127 B2 | 8/2005 | Yao et al. |
| 6,942,817 B2 | 9/2005 | Yagi et al. |
| 6,943,991 B2 | 9/2005 | Yao et al. |
| 6,950,288 B2 | 9/2005 | Yao et al. |
| 6,963,471 B2 | 11/2005 | Arai et al. |
| 6,975,488 B1 | 12/2005 | Kulangara et al. |
| 6,977,790 B1 | 12/2005 | Chen et al. |
| 7,006,333 B1 | 2/2006 | Summers |
| 7,016,159 B1 | 3/2006 | Bjorstrom et al. |
| 7,020,949 B2 | 4/2006 | Muramatsu et al. |
| 7,023,667 B2 | 4/2006 | Shum |
| 7,050,267 B2 | 5/2006 | Koh et al. |
| 7,057,857 B1 | 6/2006 | Niu et al. |
| 7,064,928 B2 | 6/2006 | Fu et al. |
| 7,079,357 B1 | 7/2006 | Kulangara et al. |
| 7,082,670 B2 | 8/2006 | Boismier et al. |
| 7,092,215 B2 | 8/2006 | Someya et al. |
| 7,130,159 B2 | 10/2006 | Shimizu et al. |
| 7,132,607 B2 | 11/2006 | Yoshimi et al. |
| 7,142,395 B2 | 11/2006 | Swanson et al. |
| 7,144,687 B2 | 12/2006 | Fujisaki et al. |
| 7,159,300 B2 | 1/2007 | Yao et al. |
| 7,161,765 B2 | 1/2007 | Ichikawa et al. |
| 7,161,767 B2 | 1/2007 | Hernandez et al. |
| 7,177,119 B1 | 2/2007 | Bennin et al. |
| 7,218,481 B1 | 5/2007 | Bennin et al. |
| 7,256,968 B1 | 8/2007 | Krinke |
| 7,271,958 B2 | 9/2007 | Yoon et al. |
| 7,292,413 B1 | 11/2007 | Coon |
| 7,307,817 B1 | 12/2007 | Mei |
| 7,322,241 B2 | 1/2008 | Kai |

(56) References Cited

U.S. PATENT DOCUMENTS

| | | |
|---|---|---|
| 7,336,436 B2 | 2/2008 | Sharma et al. |
| 7,342,750 B2 | 3/2008 | Yang et al. |
| 7,345,851 B2 | 3/2008 | Hirano et al. |
| 7,375,930 B2 | 5/2008 | Yang et al. |
| 7,379,274 B2 | 5/2008 | Yao et al. |
| 7,382,582 B1 | 6/2008 | Cuevas |
| 7,385,788 B2 | 6/2008 | Kubota et al. |
| 7,391,594 B2 | 6/2008 | Fu et al. |
| 7,403,357 B1 | 7/2008 | Williams |
| 7,408,745 B2 | 8/2008 | Yao et al. |
| 7,417,830 B1 | 8/2008 | Kulangara |
| 7,420,778 B2 | 9/2008 | Sassine et al. |
| 7,459,835 B1 | 12/2008 | Mei et al. |
| 7,460,337 B1 | 12/2008 | Mei |
| 7,466,520 B2 | 12/2008 | White et al. |
| 7,499,246 B2 | 3/2009 | Nakagawa |
| 7,509,859 B2 | 3/2009 | Kai |
| 7,518,830 B1 | 4/2009 | Panchal et al. |
| 7,567,410 B1 | 7/2009 | Zhang et al. |
| 7,595,965 B1 | 9/2009 | Kulangara et al. |
| 7,625,654 B2 | 12/2009 | Vyas et al. |
| 7,643,252 B2 | 1/2010 | Arai et al. |
| 7,649,254 B2 | 1/2010 | Graydon et al. |
| 7,663,841 B2 | 2/2010 | Budde et al. |
| 7,667,921 B2 | 2/2010 | Satoh et al. |
| 7,675,713 B2 | 3/2010 | Ogawa et al. |
| 7,688,552 B2 | 3/2010 | Yao et al. |
| 7,692,899 B2 | 4/2010 | Arai et al. |
| 7,701,673 B2 | 4/2010 | Wang et al. |
| 7,701,674 B2 | 4/2010 | Arai |
| 7,719,798 B2 | 5/2010 | Yao |
| 7,724,478 B2 | 5/2010 | Deguchi et al. |
| 7,751,153 B1 | 7/2010 | Kulangara et al. |
| 7,768,746 B2 | 8/2010 | Yao et al. |
| 7,782,572 B2 | 8/2010 | Pro |
| 7,821,742 B1 | 10/2010 | Mei |
| 7,832,082 B1 | 11/2010 | Hentges et al. |
| 7,835,113 B1 | 11/2010 | Douglas |
| 7,872,344 B2 | 1/2011 | Fjelstad et al. |
| 7,875,804 B1 | 1/2011 | Tronnes et al. |
| 7,914,926 B2 | 3/2011 | Kimura et al. |
| 7,923,644 B2 | 4/2011 | Ishii et al. |
| 7,924,530 B1 | 4/2011 | Chocholaty |
| 7,929,252 B1 | 4/2011 | Hentges et al. |
| 7,983,008 B2 | 7/2011 | Liao et al. |
| 7,986,494 B2 | 7/2011 | Pro |
| 8,004,798 B1 | 8/2011 | Dunn |
| 8,085,508 B2 | 12/2011 | Hatch |
| 8,089,728 B2 | 1/2012 | Yao et al. |
| 8,120,878 B1 | 2/2012 | Drape et al. |
| 8,125,736 B2 | 2/2012 | Nojima et al. |
| 8,125,741 B2 | 2/2012 | Shelor |
| 8,144,436 B2 | 3/2012 | Iriuchijima et al. |
| 8,149,542 B2 | 4/2012 | Ando |
| 8,161,626 B2 | 4/2012 | Ikeji |
| 8,169,746 B1 | 5/2012 | Rice et al. |
| 8,174,797 B2 | 5/2012 | Iriuchijima |
| 8,189,301 B2 | 5/2012 | Schreiber |
| 8,194,359 B2 | 6/2012 | Yao et al. |
| 8,199,441 B2 | 6/2012 | Nojima |
| 8,228,642 B1 | 7/2012 | Hahn et al. |
| 8,248,731 B2 | 8/2012 | Fuchino |
| 8,248,734 B2 | 8/2012 | Fuchino |
| 8,248,735 B2 | 8/2012 | Fujimoto et al. |
| 8,248,736 B2 | 8/2012 | Hanya et al. |
| 8,254,062 B2 | 8/2012 | Greminger |
| 8,259,416 B1 | 9/2012 | Davis et al. |
| 8,264,797 B2 | 9/2012 | Emley |
| 8,289,652 B2 | 10/2012 | Zambri et al. |
| 8,295,012 B1 | 10/2012 | Tian et al. |
| 8,300,362 B2 | 10/2012 | Virmani et al. |
| 8,310,790 B1 | 11/2012 | Fanslau, Jr. |
| 8,331,061 B2 | 12/2012 | Hanya et al. |
| 8,339,748 B2 | 12/2012 | Shum et al. |
| 8,351,160 B2 | 1/2013 | Fujimoto |
| 8,363,361 B2 | 1/2013 | Hanya et al. |
| 8,379,349 B1 | 2/2013 | Pro et al. |
| 8,446,694 B1 | 5/2013 | Tian et al. |
| 8,456,780 B1 | 6/2013 | Ruiz |
| 8,498,082 B1 | 7/2013 | Padeski et al. |
| 8,526,142 B1 | 9/2013 | Dejkoonmak et al. |
| 8,542,465 B2 | 9/2013 | Liu et al. |
| 8,559,137 B2 | 10/2013 | Imuta |
| 8,665,565 B2 | 3/2014 | Pro et al. |
| 8,675,314 B1 | 3/2014 | Bjorstrom et al. |
| 8,681,456 B1 | 3/2014 | Miller et al. |
| 2001/0012181 A1 | 8/2001 | Inoue et al. |
| 2001/0013993 A1 | 8/2001 | Coon |
| 2001/0030838 A1 | 10/2001 | Takadera et al. |
| 2001/0043443 A1 | 11/2001 | Okamoto et al. |
| 2002/0075606 A1 | 6/2002 | Nishida et al. |
| 2002/0118492 A1 | 8/2002 | Watanabe et al. |
| 2002/0149888 A1 | 10/2002 | Motonishi et al. |
| 2003/0011118 A1 | 1/2003 | Kasajima et al. |
| 2003/0011936 A1 | 1/2003 | Himes et al. |
| 2003/0053258 A1 | 3/2003 | Dunn et al. |
| 2003/0135985 A1 | 7/2003 | Yao et al. |
| 2003/0174445 A1 | 9/2003 | Luo |
| 2003/0202293 A1 | 10/2003 | Nakamura et al. |
| 2003/0210499 A1 | 11/2003 | Arya |
| 2004/0027727 A1 | 2/2004 | Shimizu et al. |
| 2004/0027728 A1 | 2/2004 | Coffey et al. |
| 2004/0070884 A1 | 4/2004 | Someya et al. |
| 2004/0125508 A1 | 7/2004 | Yang et al. |
| 2004/0181932 A1 | 9/2004 | Yao et al. |
| 2004/0207957 A1 | 10/2004 | Kasajima et al. |
| 2005/0061542 A1 | 3/2005 | Aonuma et al. |
| 2005/0063097 A1 | 3/2005 | Maruyama et al. |
| 2005/0105217 A1 | 5/2005 | Kwon et al. |
| 2005/0254175 A1 | 11/2005 | Swanson et al. |
| 2005/0280944 A1 | 12/2005 | Yang et al. |
| 2006/0044698 A1 | 3/2006 | Hirano et al. |
| 2006/0077594 A1 | 4/2006 | White et al. |
| 2006/0181812 A1 | 8/2006 | Kwon et al. |
| 2006/0193086 A1 | 8/2006 | Zhu et al. |
| 2006/0209465 A1 | 9/2006 | Takikawa et al. |
| 2006/0238924 A1 | 10/2006 | Gatzen |
| 2006/0274452 A1 | 12/2006 | Arya |
| 2006/0274453 A1 | 12/2006 | Arya |
| 2006/0279880 A1 | 12/2006 | Boutaghou et al. |
| 2007/0133128 A1 | 6/2007 | Arai |
| 2007/0153430 A1 | 7/2007 | Park et al. |
| 2007/0223146 A1 | 9/2007 | Yao et al. |
| 2007/0227769 A1 | 10/2007 | Brodsky et al. |
| 2007/0253176 A1 | 11/2007 | Ishii et al. |
| 2008/0084638 A1 | 4/2008 | Bonin |
| 2008/0144225 A1 | 6/2008 | Yao et al. |
| 2008/0192384 A1 | 8/2008 | Danielson et al. |
| 2008/0198511 A1 | 8/2008 | Hirano et al. |
| 2008/0273266 A1 | 11/2008 | Pro |
| 2008/0273269 A1 | 11/2008 | Pro |
| 2009/0080117 A1 | 3/2009 | Shimizu et al. |
| 2009/0135523 A1 | 5/2009 | Nishiyama et al. |
| 2009/0147407 A1 | 6/2009 | Huang et al. |
| 2009/0176120 A1 | 7/2009 | Wang |
| 2009/0190263 A1 | 7/2009 | Miura et al. |
| 2009/0244786 A1 | 10/2009 | Hatch |
| 2009/0294740 A1 | 12/2009 | Kurtz et al. |
| 2010/0067151 A1 | 3/2010 | Okawara et al. |
| 2010/0073825 A1 | 3/2010 | Okawara |
| 2010/0097726 A1 | 4/2010 | Greminger et al. |
| 2010/0143743 A1 | 6/2010 | Yamasaki et al. |
| 2010/0165515 A1 | 7/2010 | Ando |
| 2010/0165516 A1 | 7/2010 | Fuchino |
| 2010/0177445 A1 | 7/2010 | Fuchino |
| 2010/0195252 A1 | 8/2010 | Kashima |
| 2010/0208390 A1 | 8/2010 | Hanya et al. |
| 2010/0220414 A1 | 9/2010 | Klarqvist et al. |
| 2010/0246071 A1 | 9/2010 | Nojima et al. |
| 2010/0271735 A1 | 10/2010 | Schreiber |
| 2010/0290158 A1 | 11/2010 | Hanya et al. |
| 2011/0013319 A1 | 1/2011 | Soga et al. |
| 2011/0058282 A1* | 3/2011 | Fujimoto et al. ........... 360/246.2 |
| 2011/0096438 A1 | 4/2011 | Takada et al. |

(56) References Cited

U.S. PATENT DOCUMENTS

| | | |
|---|---|---|
| 2011/0123145 A1 | 5/2011 | Nishio |
| 2011/0141624 A1 | 6/2011 | Fuchino et al. |
| 2011/0228425 A1 | 9/2011 | Liu et al. |
| 2011/0242708 A1 | 10/2011 | Fuchino |
| 2011/0279929 A1 | 11/2011 | Kin |
| 2011/0299197 A1 | 12/2011 | Eguchi |
| 2012/0002329 A1 | 1/2012 | Shum et al. |
| 2012/0087041 A1 | 4/2012 | Ohsawa |
| 2012/0113547 A1 | 5/2012 | Sugimoto |
| 2012/0281316 A1 | 11/2012 | Fujimoto et al. |
| 2013/0020112 A1 | 1/2013 | Ohsawa |
| 2013/0242434 A1 | 9/2013 | Bjorstrom et al. |
| 2013/0242436 A1 | 9/2013 | Yonekura et al. |
| 2013/0265674 A1 | 10/2013 | Fanslau |
| 2014/0022670 A1 | 1/2014 | Takikawa et al. |
| 2014/0022671 A1 | 1/2014 | Takikawa et al. |
| 2014/0022674 A1 | 1/2014 | Takikawa et al. |
| 2014/0022675 A1 | 1/2014 | Hanya et al. |
| 2014/0063660 A1 | 3/2014 | Bjorstrom et al. |
| 2014/0078621 A1 | 3/2014 | Miller et al. |
| 2014/0098440 A1 | 4/2014 | Miller et al. |

FOREIGN PATENT DOCUMENTS

| | | |
|---|---|---|
| JP | 9198825 A | 7/1997 |
| JP | 10003632 A | 1/1998 |
| JP | 2001057039 A | 2/2001 |
| JP | 2001202731 A | 7/2001 |
| JP | 2001307442 A | 11/2001 |
| JP | 2002050140 A | 2/2002 |
| JP | 2002170607 A | 6/2002 |
| JP | 2003223771 A | 8/2003 |
| JP | 2004039056 A | 2/2004 |
| JP | 2004300489 A | 10/2004 |
| JP | 2005209336 A | 8/2005 |
| WO | WO9820485 A1 | 5/1998 |

OTHER PUBLICATIONS

International Search Report and Written Opinion issued in PCT/US2013/059702, dated Mar. 28, 2014, 9 pages.

Cheng, Yang-Tse, "Vapor deposited thin gold coatings for high temperature electrical contacts", Electrical Contacts, 1996, Joint with the 18th International Conference on Electrical Contacts, Proceedings of the Forty-Second IEEE Holm Conference, Sep. 16-20, 1996 (abstract only).

Fu, Yao, "Design of a Hybrid Magnetic and Piezoelectric Polymer Microactuator", a thesis submitted to Industrial Research Institute Swinburne (IRIS), Swinburne University of Technology, Hawthorn, Victoria, Australia, Dec. 2005.

Harris, N.R. et al., "A Multilayer Thick-film PZT Actuator for MEMs Applications", Sensors and Actuators A: Physical, vol. 132, No. 1, Nov. 8, 2006, pp. 311-316.

International Search Report and Written Opinion issued in PCT/US2013/064314, dated Apr. 18, 2014, 10 pages.

Jing, Yang, "Fabrication of piezoelectric ceramic micro-actuator and its reliability for hard disk drives", Ultrasonics, Ferroelectrics and Frequency Control, IEEE, vol. 51, No. 11, Nov. 2004, pp. 1470-1476 (abstract only).

Kon, Stanley et al., "Piezoresistive and Piezoelectric MEMS Strain Sensors for Vibration Detection", Sensors and Smart Structures Technologies for Civil, Mechanical, and Aerospace Systems 2007, Proc. Of SPIE vol. 6529.

Lengert, David et al., "Design of suspension-based and collocated dual stage actuated suspensions", Microsyst Technol (2012) 18:1615-1622.

Li, Longqiu et al., "An experimental study of the dimple-gimbal interface in a hard disk drive", Microsyst Technol (2011) 17:863-868.

Pichonat, Tristan et al., "Recent developments in MEMS-based miniature fuel cells", Microsyst Technol (2007) 13:1671-1678.

Raeymaekers, B. et al., "Investigation of fretting wear at the dimple/gimbal interface in a hard disk drive suspension", Wear, vol. 268, Issues 11-12, May 12, 2010, pp. 1347-1353.

Raeymaekers, Bart et al., "Fretting Wear Between a Hollow Sphere and Flat Surface", Proceedings of the STLE/ASME International Joint Tribology Conference, Oct. 19-21, 2009, Memphis, TN USA, 4 pages.

Rajagopal, Indira et al., "Gold Plating of Critical Components for Space Applications: Challenges and Solutions", Gold Bull., 1992, 25(2), pp. 55-66.

U.S. Appl. No. 14/216,288 to Miller, Mark A. et al., entitled Co-Located Gimbal-Based Dual Stage Actuation Disk Drive Suspension, filed Mar. 17, 2014, 84 pages.

U.S. Appl. No. 61/396,239 entitled Low Resistance Ground Joints for Dual Stage Actuation Disk Drive Suspensions, filed May 24, 2010, 16 pages.

U.S. Appl. No. 13/955,204, to Bjorstrom, Jacob D. et al., Non-Final Office Action issued on Mar. 24, 2014, 7 pages.

U.S. Appl. No. 13/955,204, to Bjorstrom, Jacob D. et al., Non-Final Office Action issued on Oct. 29, 2013, 9 pages.

U.S. Appl. No. 13/955,204, to Bjorstrom, Jacob D. et al., Notice of Allowance issued on Jan. 7, 2014, 6 pages.

U.S. Appl. No. 13/955,204, to Bjorstrom, Jacob D. et al., Notice of Allowance issued on May 6, 2014, 5 pages.

U.S. Appl. No. 13/955,204, to Bjorstrom, Jacob D. et al., Response filed Apr. 18, 2014 to Non-Final Office Action issued on Mar. 24, 2014, 9 pages.

U.S. Appl. No. 13/955,204, to Bjorstrom, Jacob D. et al., Response filed Nov. 19, 2013 to Non-Final Office Action issued on Oct. 29, 2013, 11 pages.

U.S. Appl. No. 13/972,137, to Bjorstrom, Jacob D. et al., Non-Final Office Action issued Nov. 5, 2013.

U.S. Appl. No. 13/972,137, to Bjorstrom, Jacob D. et al., Notice of Allowance issued on Jan. 17, 2014, 5 pages.

U.S. Appl. No. 13/972,137, to Bjorstrom, Jacob D. et al., Response filed Dec. 2, 2013 to Non-Final Office Action issued Nov. 5, 2013, 12 pages.

U.S. Appl. No. 14/044,238 to Miller, Mark A., Non-Final Office Action issued on Feb. 6, 2014, 9 pages.

U.S. Appl. No. 14/044,238, to Miller, Mark A., Response filed Apr. 22, 2014 to Non-Final Office Action issued on Feb. 6, 2014, 11 pages.

U.S. Appl. No. 14/050,660, to Miller, Mark A. et al., Non-Final Office Action issued on Mar. 31, 2014, 9 pages.

Yoon, Wonseok et al., "Evaluation of coated metallic bipolar plates for polymer electrolyte membrane fuel cells", The Journal of Power Sources, vol. 179, No. 1, Apr. 15, 2008, pp. 265-273, (Abstract Only).

U.S. Appl. No. 13/365,443 to Miller, Mark A., entitled Elongated Trace Tethers for Disk Drive Head Suspension Flexures, filed Feb. 3, 2012.

U.S. Appl. No. 13/690,883 to Tobias, Kyle T. et al., entitled Microstructure Patterned Surfaces for Integrated Lead Head Suspensions, filed Nov. 30, 2012.

U.S. Appl. No. 13/827,622 to Bjorstrom, Jacob D. et al., entitled Mid-Loadbeam Dual Stage Actuated (DSA) Disk Drive Head Suspension, filed Mar. 14, 2013.

U.S. Appl. No. 13/955,204 to Bjorstrom, Jacob D. et al., entitled Damped Dual Stage Actuation Disk Drive Suspensions, filed Jul. 31, 2013.

U.S. Appl. No. 13/972,137 to Bjorstrom, Jacob D. et al., entitled Co-Located Gimbal-Based Dual Stage Actuation Disk Drive Suspensions With Offset Motors, filed Aug. 21, 2013.

U.S. Appl. No. 14/026,427 to Miller, Mark A., entitled Co-Located Gimbal-Based Dual Stage Actuation Disk Drive Suspensions, filed Sep. 13, 2013.

U.S. Appl. No. 14/044,238 to Miller, Mark A., entitled Co-Located Gimbal-Based Dual Stage Actuation Disk Drive Suspensions With Motor Stifeners, filed Oct. 2, 2013.

(56) References Cited

OTHER PUBLICATIONS

U.S. Appl. No. 14/050,660 to Miller, Mark A. et al., entitled Co-Located Gimbal-Based Dual Stage Actuation Disk Drive Suspensions With Dampers, filed Oct. 10, 2013.

U.S. Appl. No. 14/103,955 to Bjorstrom, Jacob D. et al., entitled Electrical Contacts to Motors in Dual Stage Actuated Suspensions, filed Dec. 12, 2013.

U.S. Appl. No. 14/141,617 to Bennin, Jeffry S. et al., entitled Disk Drive Suspension Assembly Having a Partially Flangeless Load Point Dimple, filed Dec. 27, 2013, 53 pages.

U.S. Appl. No. 14/145,515 to Miller, Mark A. et al., entitled Balanced Co-Located Gimbal-Based Dual Stage Actuation Disk Drive Suspensions, filed Dec. 31, 2013, 39 pages.

International Search Report and Written Opinion issued in PCT/US2013/052885, mailed Feb. 7, 2014, 13 pages.

\* cited by examiner

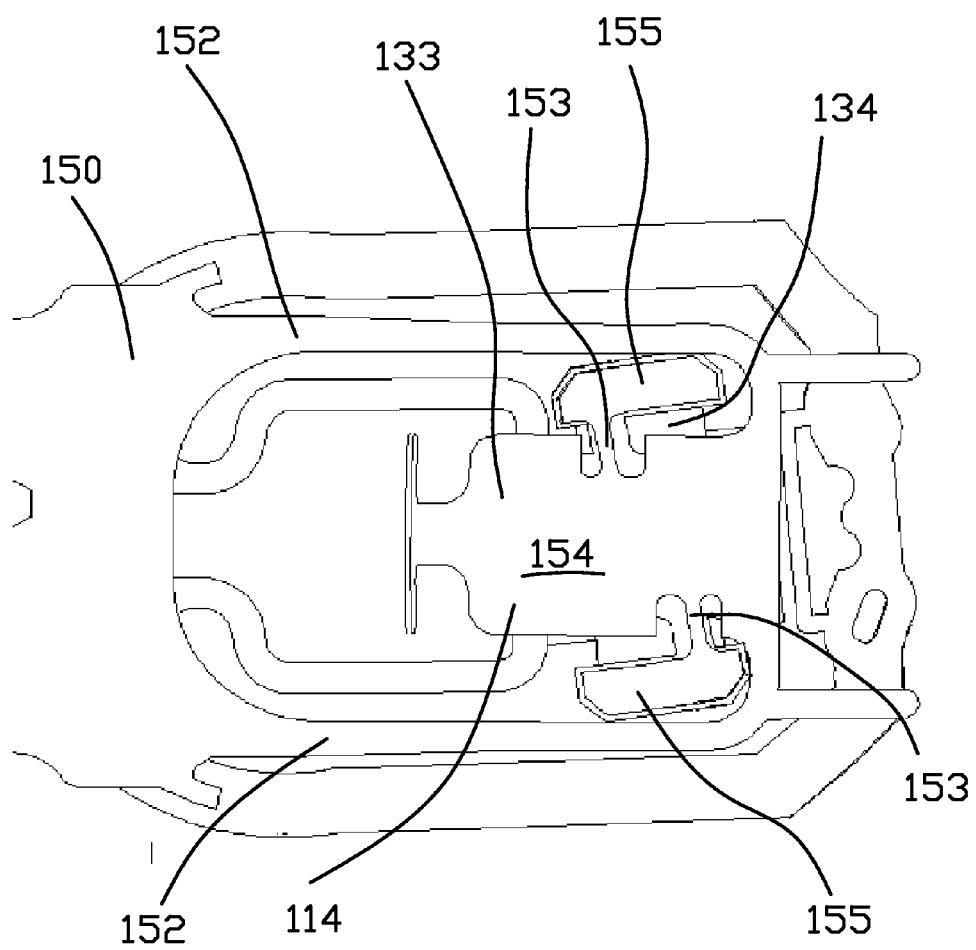
FIG 16A1

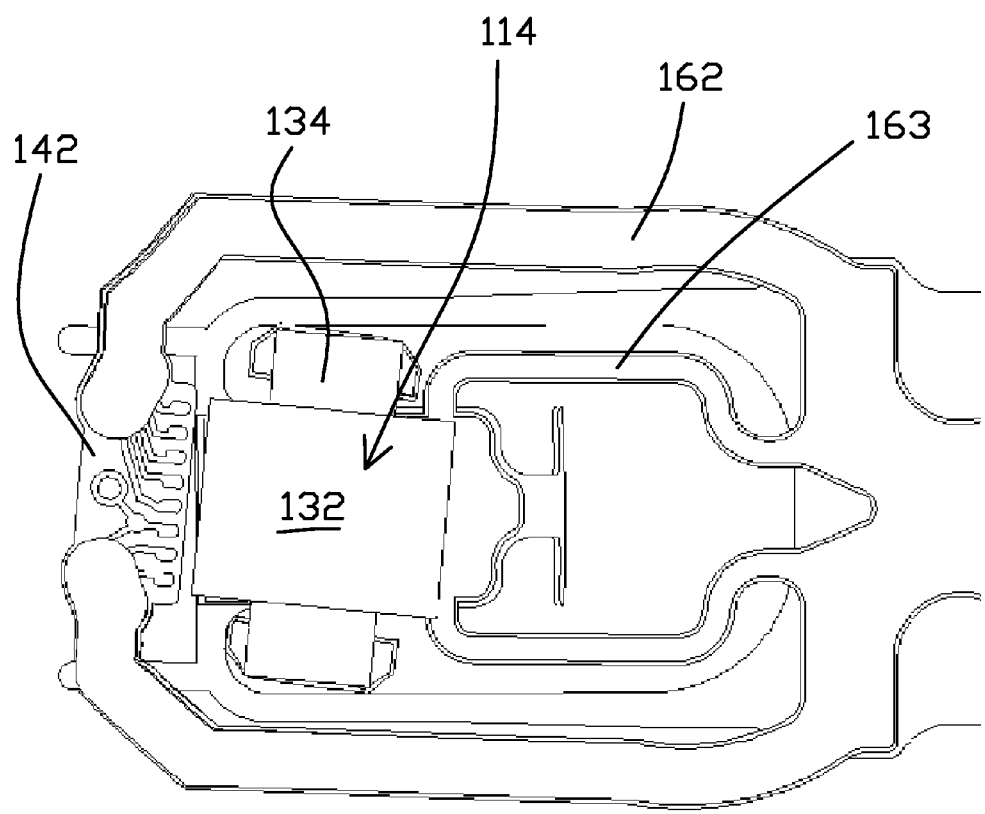
FIG 16A2

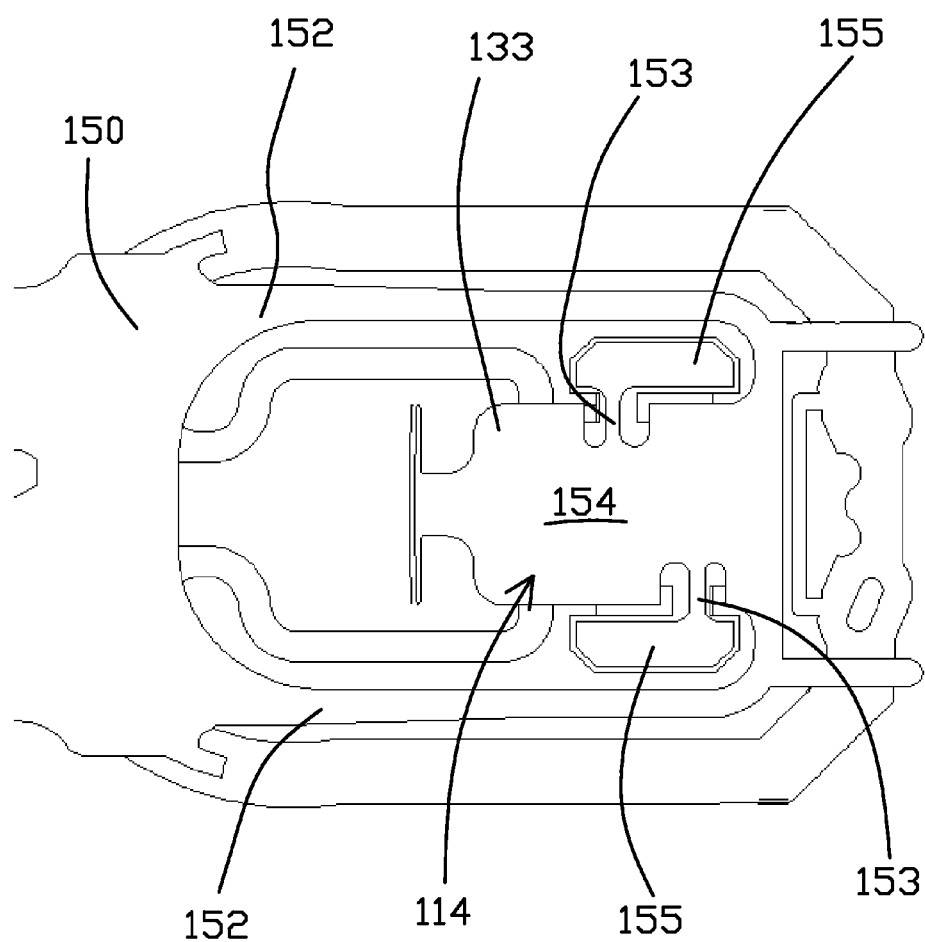
FIG 16B1

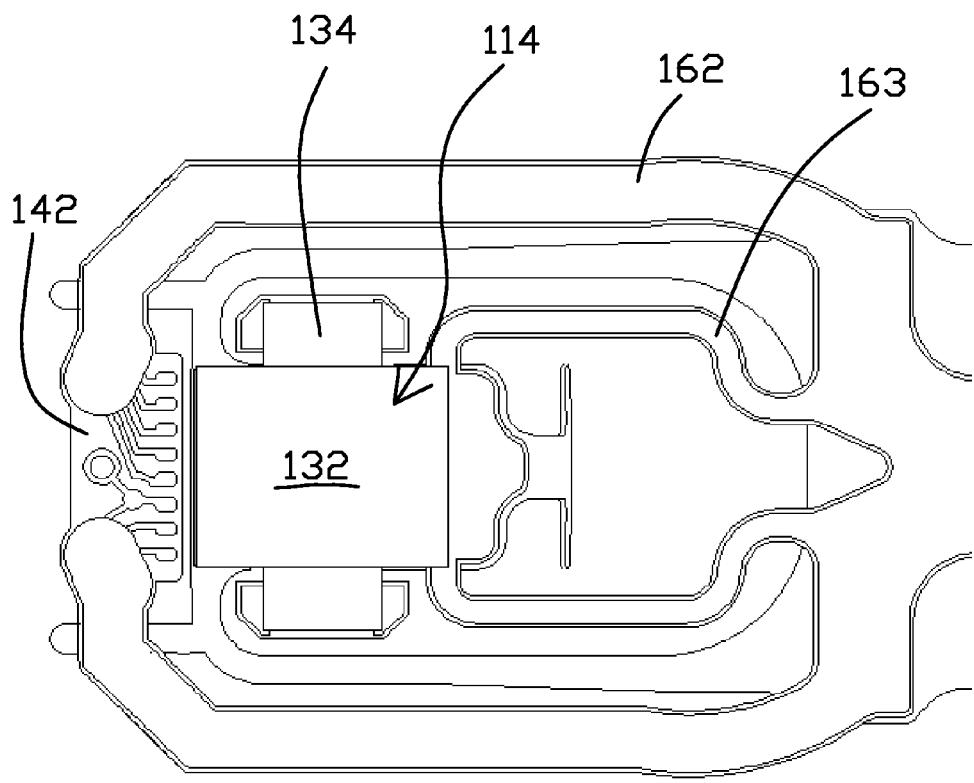
FIG 16B2

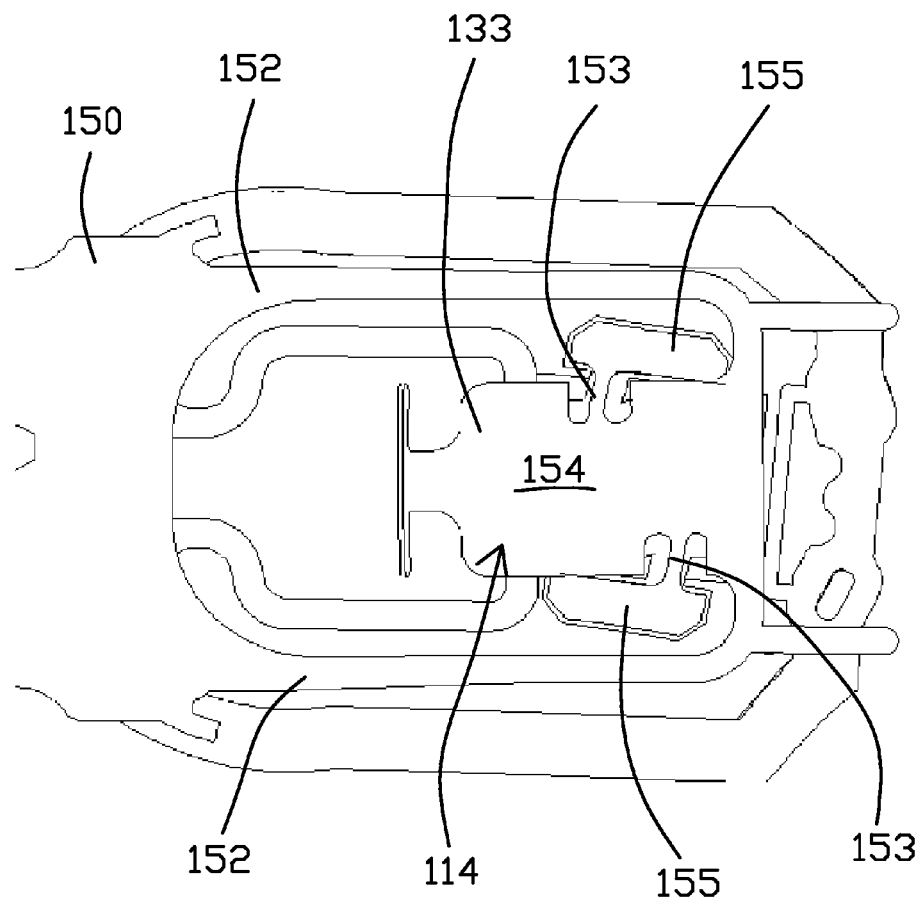
FIG 16C1

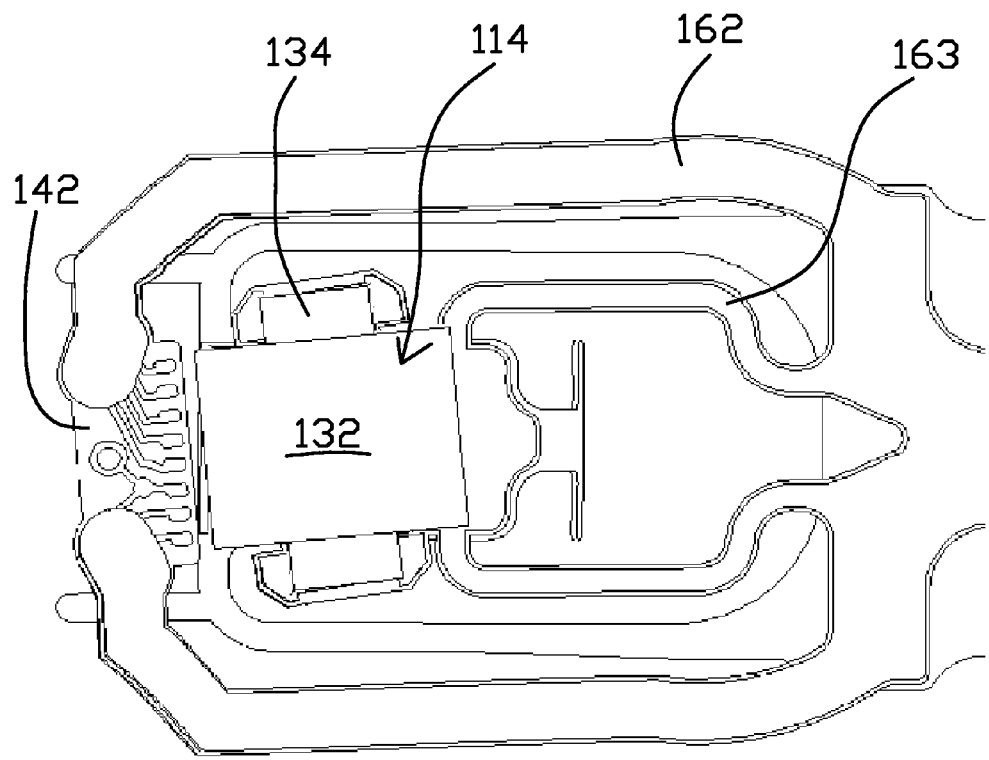
FIG 16C2

TWO-MOTOR CO-LOCATED GIMBAL-BASED DUAL STAGE ACTUATION DISK DRIVE SUSPENSIONS WITH MOTOR STIFFENERS

CROSS-REFERENCE TO RELATED APPLICATION

This application claims the benefit of U.S. Provisional Application No. 61/826,865, filed May 23, 2013, which is herein incorporated by reference in its entirety and for all purposes.

TECHNICAL FIELD

The present invention relates to disk drives and suspensions for disk drives. In particular, the invention is a dual stage actuation (DSA) suspension having a motor with a stiffener mounted thereon.

BACKGROUND

Dual stage actuation (DSA) disk drive head suspensions and disk drives incorporating DSA suspensions are generally known and commercially available. For example, DSA suspensions having an actuation structure on the baseplate or other mounting portion of the suspension, i.e., proximal to the spring or hinge region of the suspension, are described in the Okawara U.S. Patent Publication No. 2010/0067151, the Shum U.S. Patent Publication No. 2012/0002329, the Fuchino U.S. Patent Publication No. 2011/0242708 and the Imamura U.S. Pat. No. 5,764,444. DSA suspensions having actuation structures located on the loadbeam or gimbal portions of the suspension, i.e., distal to the spring or hinge region, are also known and disclosed, for example, in the Jurgenson U.S. Pat. No. 5,657,188, the Krinke U.S. Pat. No. 7,256,968 and the Yao U.S. Patent Publication No. 2008/0144225. Co-located gimbal-based DSA suspensions are disclosed in co-pending U.S. Provisional Application Nos. 61/700,972 and 61/711,988. All of the above-identified patents and patent applications are incorporated herein by reference in their entirety and for all purposes.

There remains a continuing need for improved DSA suspensions. DSA suspensions with enhanced performance capabilities are desired. The suspensions should be capable of being efficiently manufactured.

SUMMARY

Various embodiments concern a dual stage actuation flexure. The dual stage actuation flexure comprises flexure having a gimbal, the gimbal comprising a pair of spring arms, a tongue between the spring arms, and a pair of linkages respectively connecting the pair of spring arms to the tongue. The dual stage actuation flexure further comprises a pair of motors mounted on the gimbal, a pair of stiffeners respectively mounted on the motors, and a slider mounting. Electrical activation of the motors bends the pair of linkages to move the slider mounting about a tracking axis while the stiffeners limit the degree of bending of the motors during the electrical activation. A slider is attached to the slider mounting.

In some configurations, the slider mounting is located on same side of the flexure as the motors, while in some other configurations the slider mounting is located on the opposite side of the flexure as the motors.

In some configurations, the tongue comprises a pair of first motor mountings, the pair of motors respectively attached to the first motor mountings. In some further configurations, the pair of linkages comprises a pair of second motor mountings, the pair of motors respectively attached to the pair of second motor mountings. In some further configurations, each linkage of the pair of linkages comprises a strut. Electrical activation of the motor bends the struts to move the slider mounting about the tracking axis.

In some configurations, each stiffener is bonded to a respective one of the motors by a respective layer of adhesive that is between the motor and the stiffener. In some configurations, at least one of the stiffeners is asymmetric with respect to one or both of a longitudinal axis of the stiffener and a transverse axis of the stiffener.

Some configurations further comprise an additional pair of stiffeners respectively mounted on the motors, wherein the stiffeners are respectively mounted on the top sides of the motors and the additional pair of stiffeners are respectively mounted on the bottom sides of the motors.

Various embodiments concern a dual stage actuation flexure. The dual stage actuation flexure comprises flexure having a pair of spring arms, a pair of struts, and a tongue between the spring arms. The dual stage actuation flexure further comprises a pair of motors mounted on the flexure, each motor comprising a top side and a bottom side opposite the top side. The dual stage actuation flexure further comprises a pair of stiffeners respectively mounted on the top sides of the motors, adhesive located between the stiffeners and the motors and bonded to the stiffeners and the motors, and a slider mounting. Electrical activation of the motors bends the pair of struts to move the slider mounting while the stiffeners limit the degree of bending of the motors during the electrical activation.

Various embodiments concern a dual stage actuation flexure. The dual stage actuation flexure comprises flexure, a pair of motors mounted on the flexure, a pair of stiffeners respectively mounted on the motors, adhesive located between the stiffeners and the motors and bonded to the stiffeners and the motors, and a slider mounting. Electrical activation of the motors moves the slider mounting while the stiffeners limit the degree of bending of the motors during the electrical activation.

Further features and modifications of the various embodiments are further discussed herein and shown in the drawings. While multiple embodiments are disclosed, still other embodiments of the present disclosure will become apparent to those skilled in the art from the following detailed description, which shows and describes illustrative embodiments of this disclosure. Accordingly, the drawings and detailed description are to be regarded as illustrative in nature and not restrictive.

Figure 9:
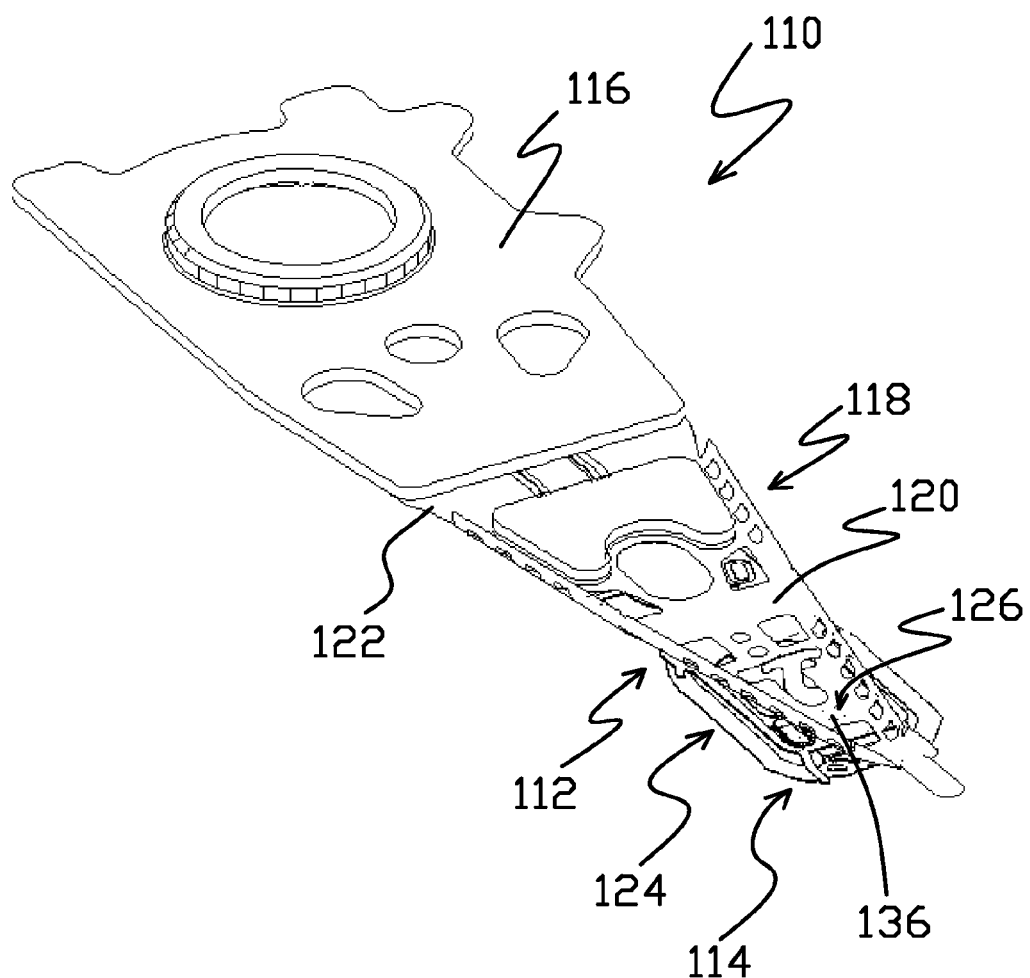
FIG. 9 is an isometric view of the loadbeam side of a suspension having a flexure with a dual stage actuation (DSA) structure.

FIGS. $16A_1$, $16B_1$, and $16C_1$ are plan views of the stainless steel side of the flexure shown in FIG. 9.

FIGS. $16A_2$, $16B_2$, and $16C_2$ are plan views of the trace side of the flexure shown in FIGS. $16A_1$, $16B_1$, and $16C_1$, respectively.

Figure 17:
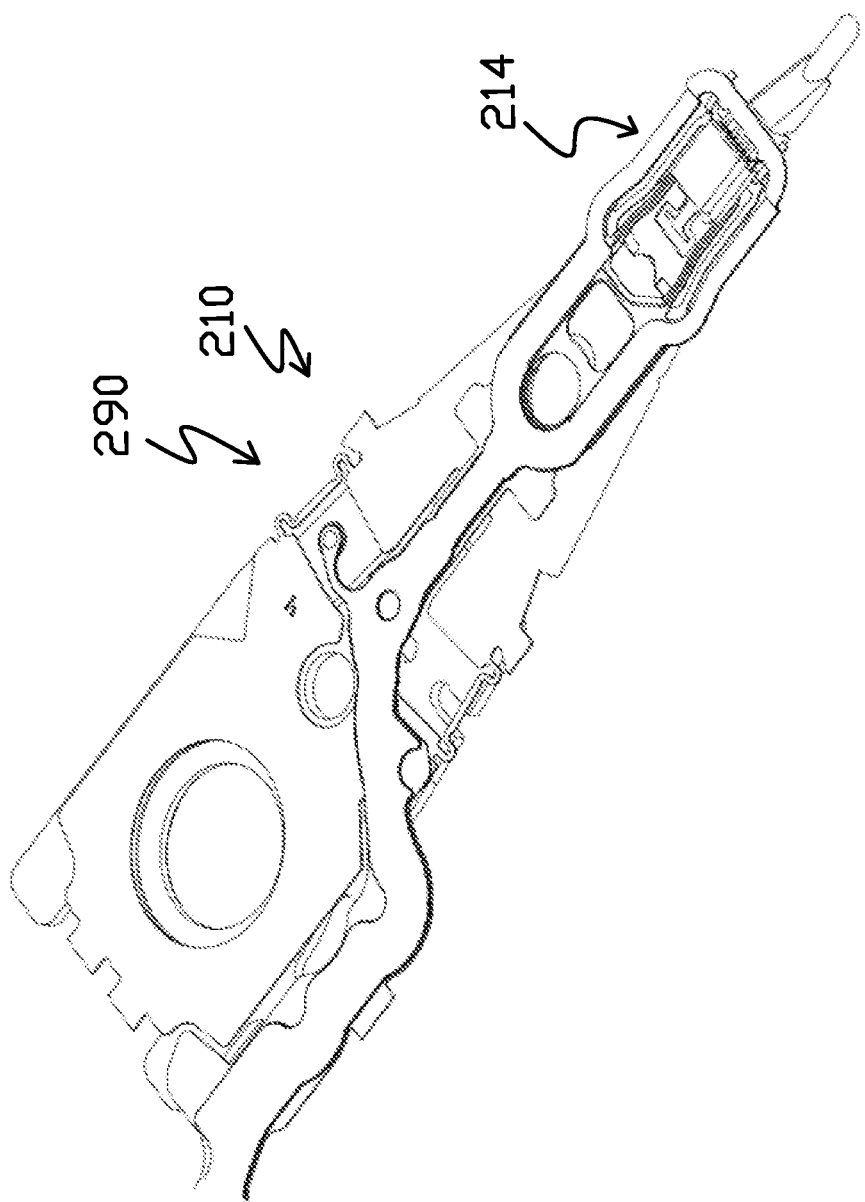

FIG. 17 is an isometric view of a tri-stage actuated suspension.

Figure 18:
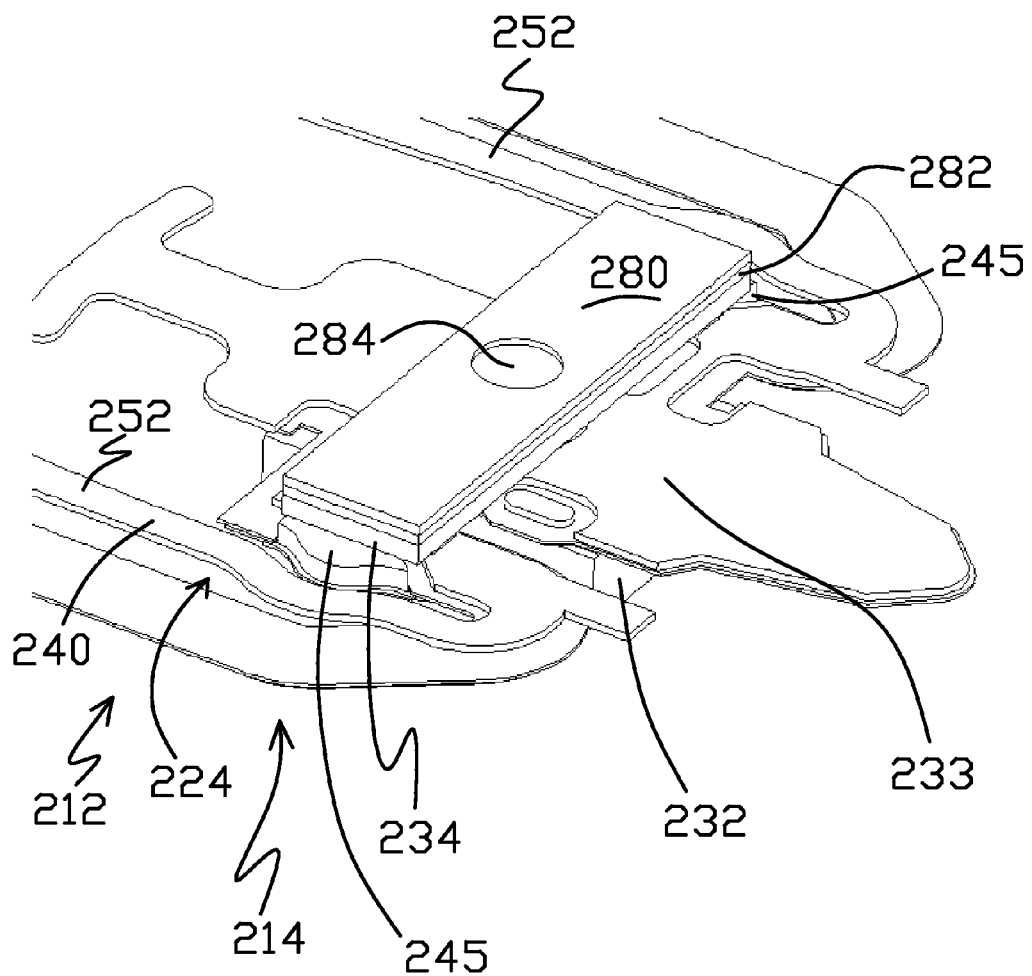

FIG. 18 is an isometric view of the stainless steel side of the distal end of a flexure having a DSA structure with a stiffener.

Figure 19:
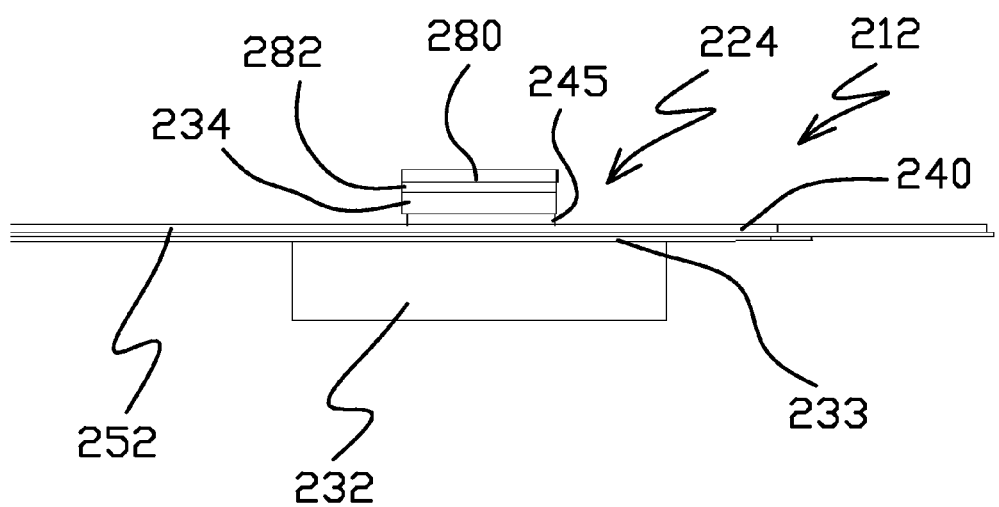

FIG. 19 is a side view of the distal end of the flexure shown in FIG. 18.

Figure 20:
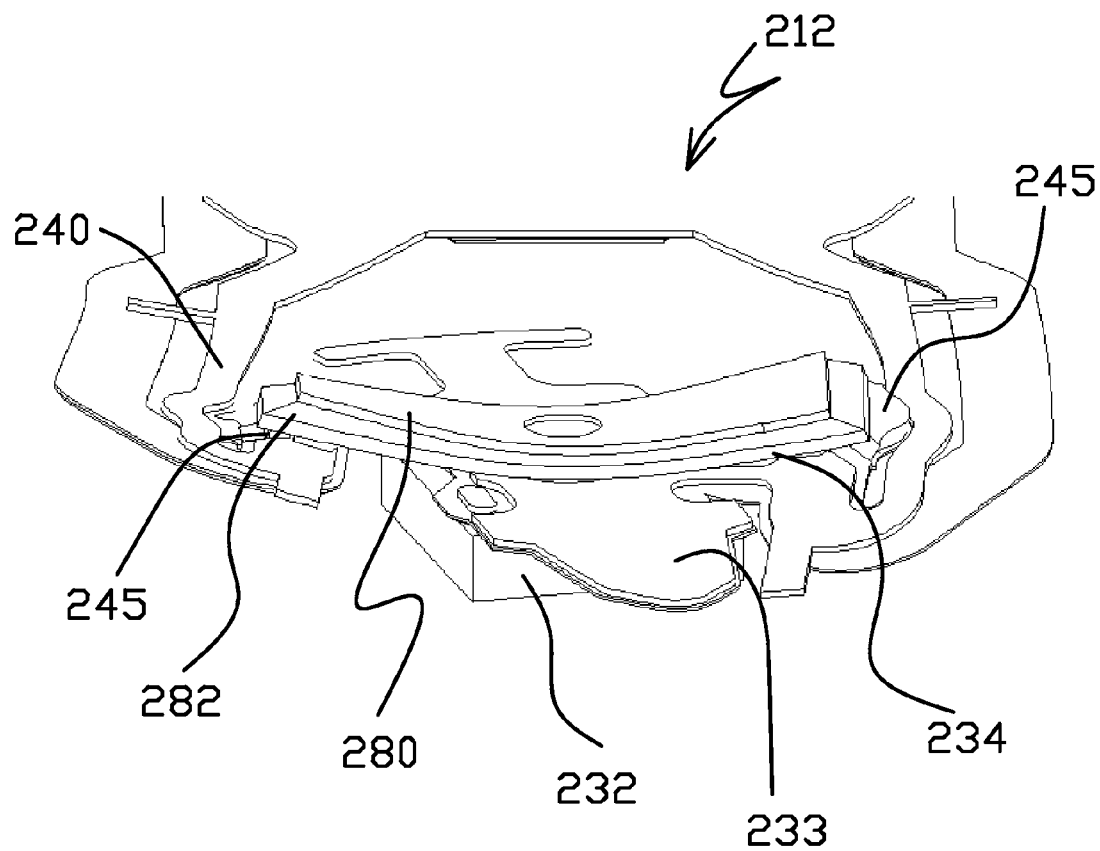

FIG. 20 is an illustration of the flexure shown in FIG. 18 when the motor is actuated into an expanded state.

Figure 21:
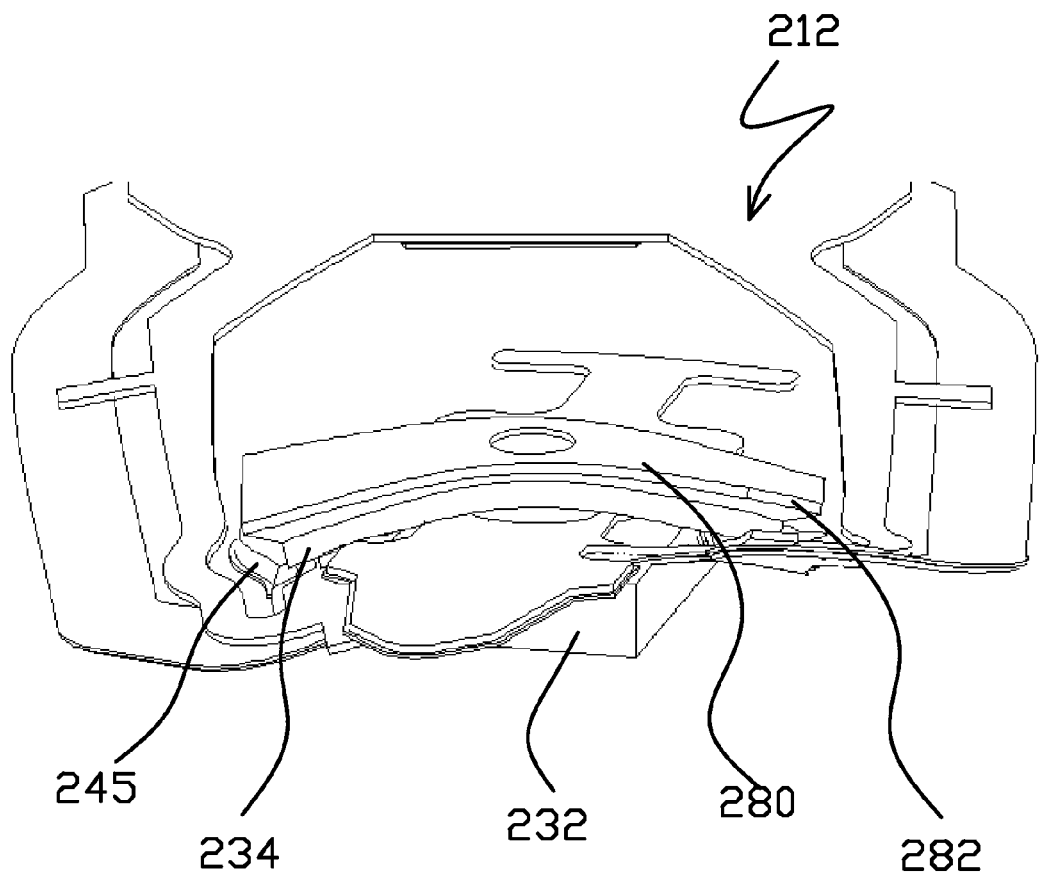

FIG. 21 is an illustration of the flexure shown in FIG. 18 when the motor is actuated into a contracted state.

Figure 22:
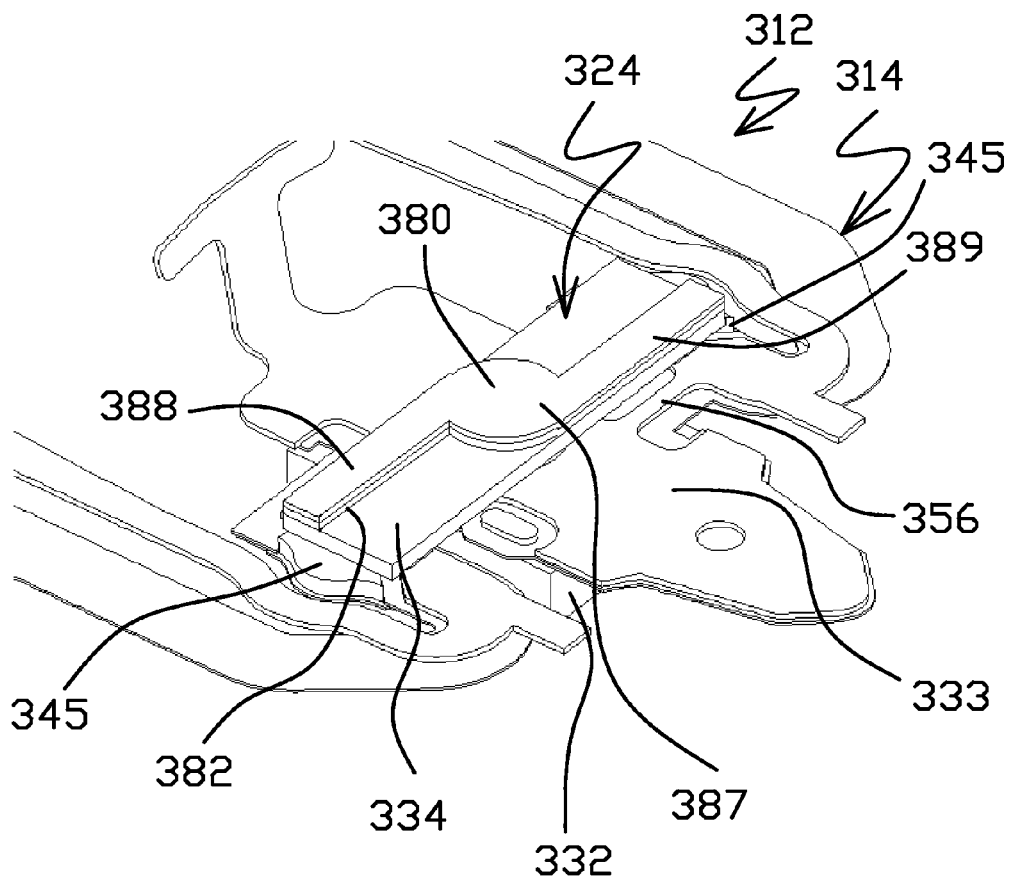

FIG. 22 is an isometric view of the stainless steel side of the distal end of a flexure having a DSA structure with an asymmetric stiffener.

Figure 23:
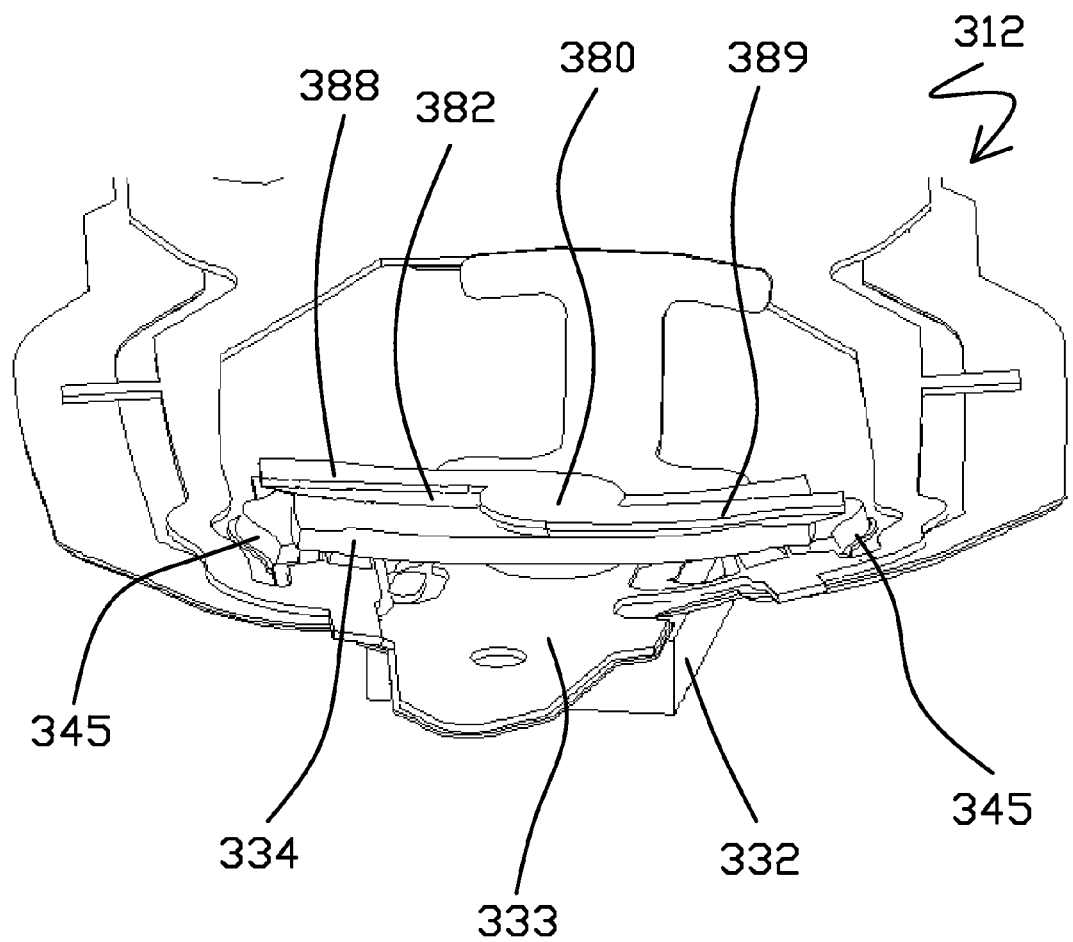

FIG. 23 is an illustration of the flexure shown in FIG. 22 when the motor is actuated into a contracted state.

Figure 24:
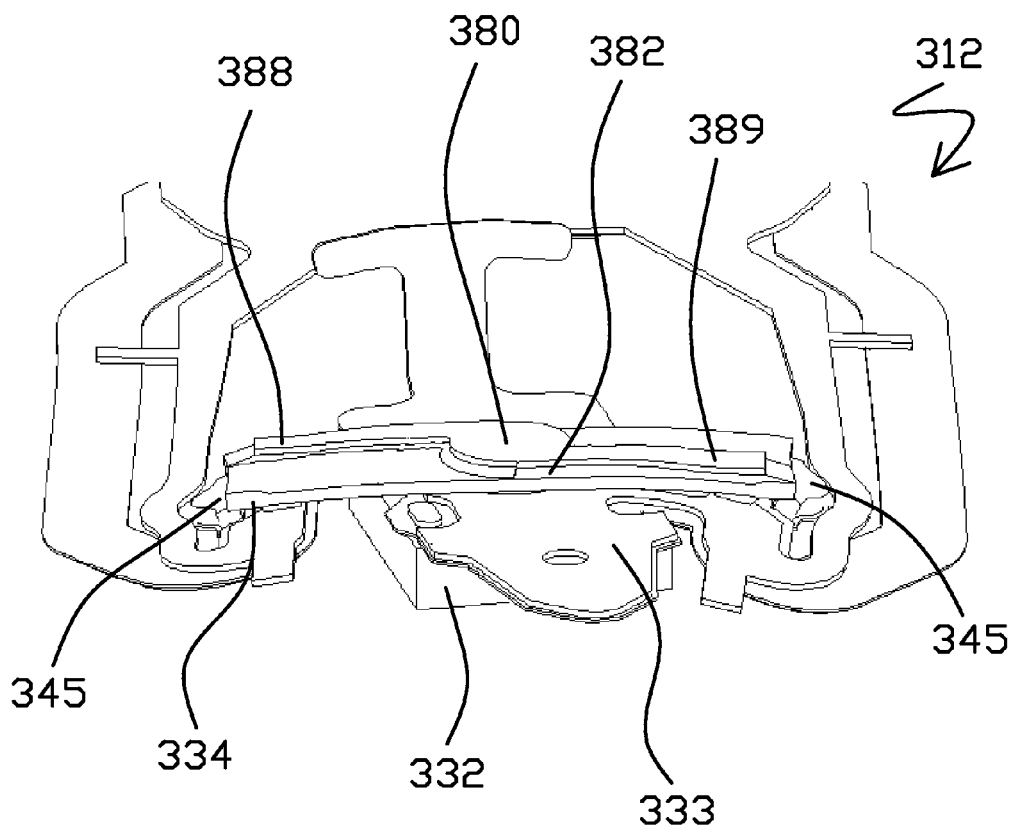

FIG. 24 is an illustration of the flexure shown in FIG. 22 when the motor is actuated into an expanded state.

Figure 25:
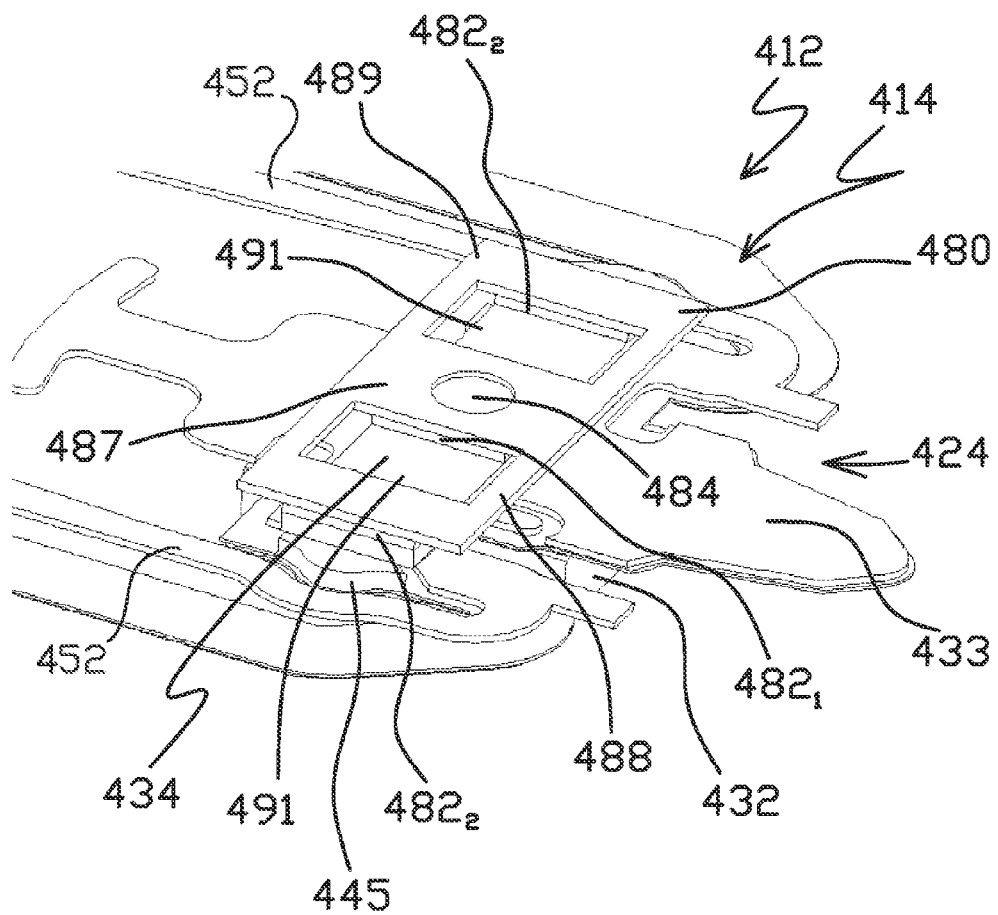

FIG. 25 is an isometric view of the stainless steel side of the distal end of a flexure having a DSA structure with a stiffener and multiple adhesives.

Figure 26:
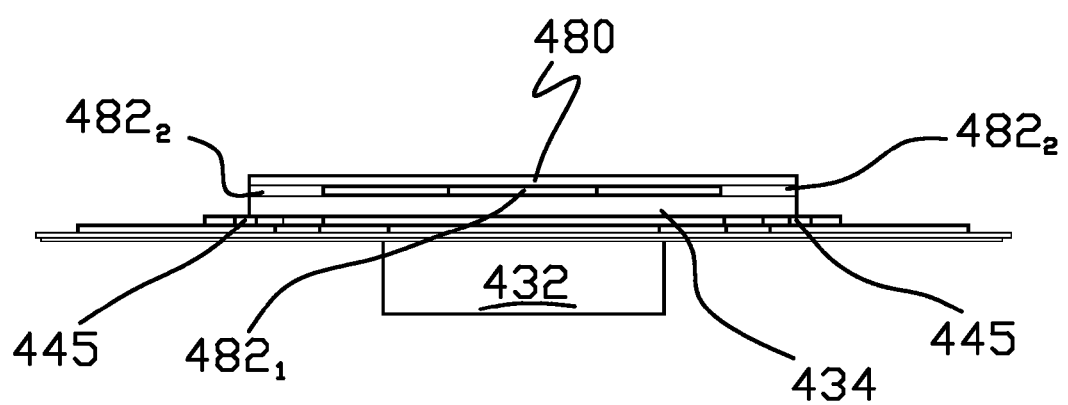

FIG. 26 is a distal end view of the flexure shown in FIG. 25.

Figure 27:
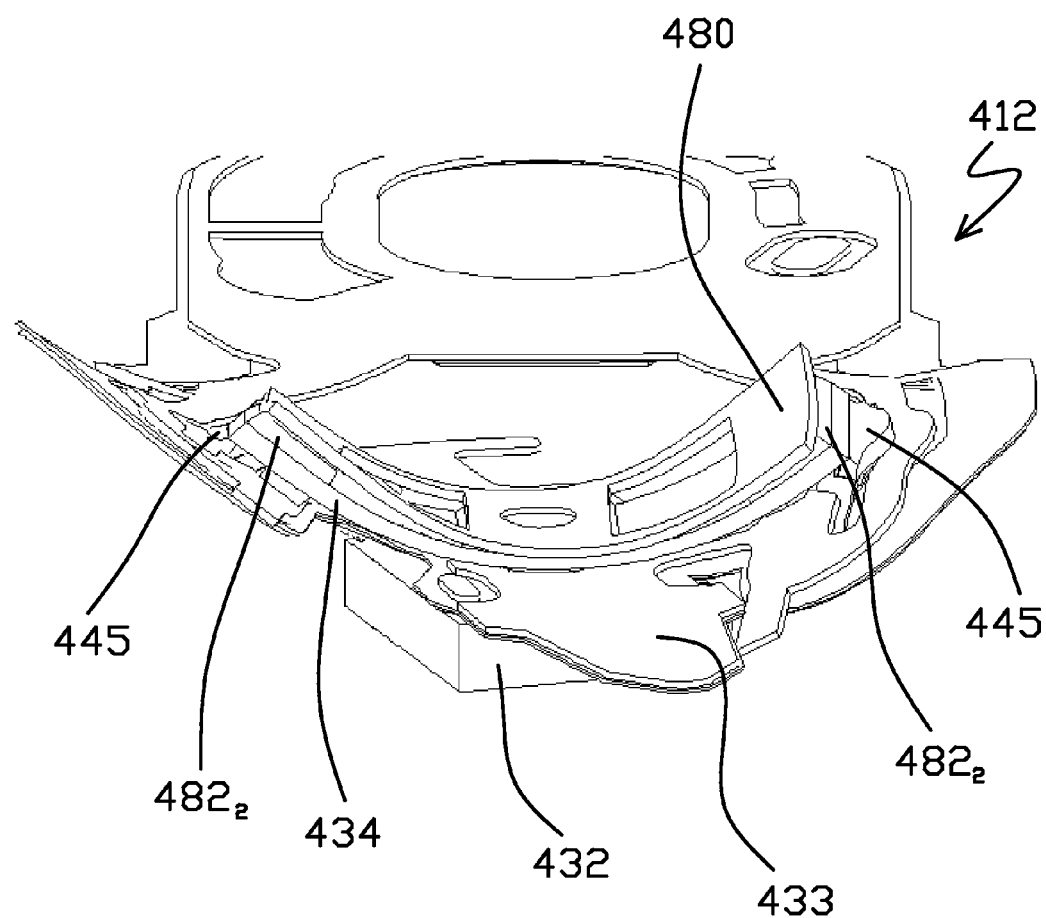

FIG. 27 is an illustration of the flexure shown in FIG. 25 when the motor is actuated into an expanded state.

Figure 28:
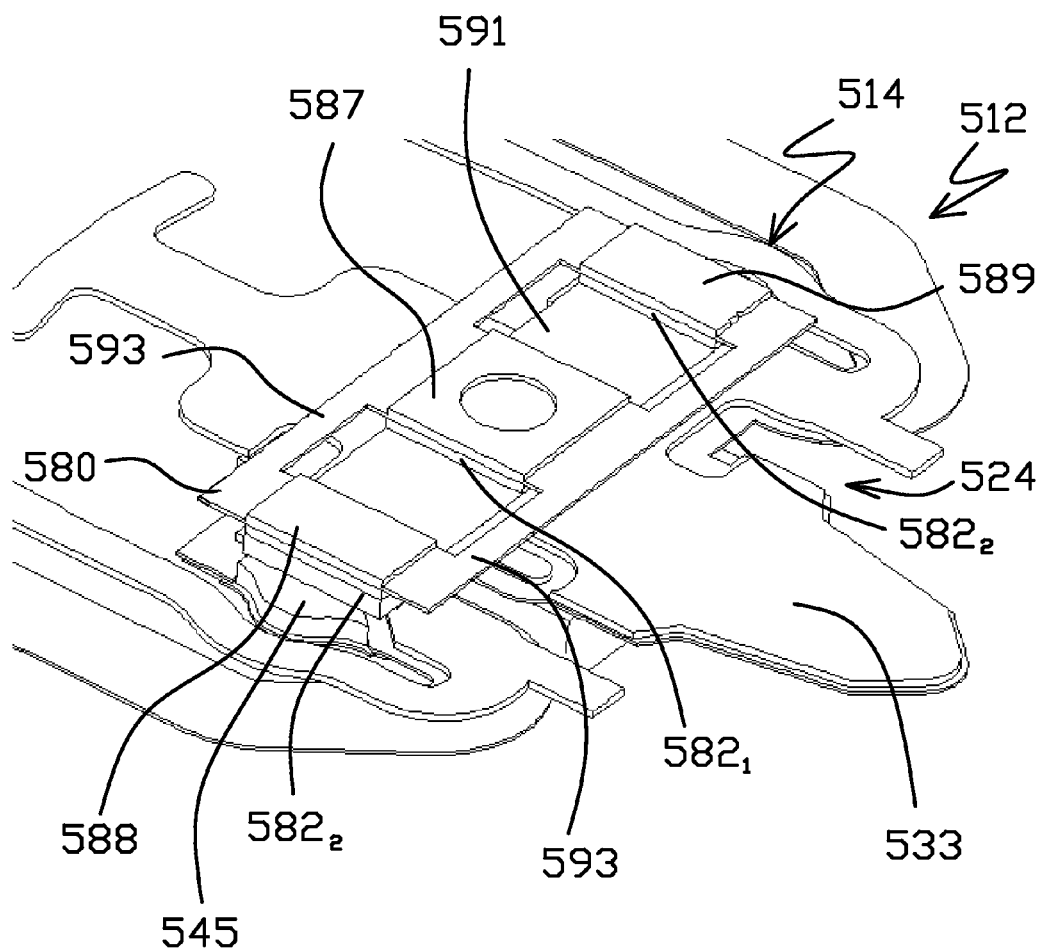

FIG. 28 is an isometric view of the stainless steel side of the distal end of a flexure having a DSA structure with a multiple thickness stiffener attached to the motor with multiple adhesives.

Figure 29:
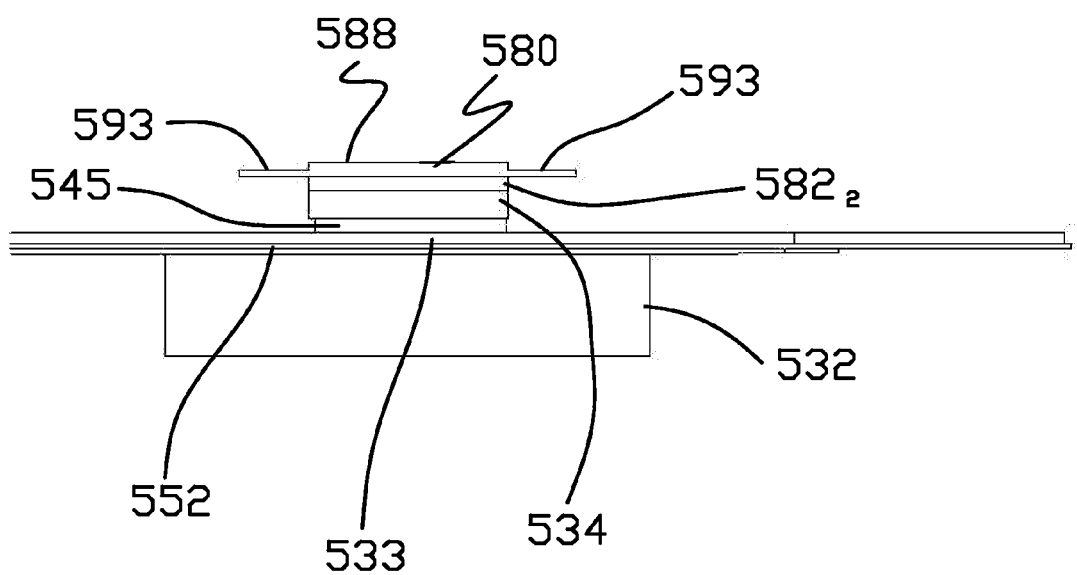

FIG. 29 is a detailed side view of the distal end of the flexure shown in FIG. 28.

Figure 30:
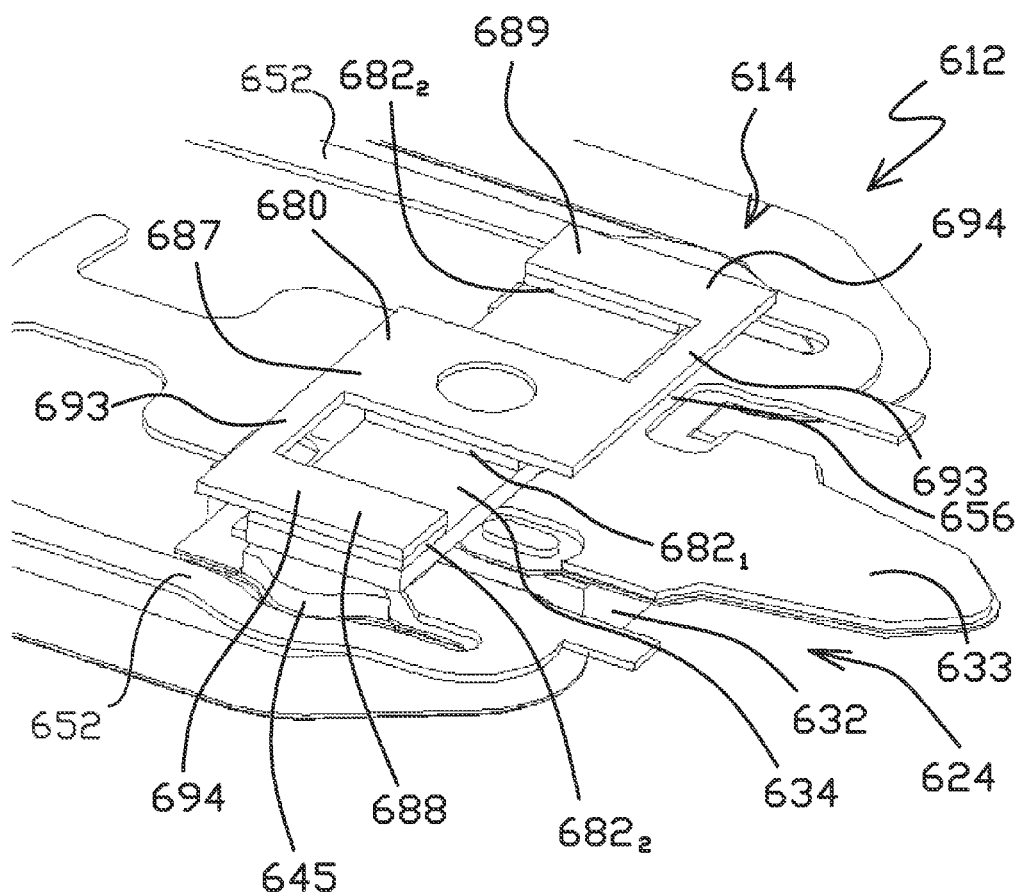

FIG. 30 is an isometric view of the stainless steel side of the distal end of a flexure having a DSA structure with an asymmetric stiffener attached to the motor with multiple adhesives.

Figure 31:
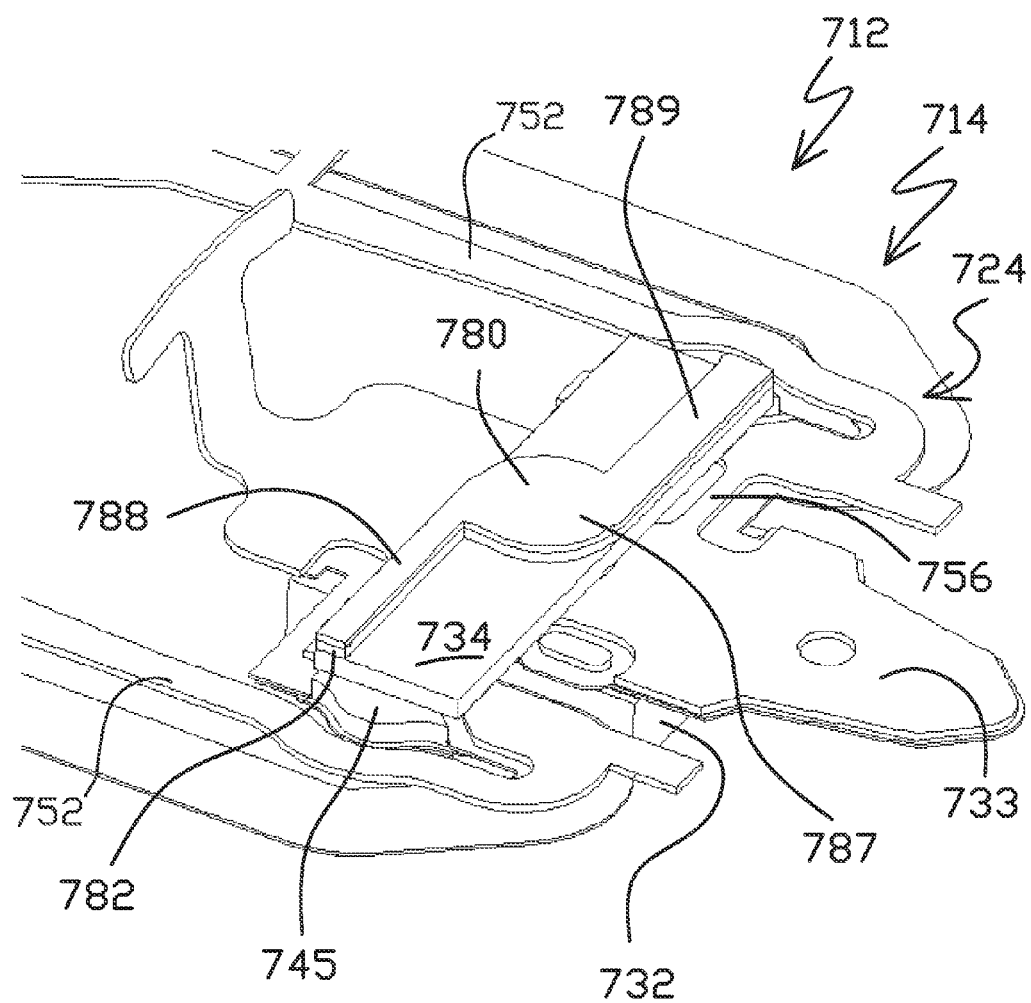

FIG. 31 is an isometric view of the stainless steel side of the distal end of a flexure having a DSA structure with an asymmetric stiffener.

Figure 32A:
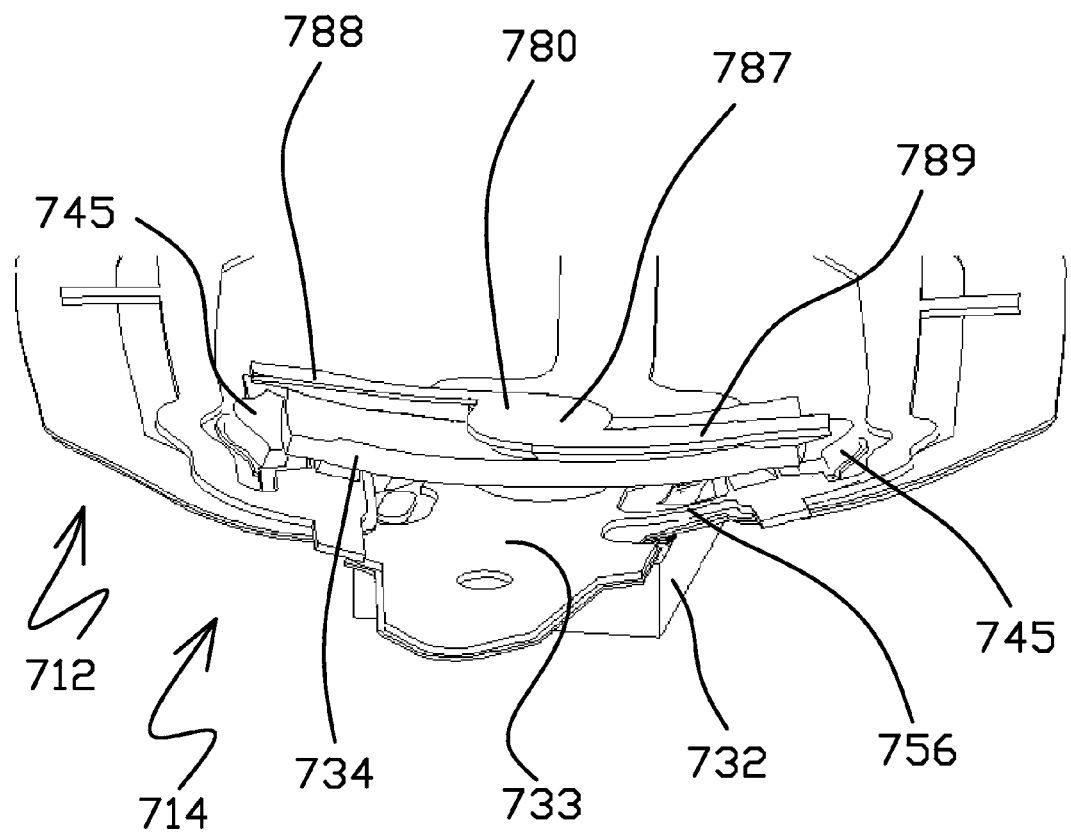
Figure 32B:
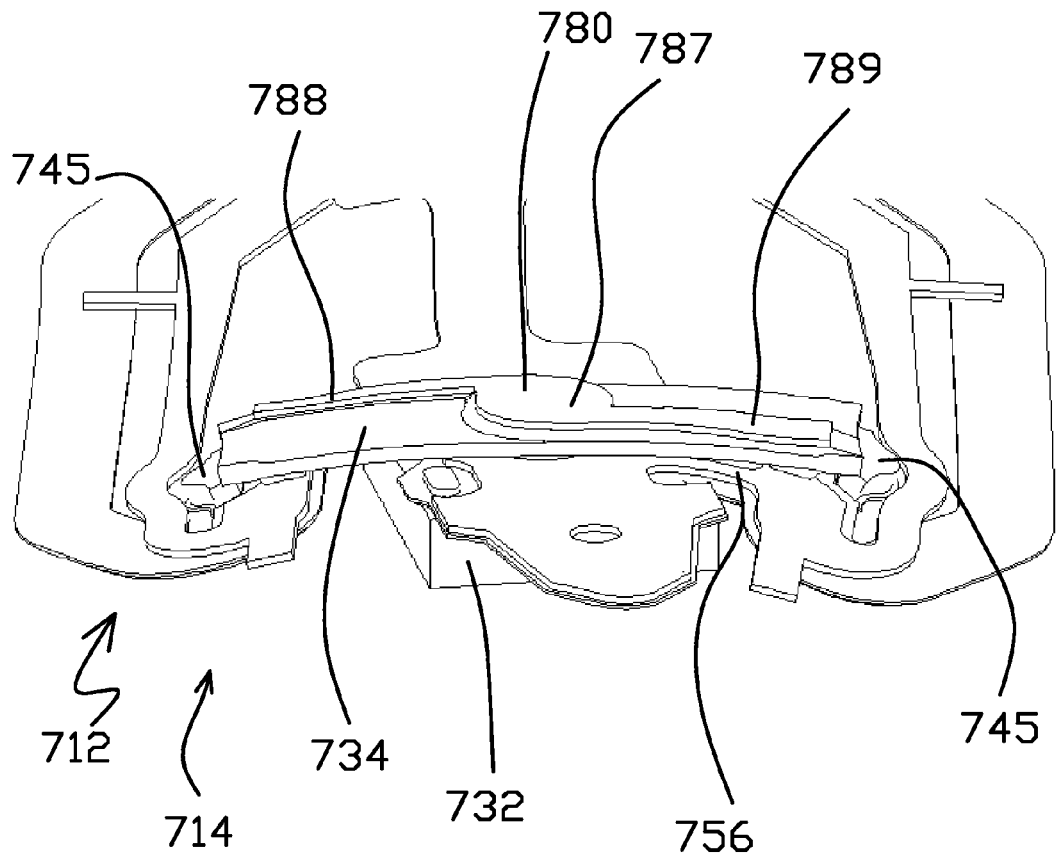

FIGS. 32A and 32B are illustrations of the flexure shown in FIG. 31 when the motor is actuated into contracted and expanded states, respectively.

Figure 33A:
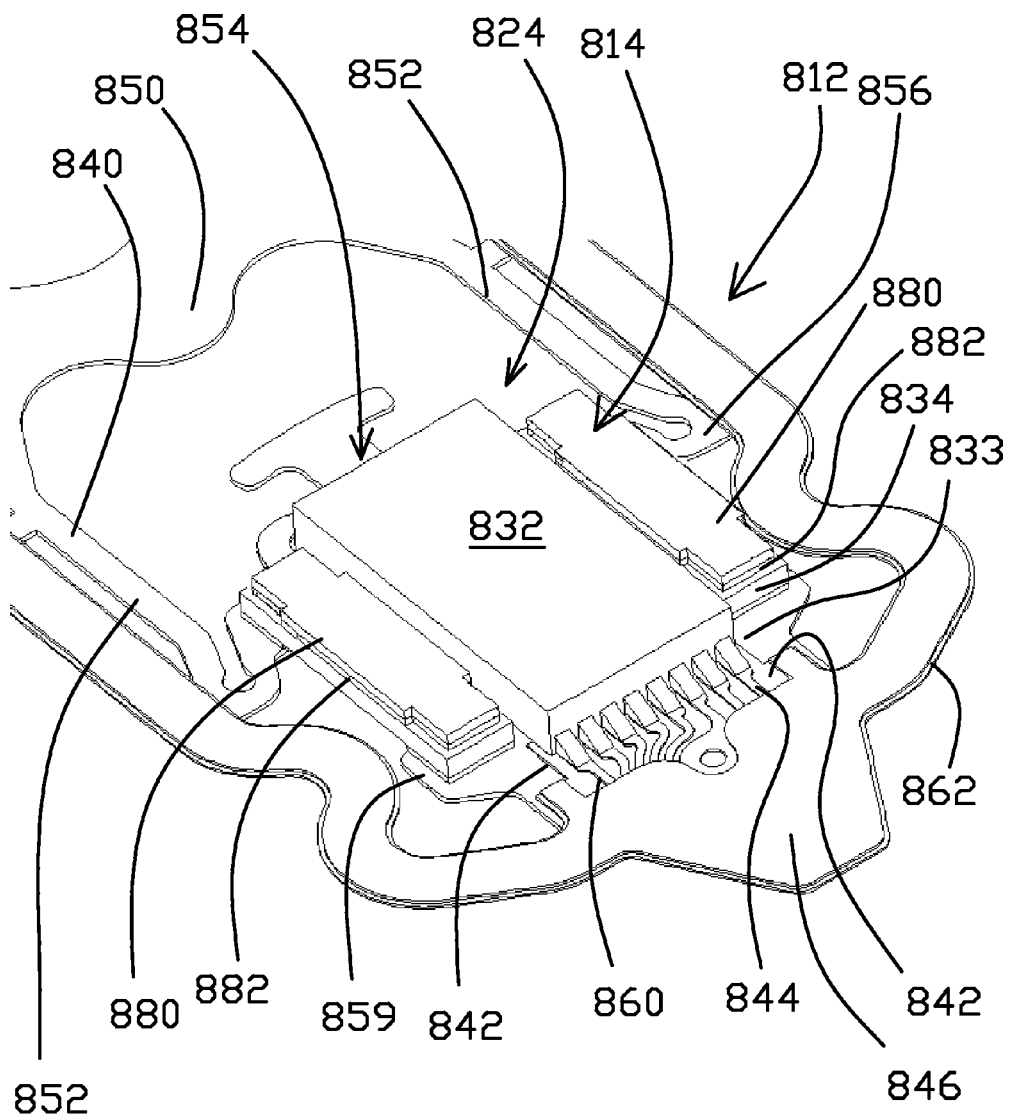

FIG. 33A is an isometric view of the trace side of flexure having a two-motor DSA structure with stiffeners.

Figure 33B:
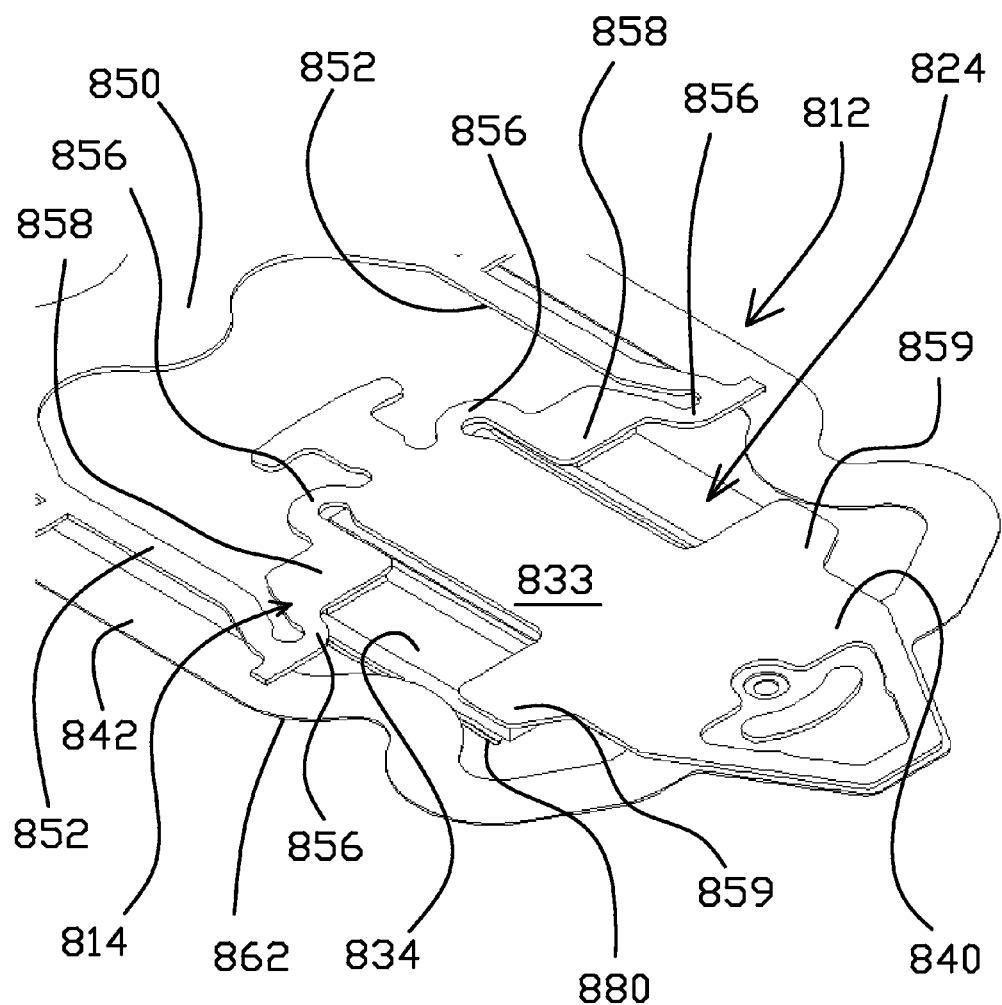

FIG. 33B is an isometric view of the stainless steel side of the flexure shown in FIG. 33A.

Figure 34A:
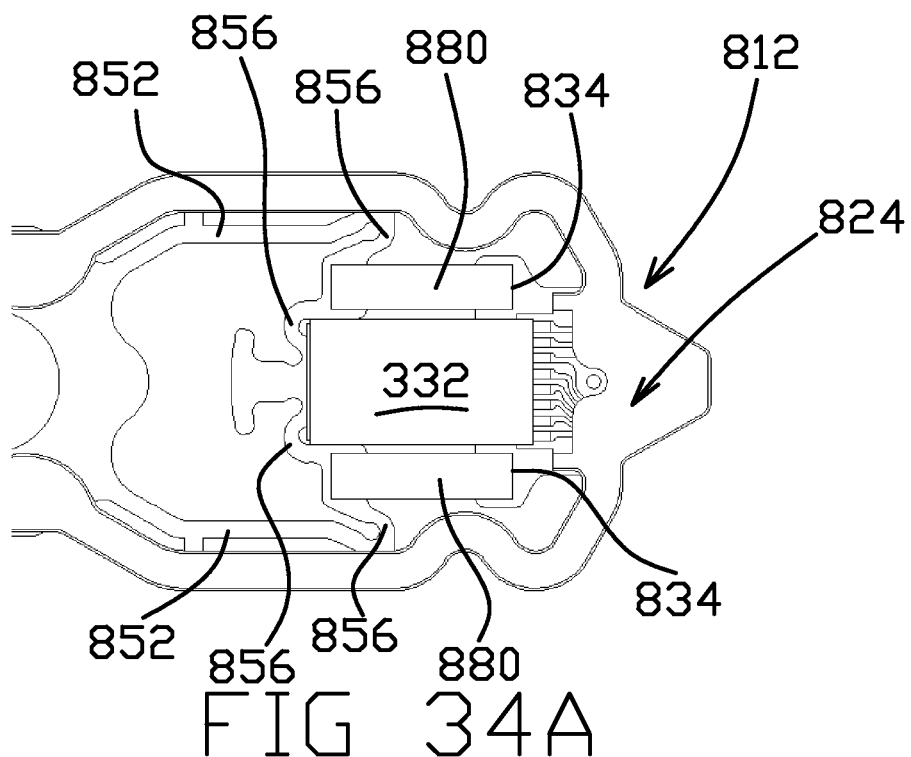

FIG. 34A is a plan views of the trace side of the flexure shown in FIG. 33A in a non-actuated state.

Figure 34B:
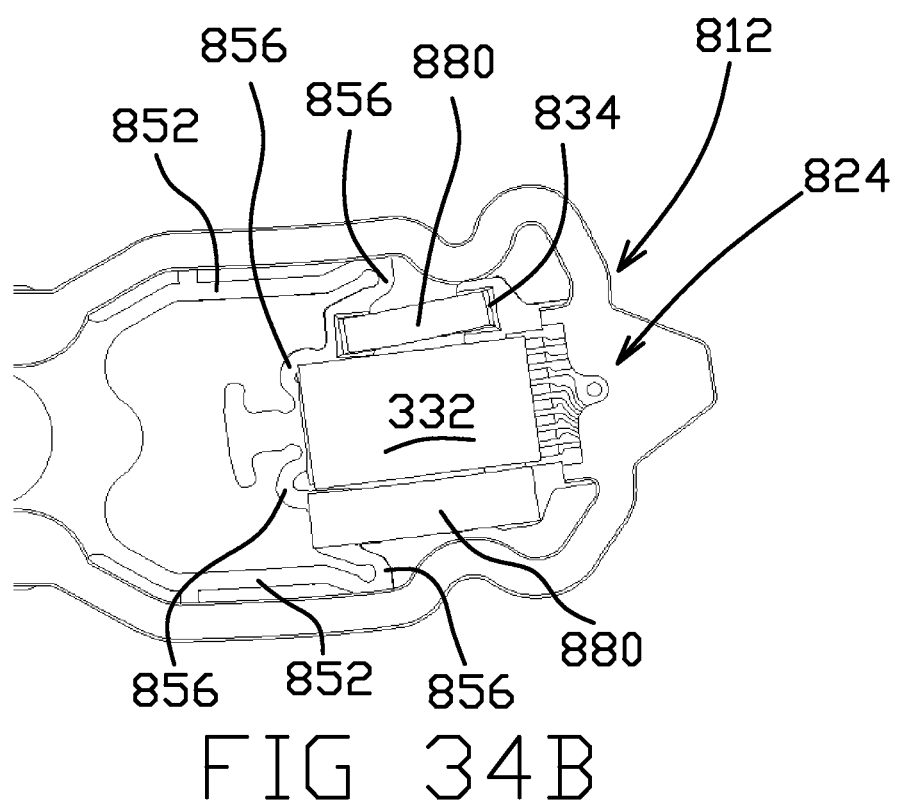

FIG. 34B is a plan views of the trace side of the flexure shown in FIG. 34A in an actuated state.

Figure 35A:
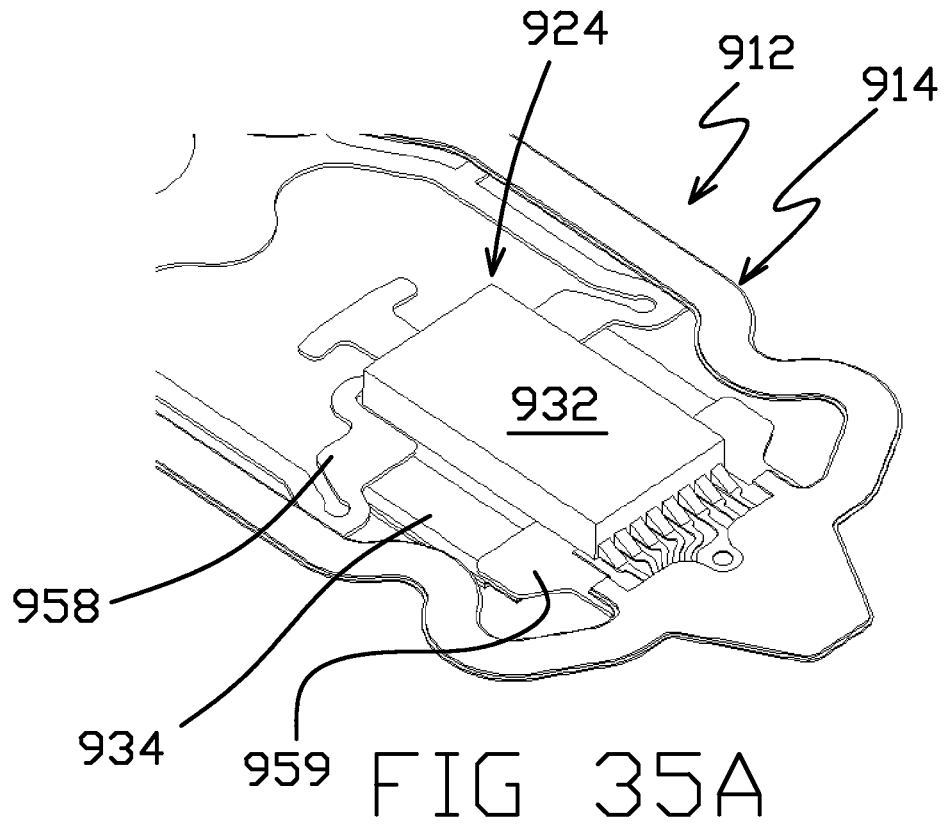

FIG. 35A is an isometric view of the trace side of flexure having a two-motor DSA structure with stiffeners.

Figure 35B:
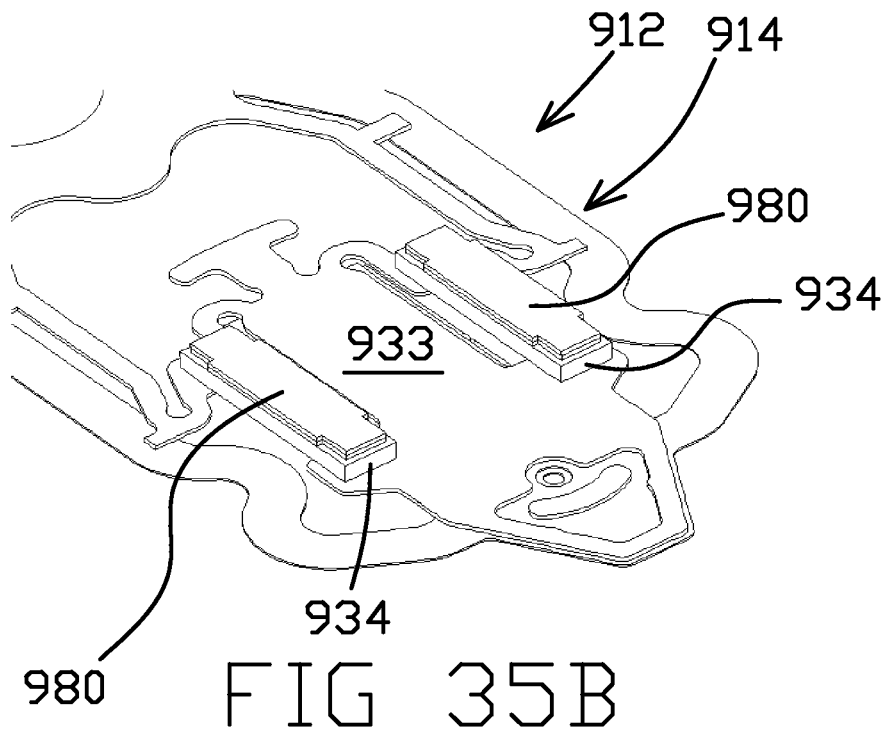

FIG. 35B is an isometric view of the stainless steel side of the flexure shown in FIG. 35A.

Figure 36A:
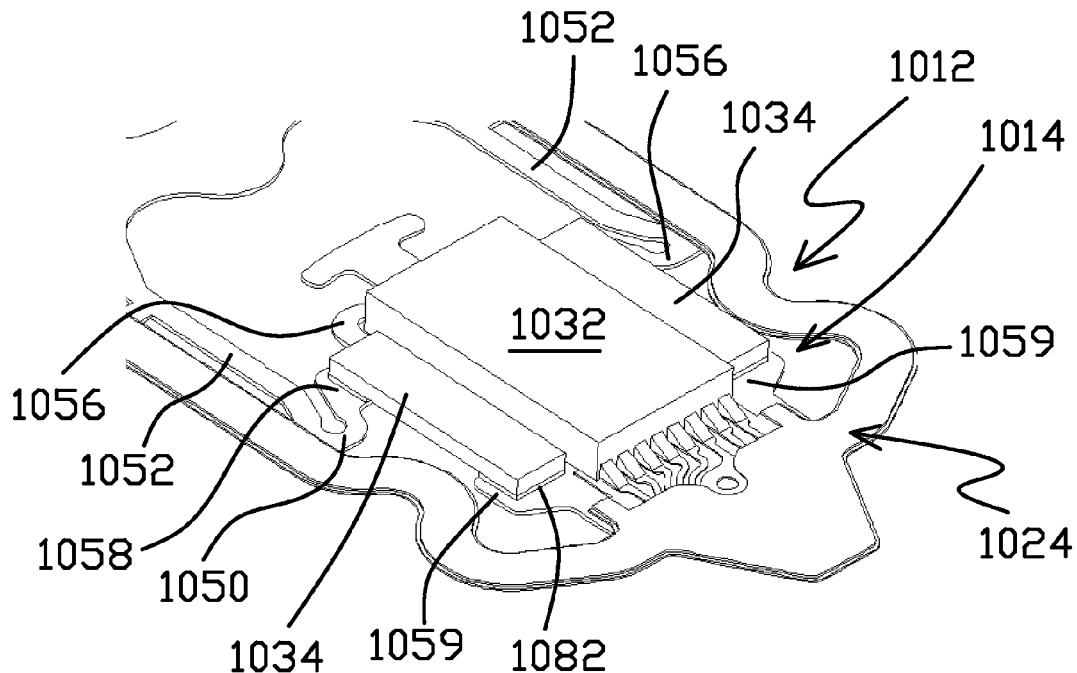

FIG. 36A is an isometric view of the trace side of flexure having a two-motor DSA structure with stiffeners.

Figure 36B:
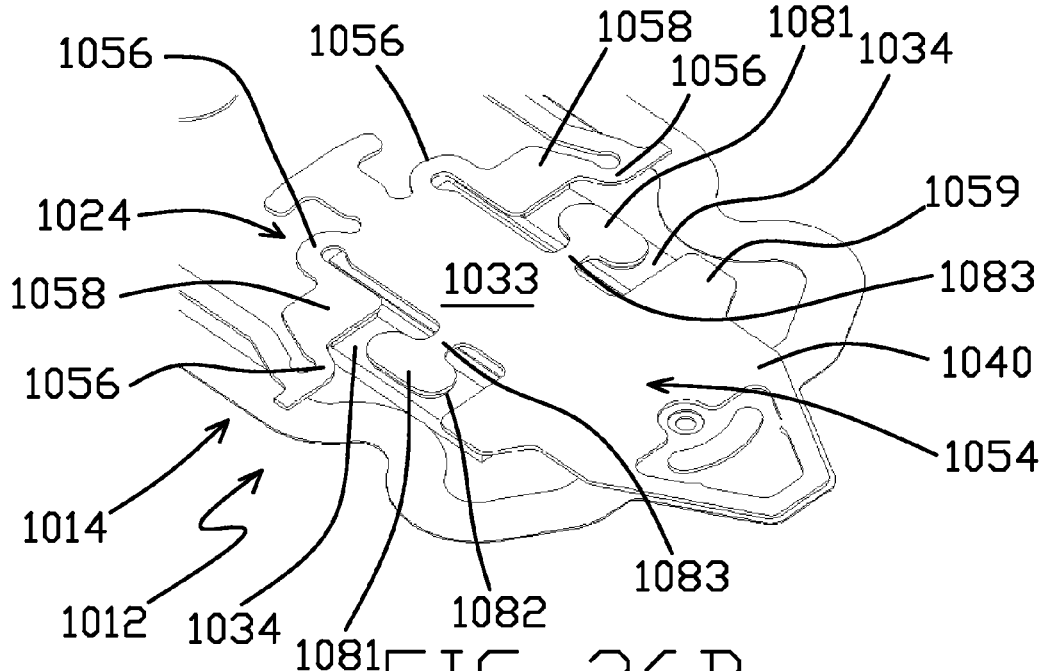

FIG. 36B is an isometric view of the stainless steel side of the flexure shown in FIG. 35A.

Figure 37:
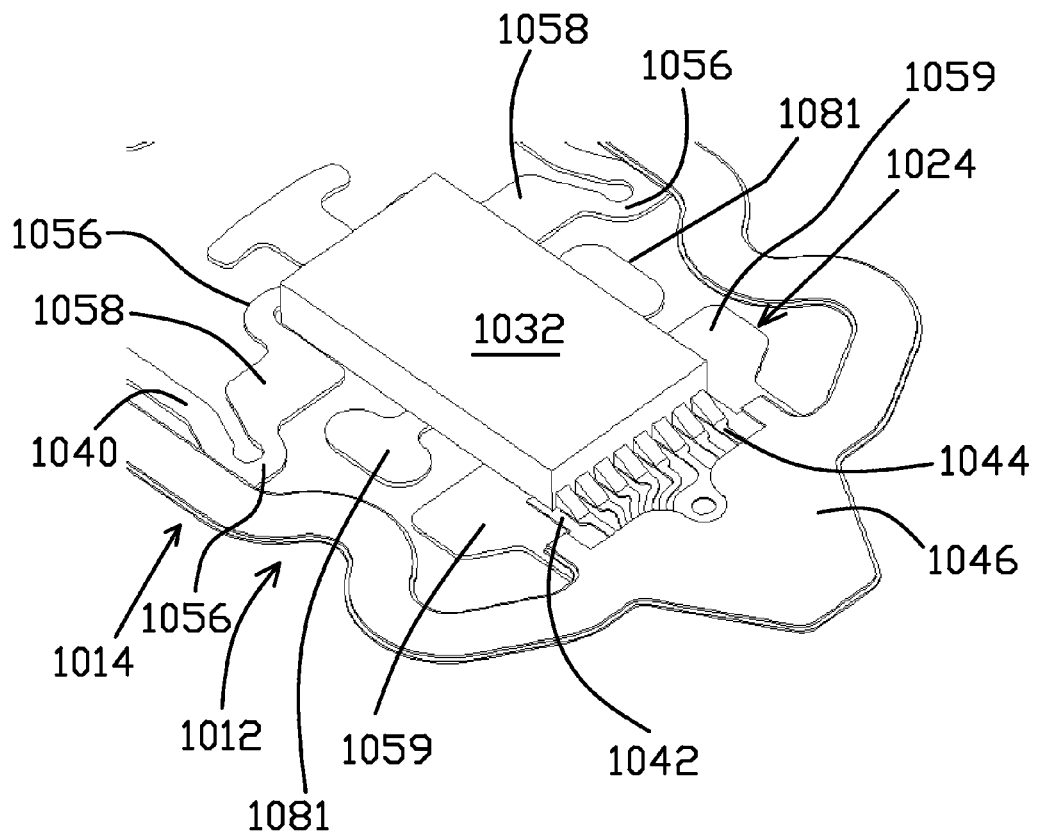

FIG. 37 is an isometric view of the trace side of the flexure shown in FIG. 35A with the motors removed.

Figure 38A:
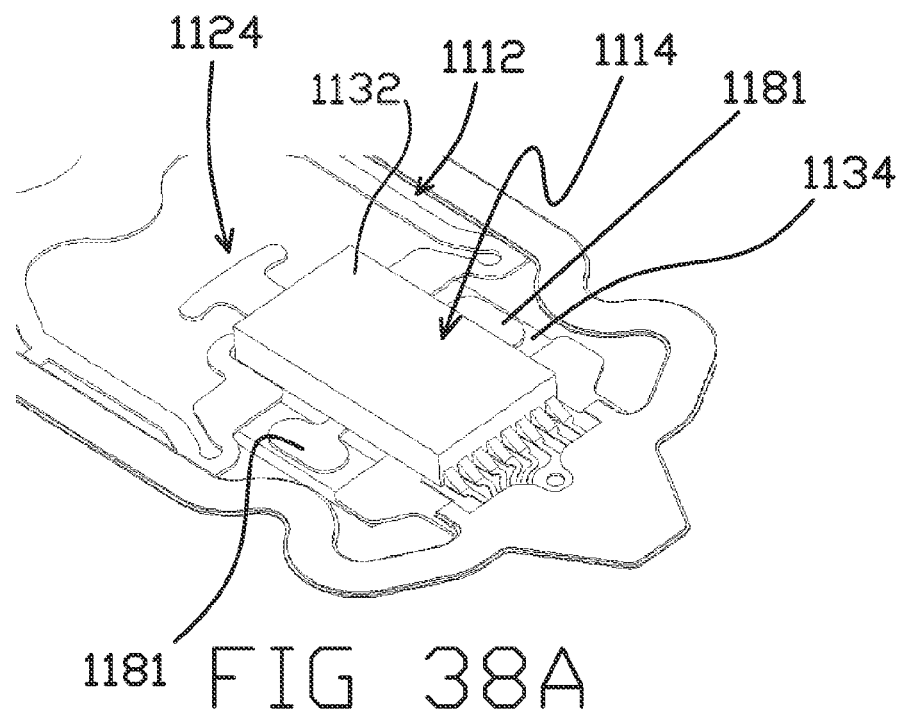

FIG. 38A is an isometric view of the trace side of flexure having a two-motor DSA structure with stiffeners.

Figure 38B:
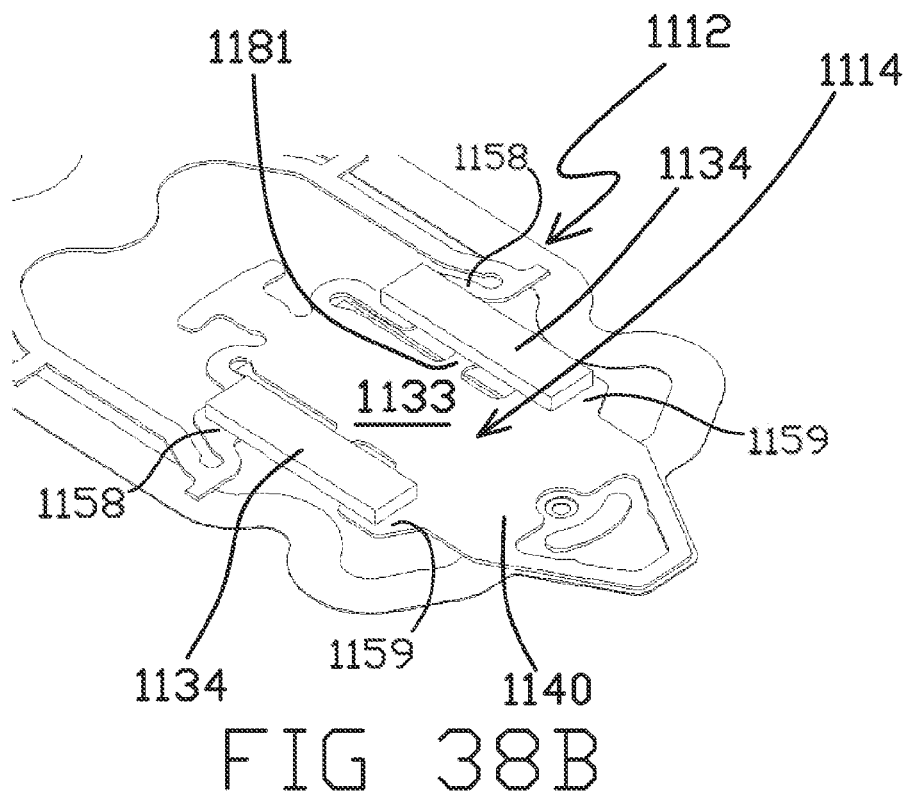

FIG. 38B is an isometric view of the stainless steel side of the flexure shown in FIG. 38A.

DESCRIPTION OF THE INVENTION

Figure 1:
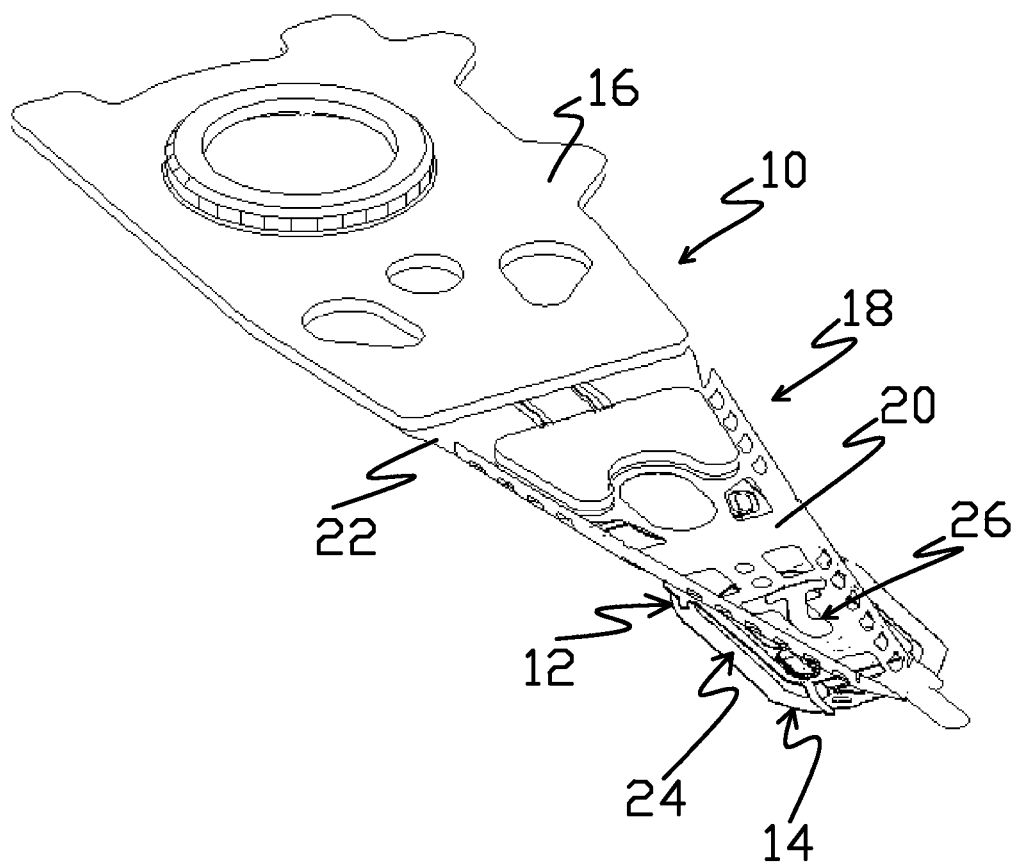
FIG. 1 is an isometric view of the loadbeam side of a suspension having a flexure with a dual stage actuation (DSA) structure.
Figure 2:
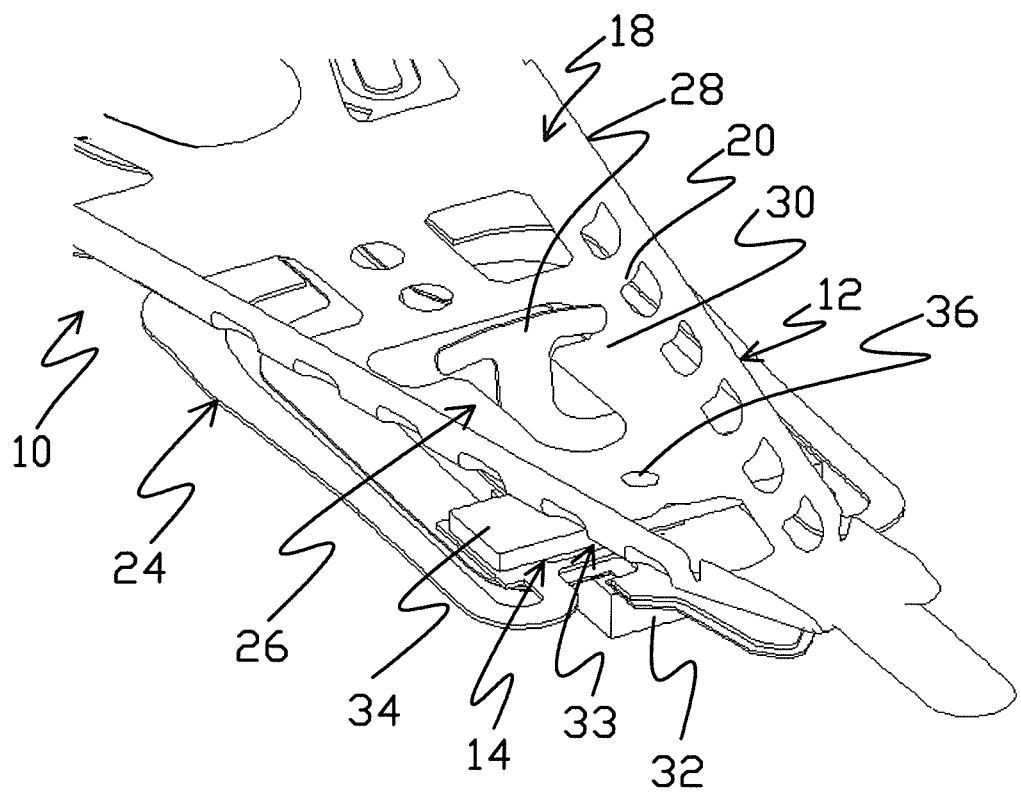
FIG. 2 is an isometric view of the loadbeam side of the distal end of the suspension shown in FIG. 1.
Figure 3:
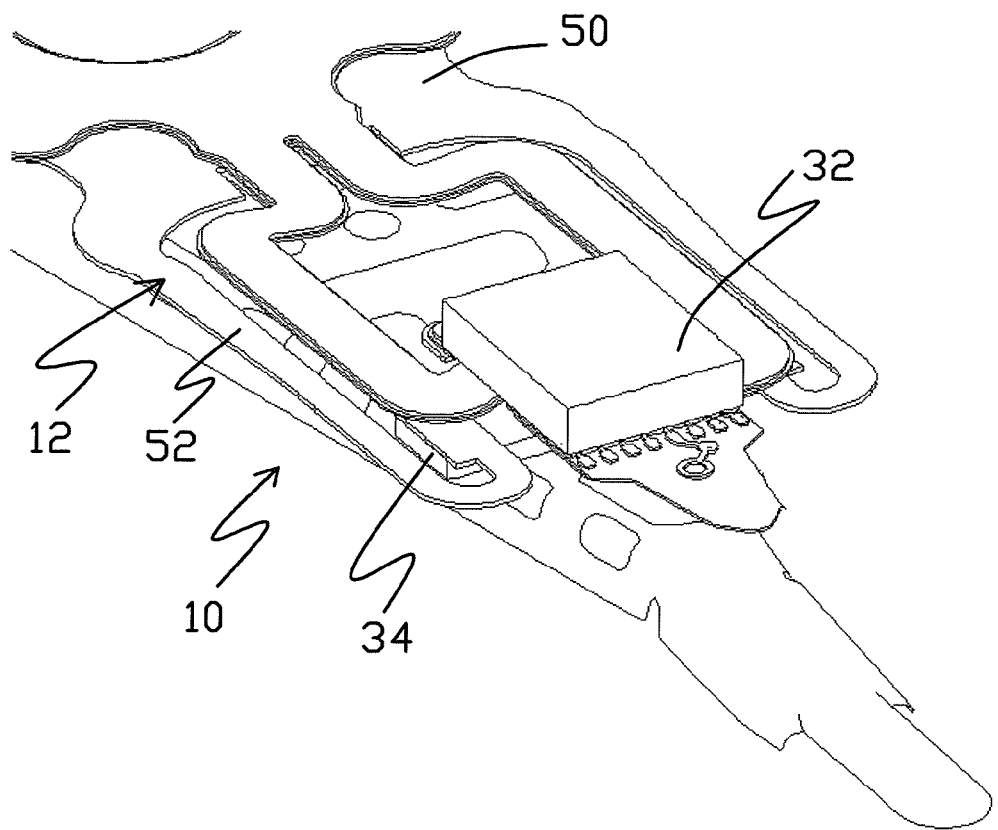
FIG. 3 is an isometric view of the flexure side (i.e., the side opposite that shown in FIG. 2) of the distal end of the suspension shown in FIG. 1.

FIG. 1 is an isometric view of the loadbeam side of a suspension 10 having a flexure 12 with a co-located or gimbal-based dual stage actuation (DSA) structure 14 in accordance with a first embodiment of this disclosure (i.e., a stainless steel side version). FIG. 2 is a detailed isometric view of the distal end of the suspension 10. FIG. 3 is a detailed isometric view of the flexure side of the distal end of the suspension 10, which shows the side opposite that shown in FIG. 2. As shown in FIG. 1, the suspension 10 includes a baseplate 16 as a proximal mounting structure. As further shown in FIG. 1, the suspension 10 includes a loadbeam 18 having a rigid or beam region 20 coupled to the baseplate 16 along a spring or hinge region 22. The loadbeam 18 can be formed from stainless steel.

Flexure 12 includes a gimbal 24 at the distal end of the flexure 12. A DSA structure 14 is located on the gimbal 24, adjacent the distal end of the loadbeam 18. As best shown in FIG. 2, the suspension 10 includes a gimbal limiter 26 comprising a tab 28 configured to engage a stop portion 30 of the loadbeam 18. A head slider 32 is mounted to a slider mounting or tongue 33 of the gimbal 24, on the side of the suspension 10 that is opposite the loadbeam 18. DSA structure 14 includes a motor 34, which is a PZT or other piezoelectric actuator in the illustrated embodiment, mounted to the gimbal 24 of the flexure 12 between the loadbeam 18 and the head slider 32. As described in greater detail below, in response to electrical drive signals applied to the motor 34, the motor drives portions of the gimbal 24, including the tongue 33 and slider 32, about a generally transverse tracking axis. Proximal and distal, as used herein, refers to the relative direction along the longitudinal axis of the suspension while lateral refers to the left and/or right directions orthogonal to the longitudinal axis of the suspension. For example, the baseplate 16 is proximal of the loadbeam 18 while opposite ends of the motor 34 extend laterally.

Figure 4A:
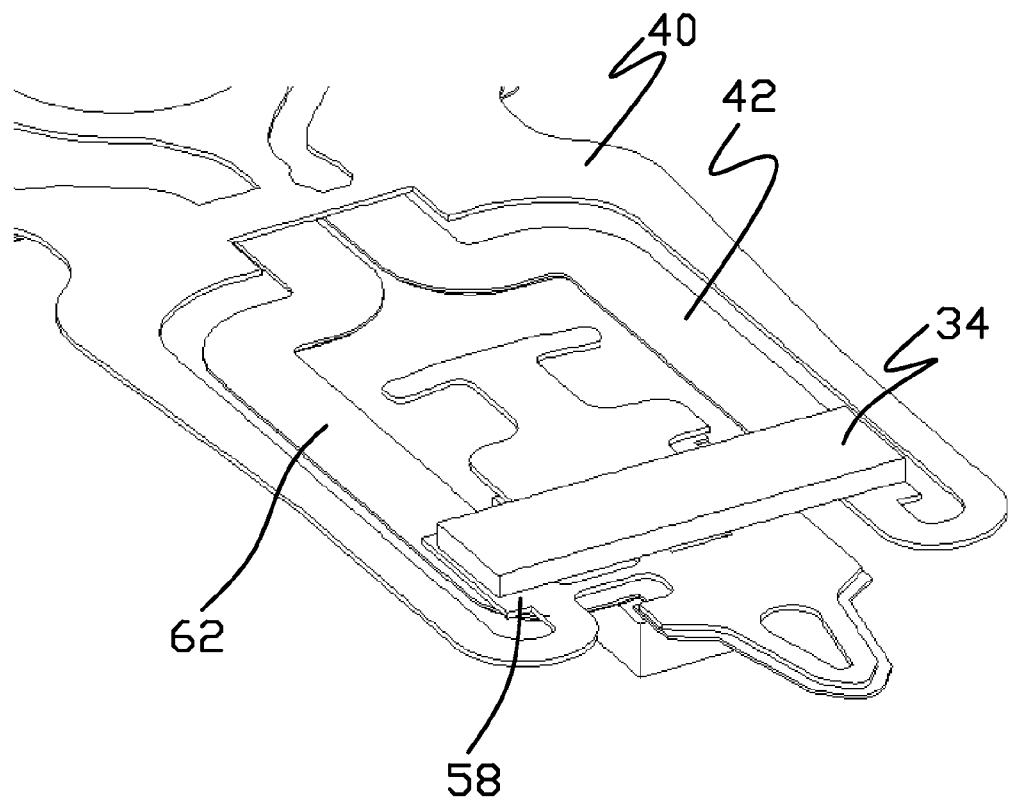
FIG. 4A is an isometric view of the stainless steel side of the flexure shown in FIG. 1.
Figure 4B:
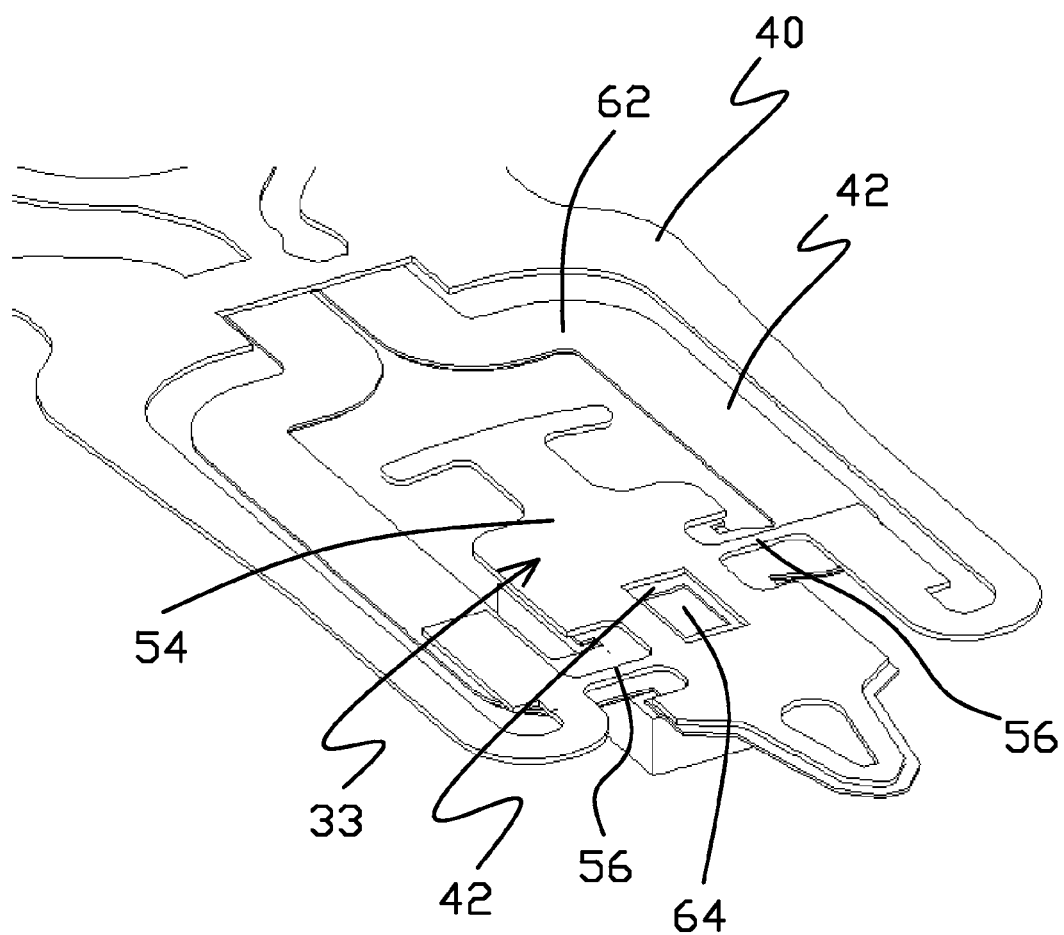
FIG. 4B is the view of FIG. 4A but with the piezoelectric motor removed.

FIGS. 4A and 4B are isometric views of the stainless steel side of the flexure 12 and DSA structure 14 shown in FIG. 1. The motor 34 is not shown in FIG. 4B to show further details of the tongue 33. FIGS. 5A-5F are isometric views of the trace side (i.e., the side opposite that shown in FIGS. 4A and 4B) of the flexure 12 and DSA structure 14. Specifically, FIGS. 5A-5F show the various layers that comprise the flexure 12 and DSA structure 14. FIG. 5B is the drawing of FIG. 5A but with the head slider 32 removed to further show details of the tongue 33. FIG. 5C is the drawing of FIG. 5B but with a polyimide coverlay 46 removed to reveal a conductive material layer 44 including traces 60 and other structures formed in the conductive material layer that is otherwise underneath the polyimide coverlay 46. FIG. 5D is the drawing of FIG. 5C but with the conductive material layer 44 removed to more fully reveal the dielectric layer 42 that is otherwise underneath the conductive material layer 44. FIG. 5E is the drawing of FIG. 5D but with the dielectric layer 42 removed to show only the stainless steel layer 40 and the motor 34. FIG. 5F is the drawing of FIG. 5E but with the motor 34 removed to illustrate only the stainless steel layer 40 of the flexure 12. It will be understood that the stainless steel layer 40 could alternatively be formed from another metal or rigid material.

Figure 8A:
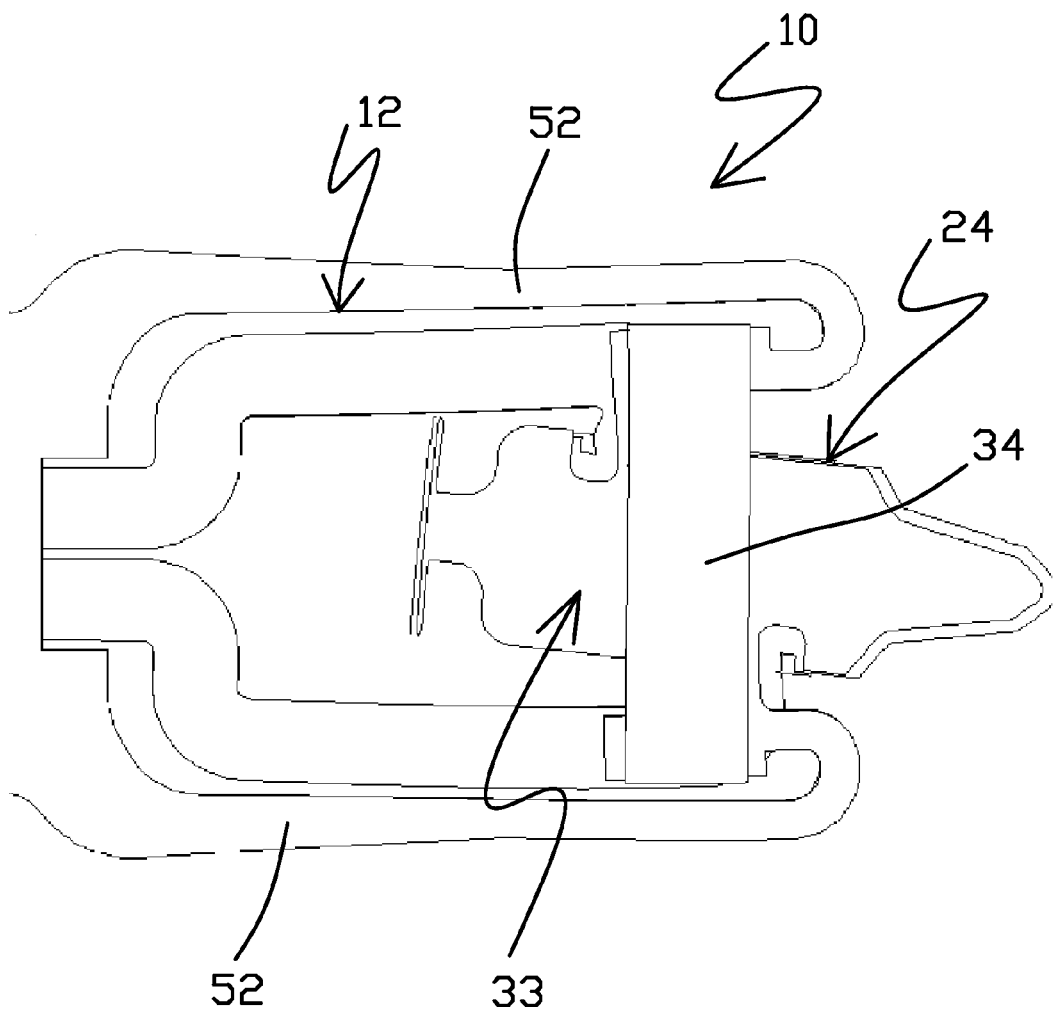
FIGS. 8A-8C are plan views of the stainless steel side of the flexure shown in FIG. 1, illustrating the operation of the DSA structure.
Figure 8B:
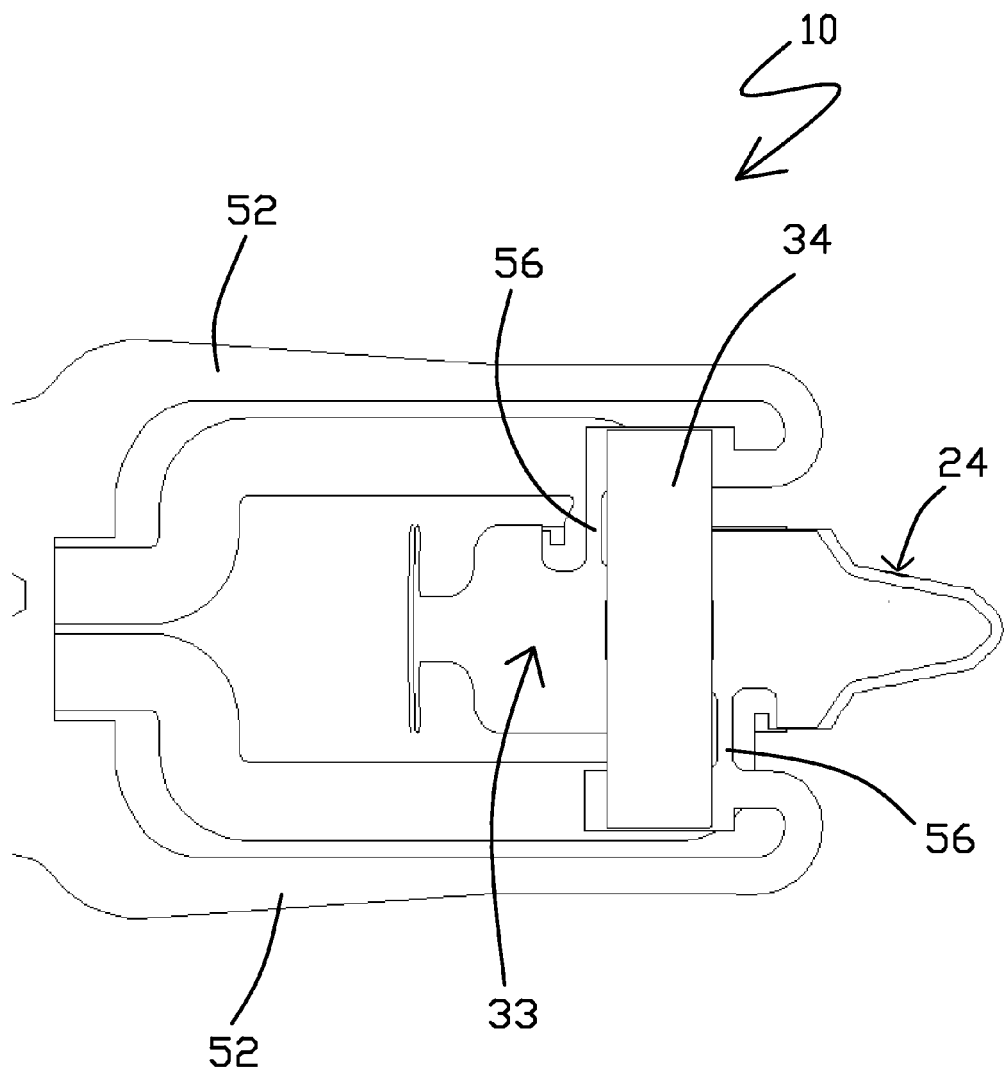

As shown in FIGS. 5A-5F, the flexure 12 is formed from overlaying spring metal such as stainless steel layer 40, polyimide or other dielectric layer 42, copper or other conductive material layer 44 and polyimide coverlay 46. The dielectric layer 42 generally electrically isolates structures formed in the conductive material layer 44 from adjacent portions of the stainless steel layer 40. Coverlay 46 generally covers and protects the structures formed in the conductive material layer 44. The gimbal 24 includes the spring arms 52 and the tongue 33. The spring arms 52 extend from the base portion 50. The slider mounting 54, which is part of the tongue 33, is supported between the spring arms 52 by a pair of struts 56 that extend from support regions 58 on the distal end portions of the spring arms 52. The slider 32 can be attached to the tongue 33 along the slider mounting 54 (e.g., by adhesive). In some embodiments, the pair of struts 56 is the only part of the stainless steel layer 40 that connects or otherwise supports the tongue 33 between the spring arms 52. Specifically, the struts 56 can be the only structural linkage between the spring arms 52 and the tongue 33. Also, the struts 56, in connecting with the tongue 33, can be the only part of the stainless steel layer 40 that connects between the spring arms 52 distal of the base portion 50. As shown, the struts 56 are offset from one another with respect to the longitudinal axis of the flexure 12 or otherwise configured so as to provide for rotational movement of the slider mounting 54 about the tracking axis with respect to the spring arms 52. As best shown in FIG. 8B (further discussed herein), one strut 56 of the pair of struts 56 is located proximally of the motor 34 while the other strut 56 of the pair of struts 56 is located distally of the motor 34 such that the motor 34 is between the pair of struts 56. Each strut 56 has a longitudinal axis that extends generally perpendicular with respect to the longitudinal axis of the suspension 10. The longitudinal axes of the struts 56 extend parallel but do not intersect or otherwise overlap with each other when the struts 56 are not stressed (e.g., not bent). As shown in FIG. 5F, the struts 56 can each be the narrowest part of the stainless steel layer 40 in an X-Y plane (as viewed from the overhead perspective of FIG. 8B) while the thickness of the stainless steel layer 40 can be consistent along the flexure 12.

As perhaps best shown in FIGS. 4A and 5E, the opposite ends of the motor 34 are attached (e.g., by structural adhesive such as epoxy) to the support regions 58 of the spring arms 52. In this way, the support regions 58 can serve as motor mounting pads. Portions of the dielectric layer 42 extend underneath the struts 56 in FIG. 4B. As shown in FIG. 5C, a plurality of traces 60 formed in the conductive material layer 44 extend between the base portion 50 and the tongue 33 along the flexible circuit 62 formed in the dielectric layer 42. A number of the traces 60 terminate at locations on a distal region on the tongue 33 and are configured to be electrically attached to terminals of the read/write head (not shown) on the slider 32. Other traces 60 terminate at a contact such as copper pad 64 on the tongue 33, below the motor 34. In the illustrated embodiment, the copper pad 64 is located generally centrally between the spring arms 52. As perhaps best shown in FIG. 4B, the dielectric layer 42 has an opening over the pad 64. A structural and electrical connection, e.g., using conductive adhesive, is made between the copper pad 64 and an electrical terminal on the motor 34. Another electrical connection to a terminal on the motor 34 (e.g., a ground terminal) is made through the dimple 36 (i.e., the dimple 36 is in electrical contact with the terminal on the motor 34). In other embodiments, the electrical connections to the motor 34 can be made by other approaches and structures.

Figure 5A:
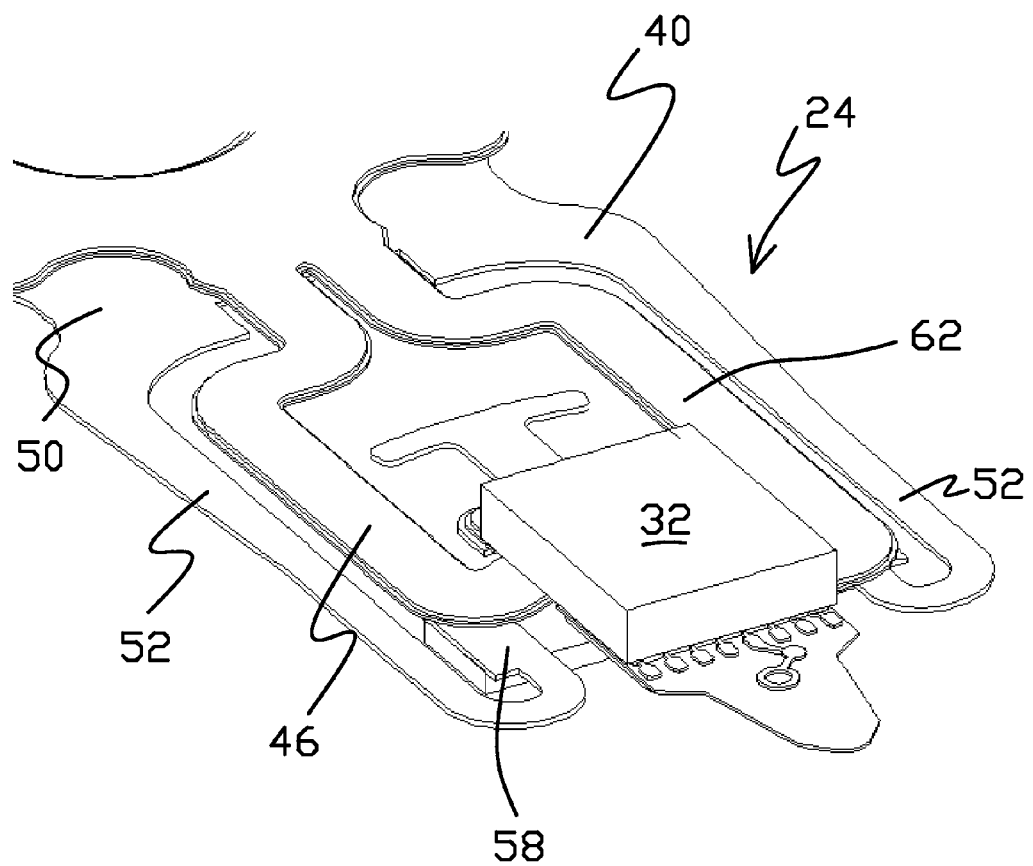
FIG. 5A is an isometric view of the trace side (i.e., the side opposite that shown in FIG. 4A) of the flexure shown in FIG. 1.
Figure 5B:
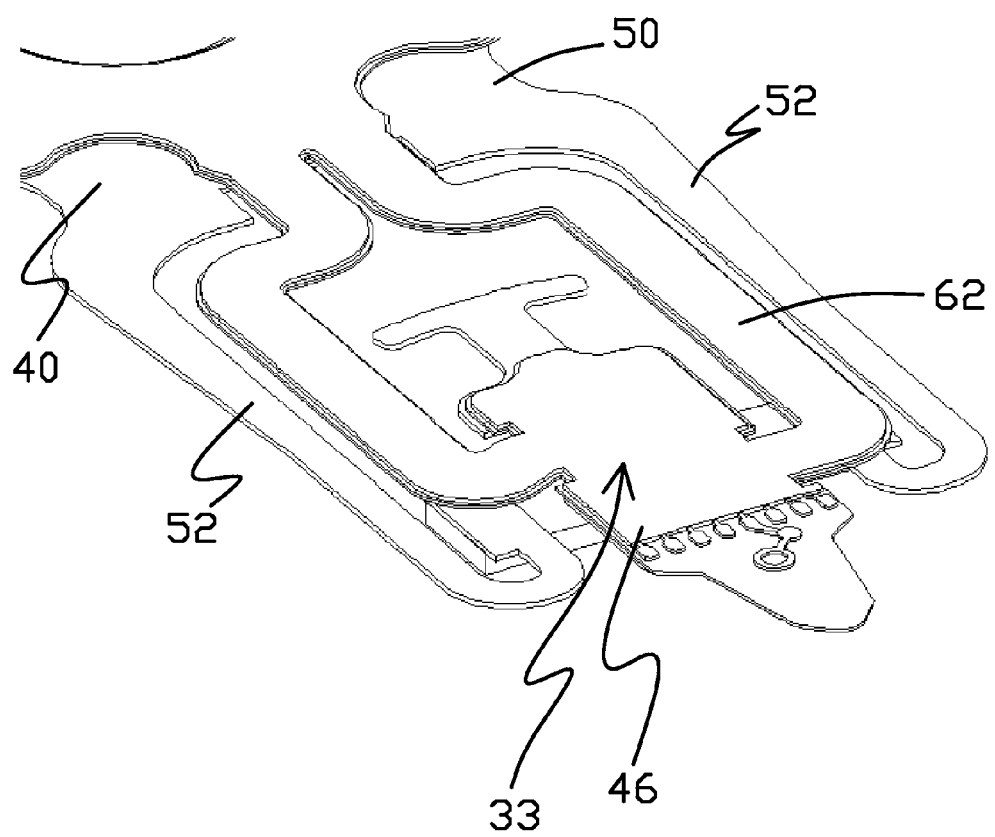
FIG. 5B is the view of FIG. 5A but with the head slider removed.
Figure 5C:
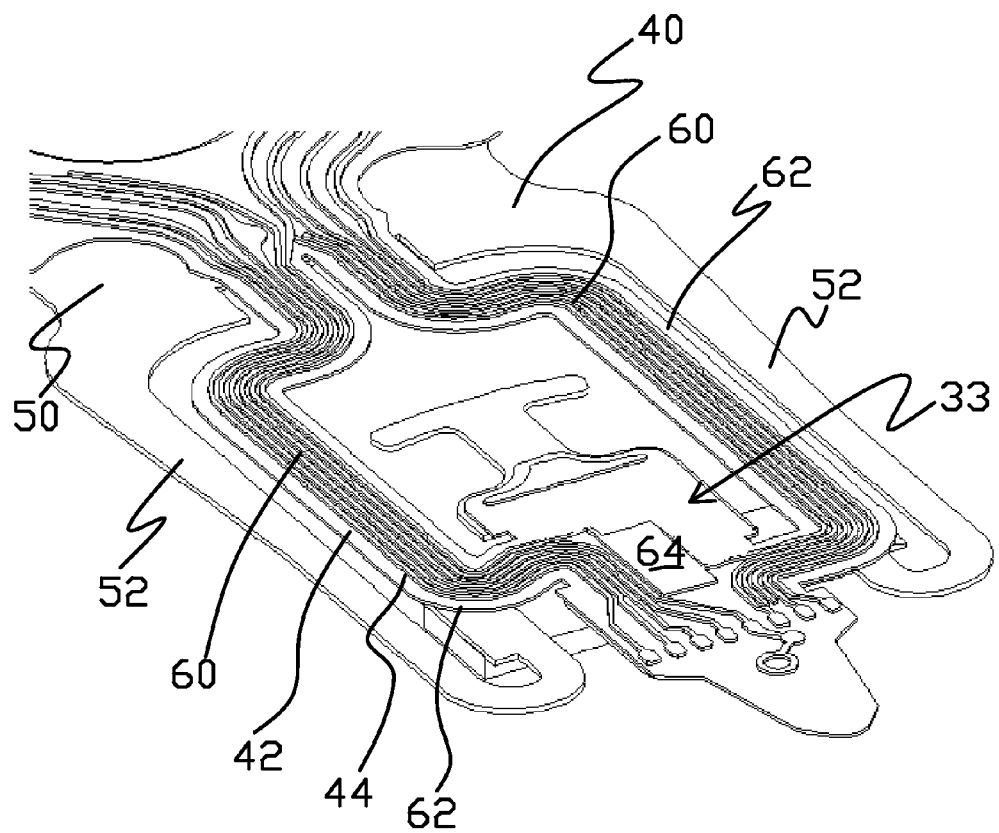
FIG. 5C is the view of FIG. 5B but with the polyimide coverlay removed.
Figure 5D:
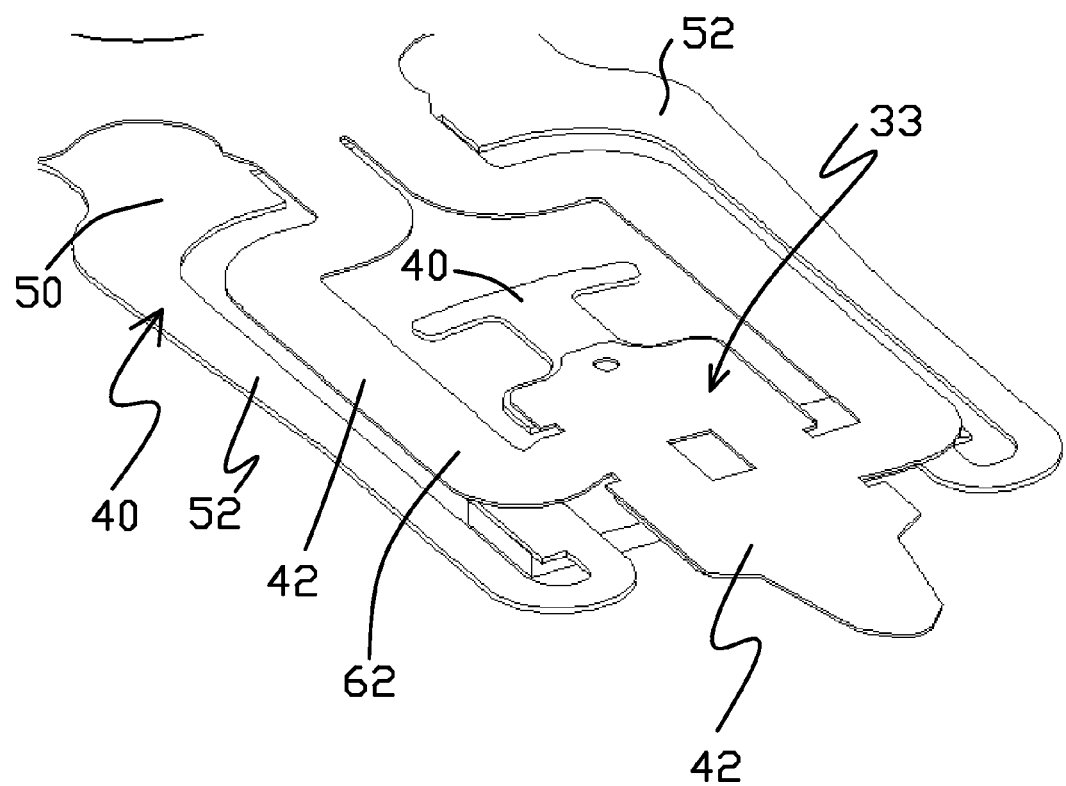
FIG. 5D is the view of FIG. 5C but with the conductive material layer removed.
Figure 5E:
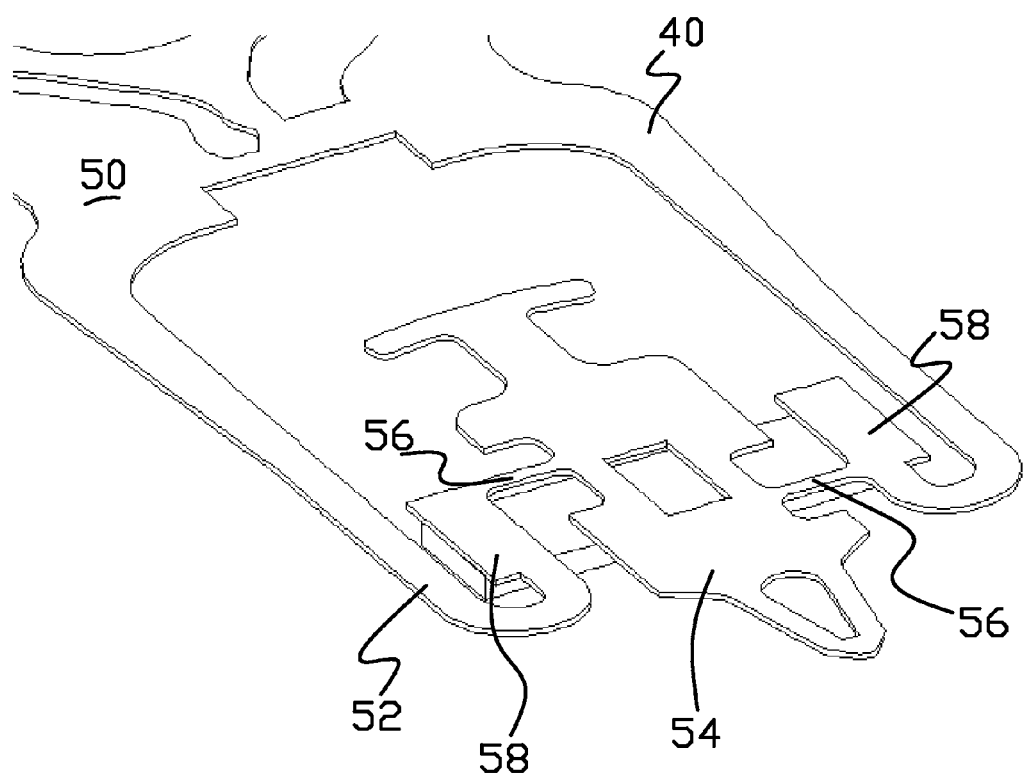
FIG. 5E is the view of FIG. 5D but with the dielectric material layer removed.
Figure 5F:
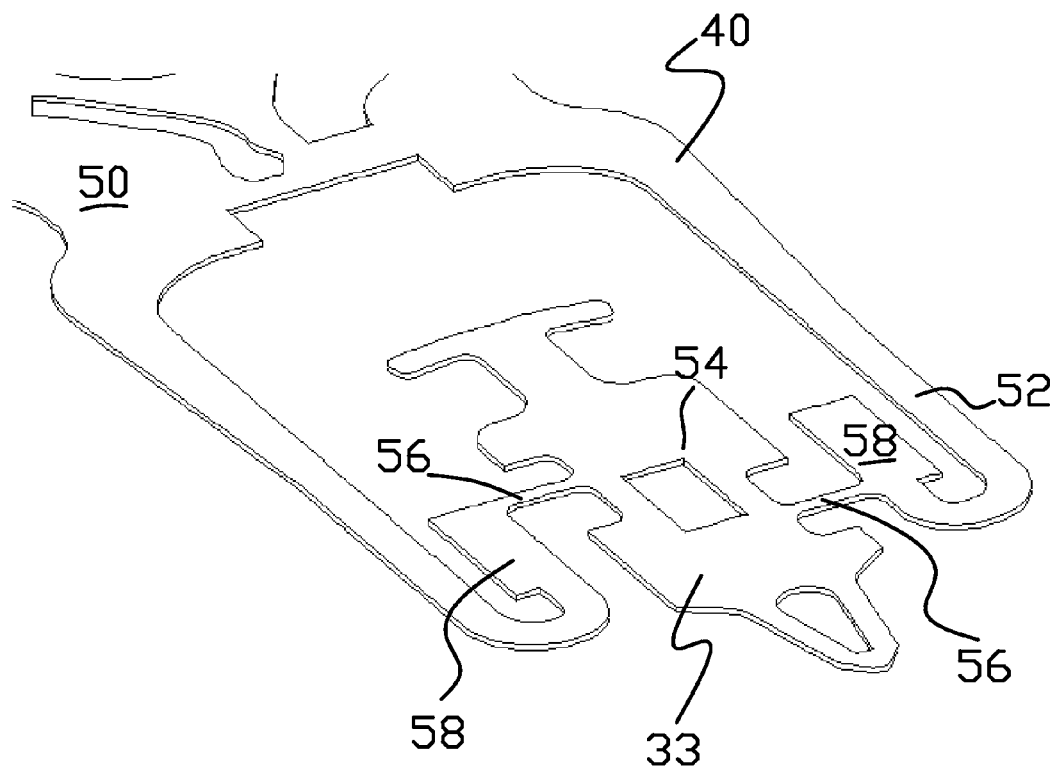
FIG. 5F is the view of FIG. 5E but with the piezoelectric motor removed.

As shown in FIGS. 5A and 5B, the slider 32 sits on the coverlay 46 of the tongue 33. Coverlay 46 provides protection for the traces 60. As shown in FIGS. 5A-5C, which show that portions of the flexible circuit 62 are offset with respect to the longitudinal direction of the flexure 12, portions of the traces 60 on the opposite sides of the flexure 12 are offset from each other in a manner similar to that of the struts 56 (e.g., portions of the traces overlay the struts in the illustrated embodiment). Offset traces of this type can increase the stroke performance of the DSA structure 14. Various other embodiments (not shown) do not have offset traces. It is noted that, in some embodiments, the flexible circuit 62 may provide negligible mechanical support to the tongue 33 relative to the struts 56.

Figure 6:
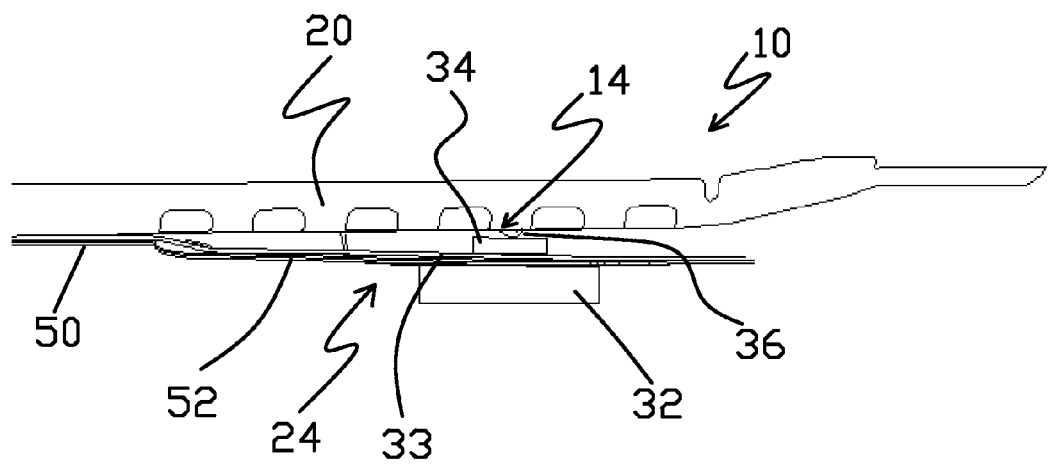
FIG. 6 is a side view of the distal end of the suspension shown in FIG. 1.
Figure 7:
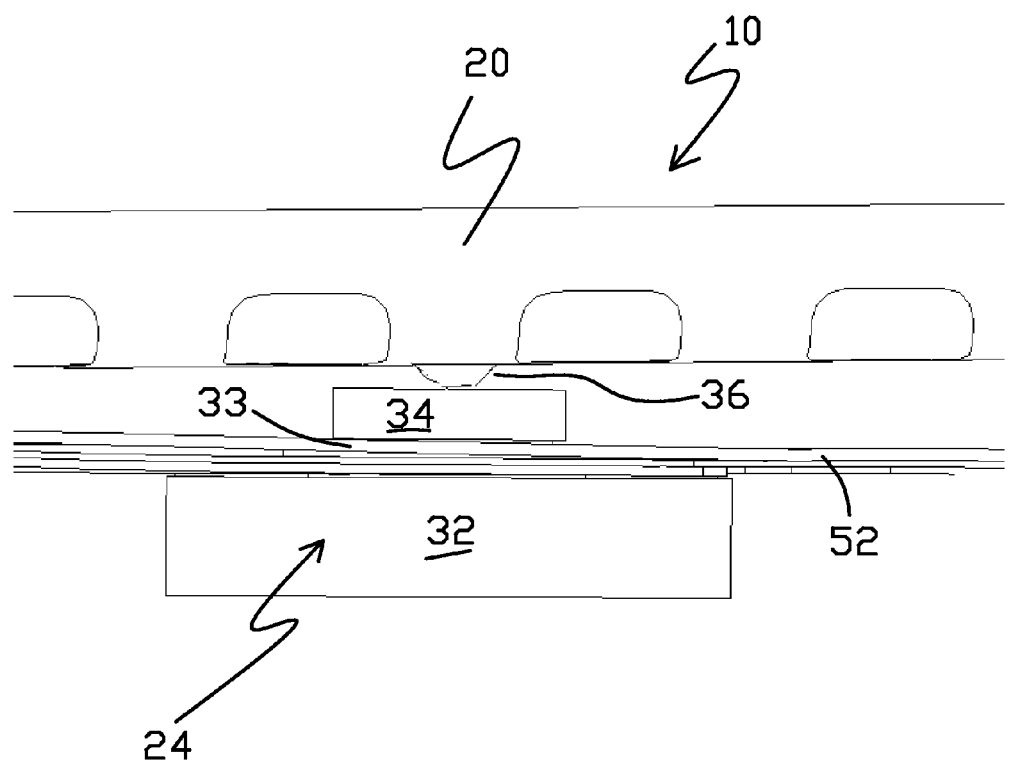
FIG. 7 is a closer view of the portion of FIG. 6 showing the dimple, motor, and head slider.

FIGS. 6 and 7 are side views of the suspension 10, illustrating the gimbal 24 and DSA structure 14. As shown, the dimple 36, which is a structure formed in the stainless steel material that forms the loadbeam 18, and which extends from the loadbeam 18, engages the motor 34 and functions as a load point by urging the portion of the gimbal 24 to which the motor 34 is connected out of plane with respect to the base portion 50 of the flexure 12. A bend or transition in the flexure 12 can occur at any desired location along the spring arms 52 due to the urging of the gimbal 24 by the dimple 36. The dimple 36 can also provide an electrical contact to a terminal (not visible) on the portion of the motor 34 engaged by the dimple. For example, if the stainless steel loadbeam 18 is electrically grounded or otherwise part of an electrical circuit, the dimple 36 can provide an electrical ground potential or electrical connection to the terminal on the motor 34. Various other embodiments (not shown) include other dimple structures such as plated structures that provide these functions. The dimple 36 can be plated with conductive material such as gold to enhance the electrical connection to the terminal of the motor 34 which can also be plated with conductive material such as gold. Still other embodiments (not shown) use structures other than the dimple 36 to provide a grounding or other electrical connection to the motor 34. In one such embodiment, for example, there is another copper pad on the end of one of the support regions 58, and an electrical connection (e.g., a ground connection) can be made by a structure such as conductive adhesive between a terminal on the motor 34 and the conductive material pad on the support region of the flexure 12. In some embodiments, the motor 34 is structurally attached to the tongue 33 at a location between the opposite lateral end portions of the tongue 33. In such embodiments, the motor 34 is attached to the tongue 33 of the gimbal 24 in addition to the motor 34 being attached to the support regions 58 of the spring arms 52.

The operation of DSA structure 14 can be described with reference to FIGS. 8A-8C that are plan views of the stainless steel side of the gimbal 24 of the flexure 12. As shown in FIG. 8B, the DSA structure 14 and tongue 33 are in a neutral, undriven state with the tongue 33 generally centrally located between the spring arms 52 when no tracking drive signal is applied to the motor 34. As shown in FIG. 8A, when a first potential (e.g., positive) tracking drive signal is applied to the motor 34, the shape of the motor changes and its length generally expands. This change in shape increases the distance between the support regions 58 as shown in FIG. 8A, which in connection with the mechanical action of the linking struts 56, causes the tongue 33 to move or rotate in a first direction with respect to the spring arms 52 about the tracking axis. As shown, the lengthening of the motor 34 stretches the gimbal 24 laterally and causes the struts 56 to bend (e.g., bow inward). Because of the offset arrangement of the struts 56, the struts 56 bend such that the tongue 33 rotates in the first direction.

Figure 8C:
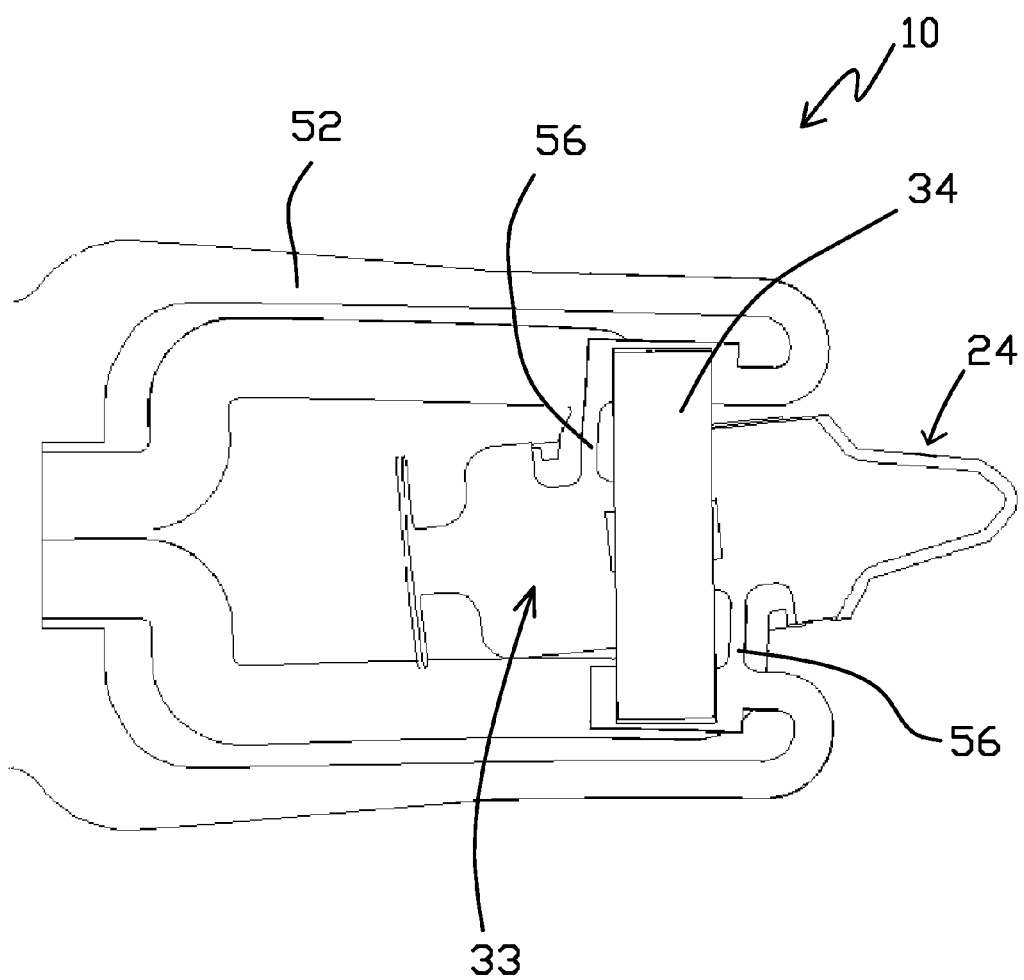

As shown in FIG. 8C, when a second potential (e.g., negative) tracking drive signal is applied to the motor 34, the shape of the motor changes and its length generally contracts. This change in shape decreases the distance between the support regions 58 as shown in FIG. 8C, which in connection with the mechanical action of the linking struts 56, causes the tongue 33 to move or rotate in a second direction with respect to the spring arms 52 about the tracking axis. The second direction is opposite the first direction. As shown, the shortening of the motor 34 compresses the gimbal 24 laterally and causes the struts 56 to bend (e.g., bow outward). Because of the offset arrangement of the struts 56, the struts 56 bend such that the tongue 33 rotates in the second direction. Some, although relatively little, out-of-plane motion of other portions of the gimbal 24 is produced during the tracking action of DSA structure 14 as described above. With this embodiment of this disclosure, slider mounting on the tongue 33 generally rotates with respect to the spring arms 52 as the spring arms 52 stay stationary or experience little movement.

Figure 10:
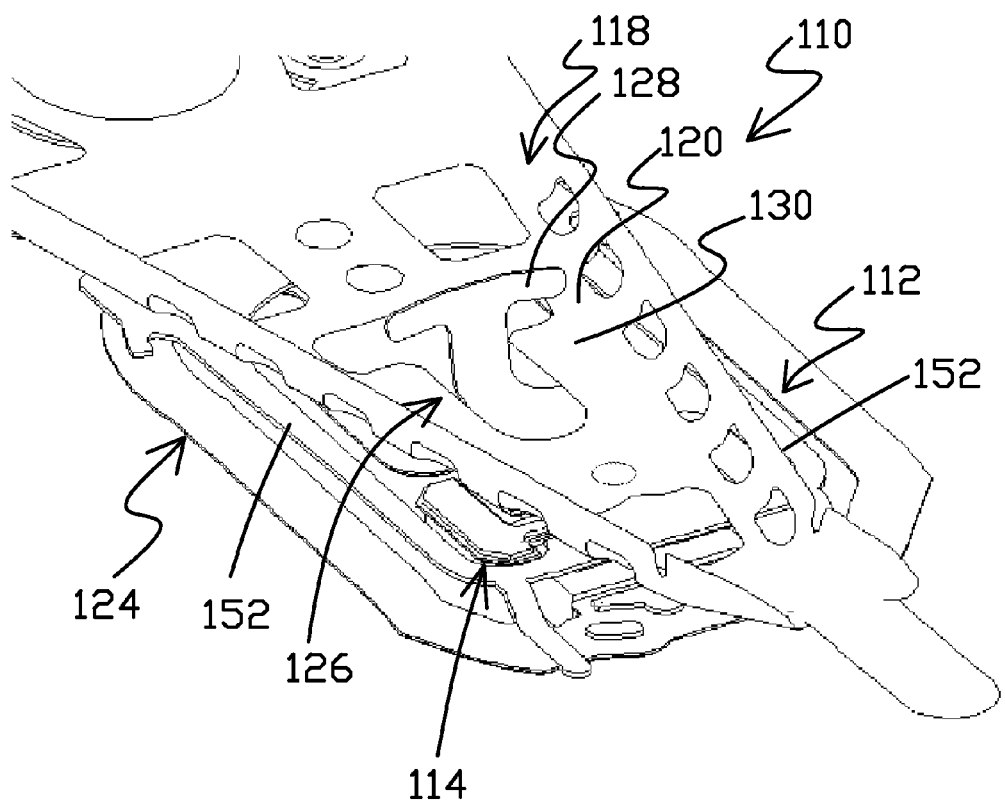
FIG. 10 is an isometric view of the loadbeam side of the distal end of the suspension shown in FIG. 9.
Figure 11:
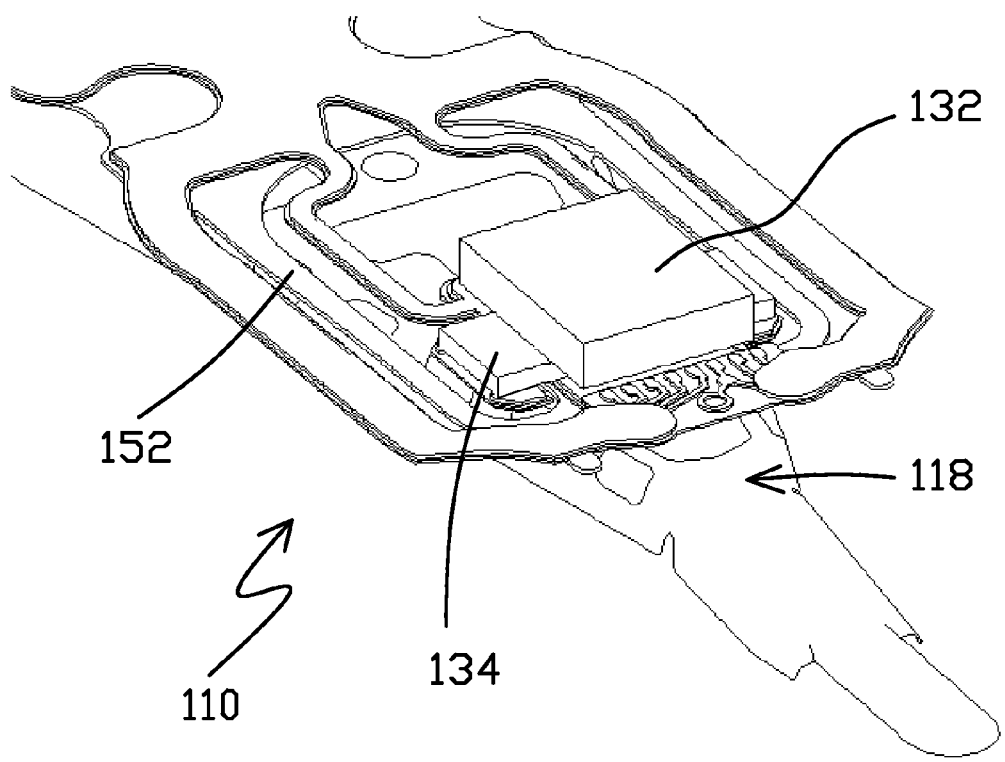
FIG. 11 is an isometric view of the flexure side (i.e., the side opposite that shown in FIG. 10) of the distal end of the suspension shown in FIG. 9.

FIG. 9 is an isometric view of the loadbeam-side of a suspension 110 having a flexure 112 with a co-located or gimbal-based dual stage actuation (DSA) structure 114 in accordance with a second embodiment of this disclosure (i.e., a trace side version). The components of the suspension 110 can be configured similarly to the previously discussed suspension 10 unless otherwise described or illustrated. FIG. 10 is an isometric view of the distal end of the suspension 110. FIG. 11 is an isometric view of the flexure-side of the distal end of the suspension 110, showing the side opposite that shown in FIG. 10. As shown in FIG. 10, the suspension 110 includes a baseplate 116 as a proximal mounting structure. As further shown in FIG. 11, the suspension 110 includes a loadbeam 118 having a rigid or beam region 120 coupled to the baseplate 116 along a spring or hinge region 122. The loadbeam 118 can be formed from stainless steel. Flexure 112 includes a gimbal 124 at its distal end. A DSA structure 114 is located on the gimbal 124, adjacent the distal end of the loadbeam 118. The illustrated embodiment of the suspension 110 also includes a gimbal limiter 126 comprising a tab 128 configured to engage a stop portion 130 of the loadbeam 118. The DSA structure 114 includes a motor 134, which is a PZT actuator in the illustrated embodiment, mounted to a motor mounting region of the tongue 133, on the side of the flexure 112 opposite the loadbeam 118. A head slider 132 is mounted to the side of the motor 134 opposite the flexure 112. As described in greater detail below, in response to electrical drive signals applied to the motor 134, the motor drives portions of the gimbal 124, including portions of the tongue 133, motor 134 and slider 132, about a generally transverse tracking axis.

Figure 12:
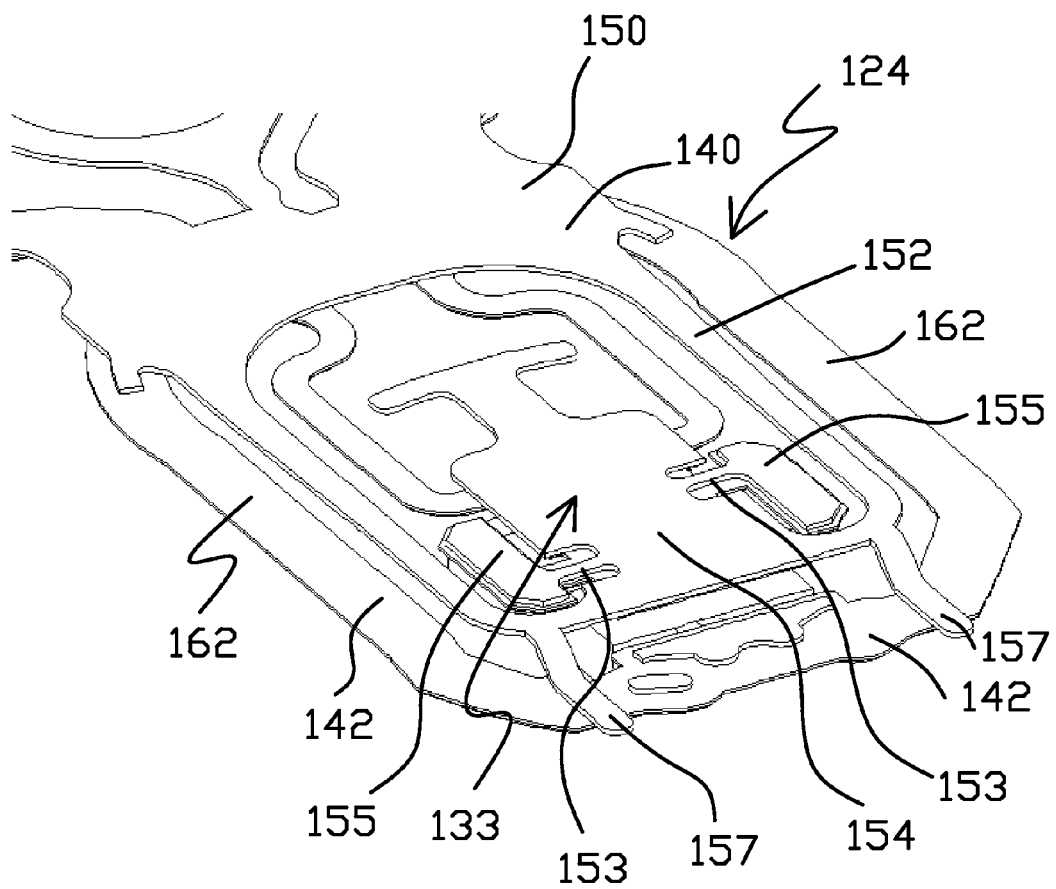
FIG. 12 is an isometric view of the stainless steel side of the flexure shown in FIG. 9.
Figure 13A:
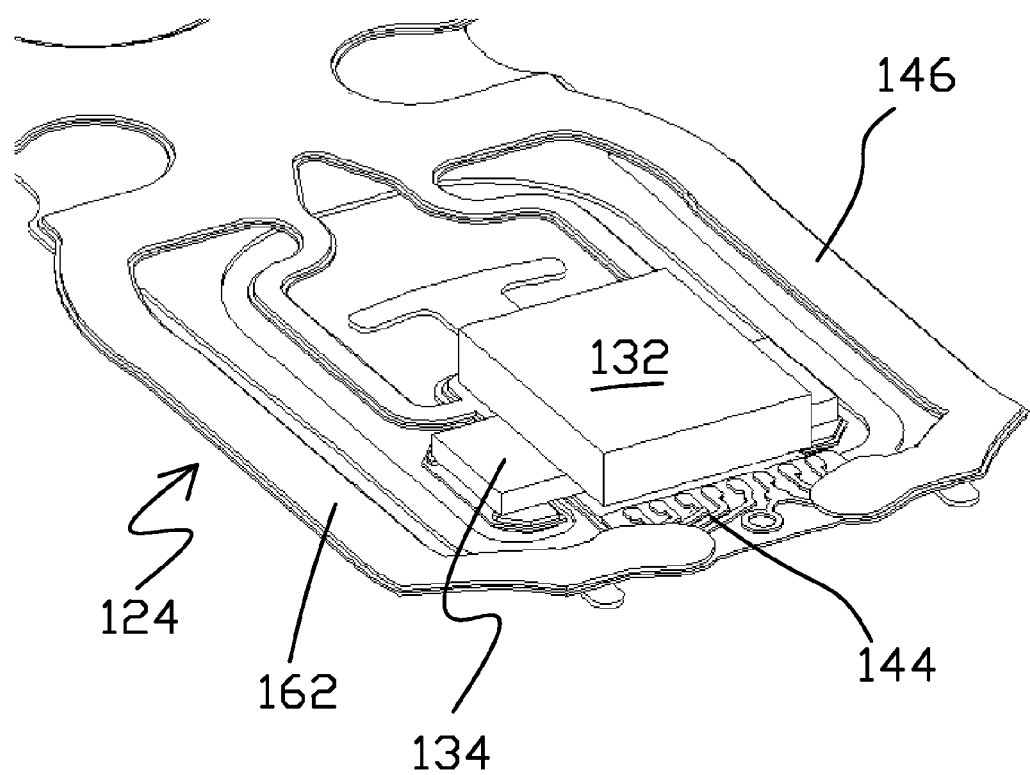
FIG. 13A is an isometric view of the trace side (i.e., the side opposite that shown in FIG. 12) of the flexure shown in FIG. 9.
Figure 13B:
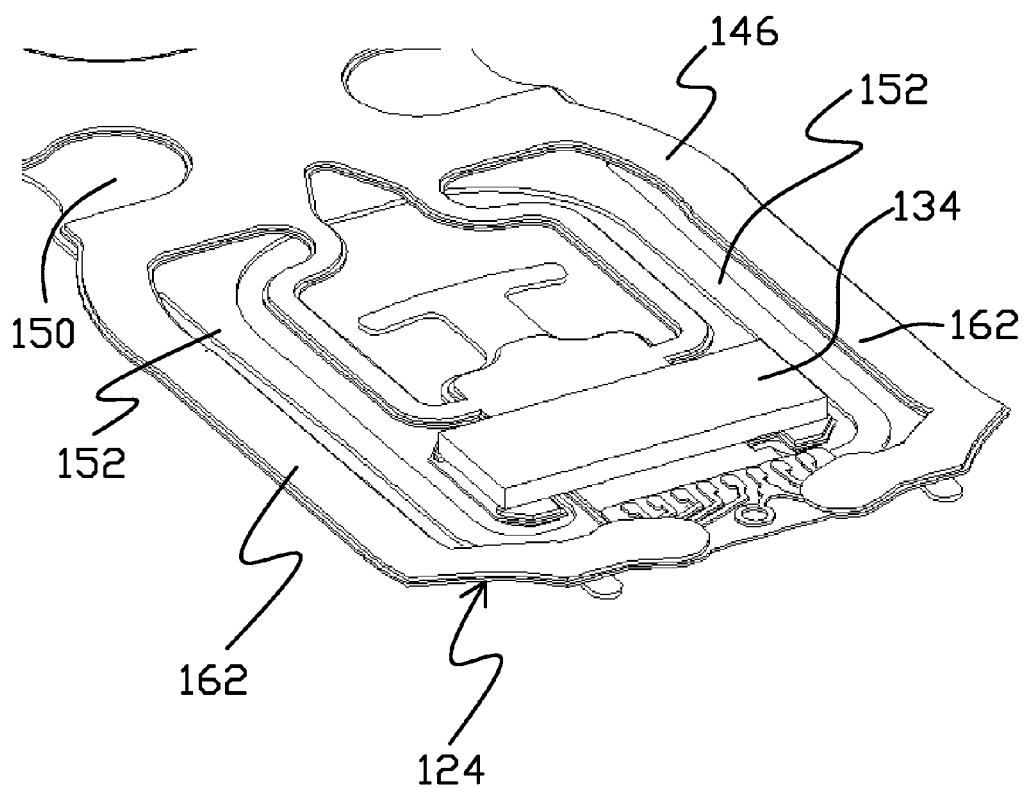
FIG. 13B is the view of FIG. 13A but with the head slider removed.
Figure 13C:
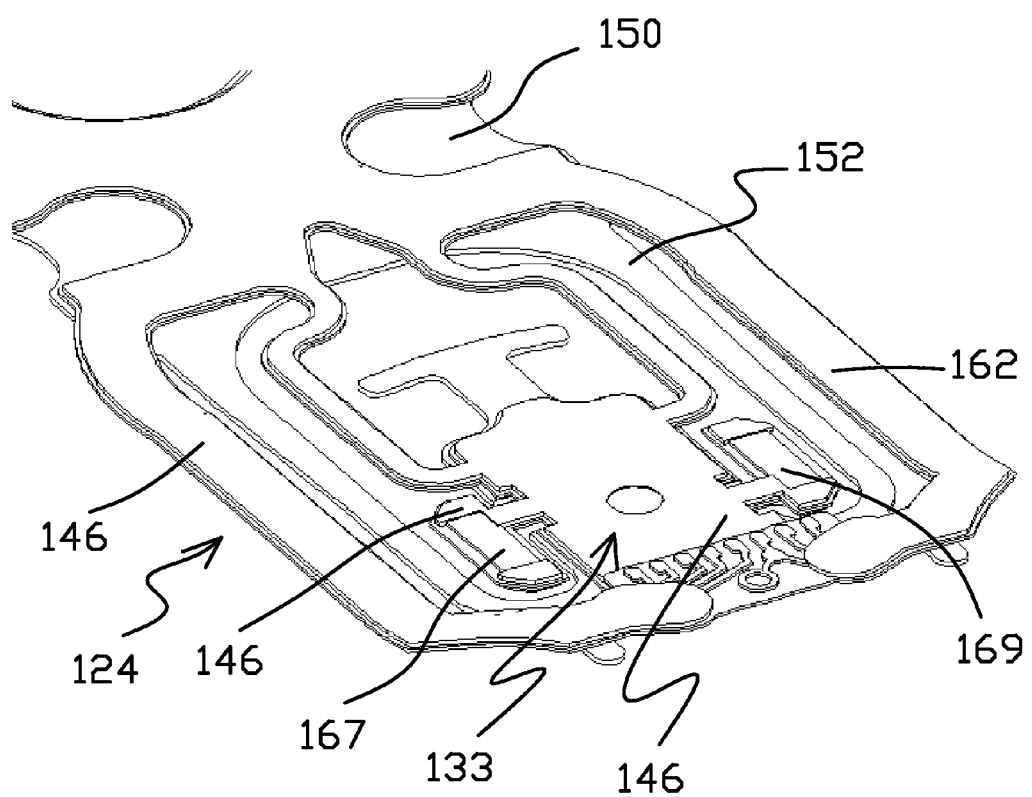
FIG. 13C is the view of FIG. 13B but with the motor removed.
Figure 13D:
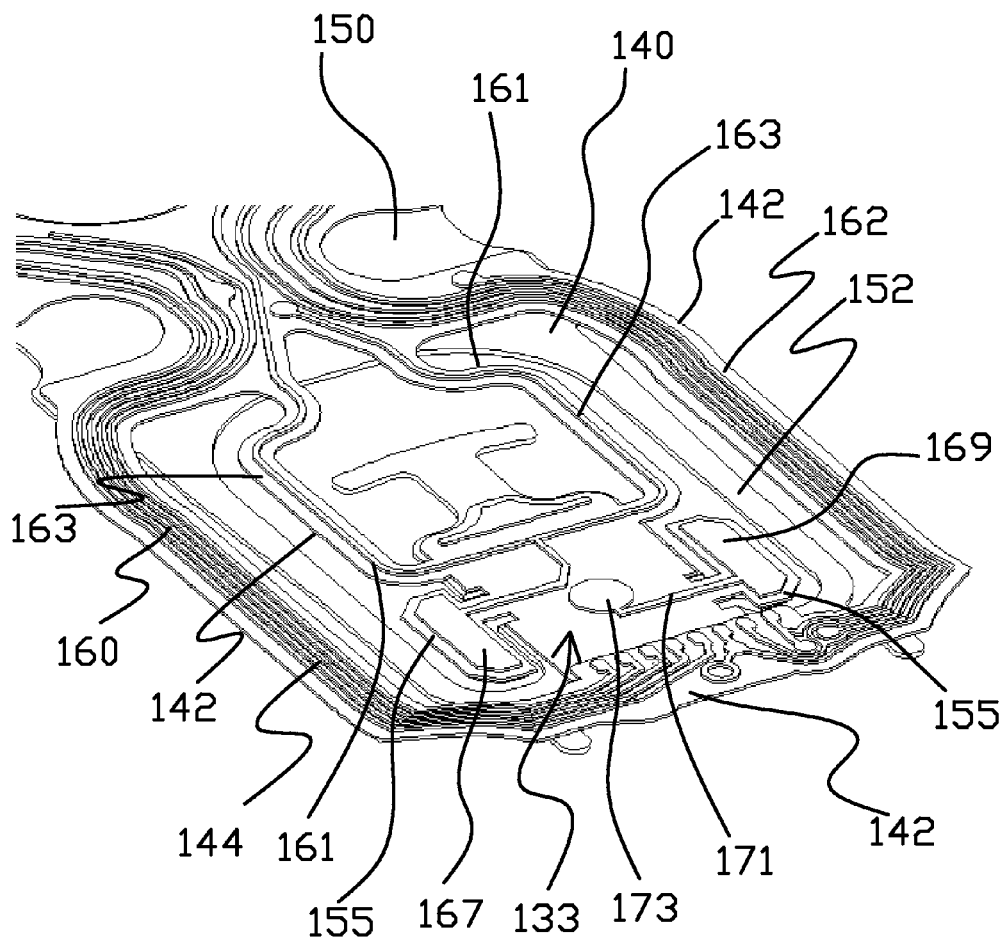
FIG. 13D is the view g of FIG. 13C but with the coverlay removed.
Figure 13E:
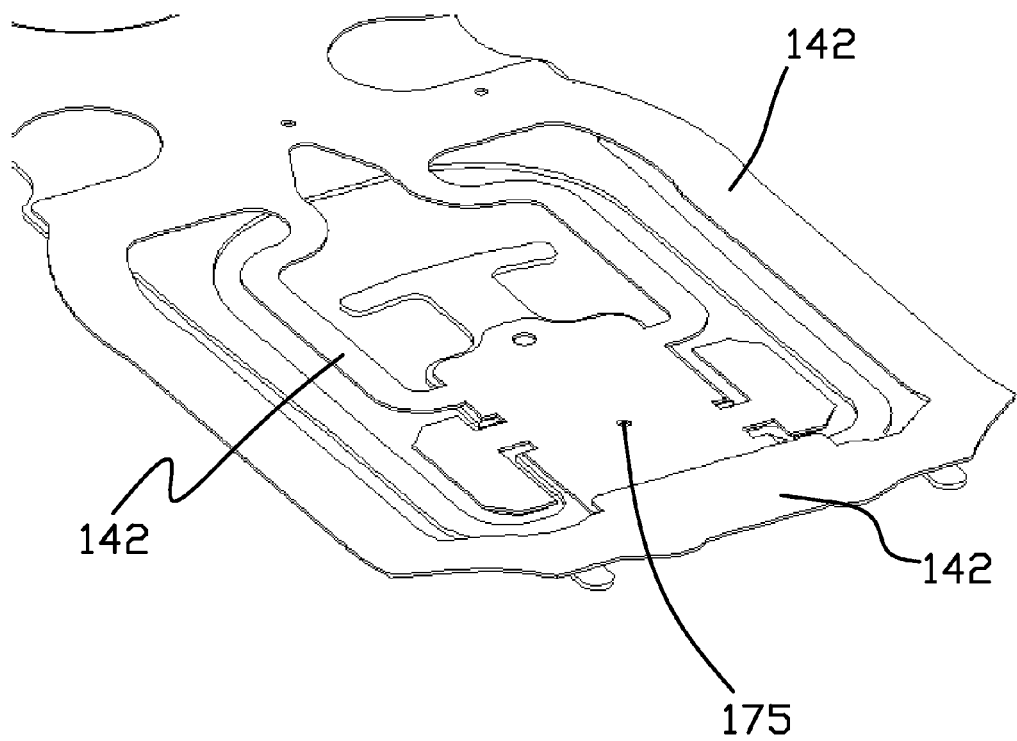
FIG. 13E is the view of FIG. 13D but with the conductive material layer removed.
Figure 13F:
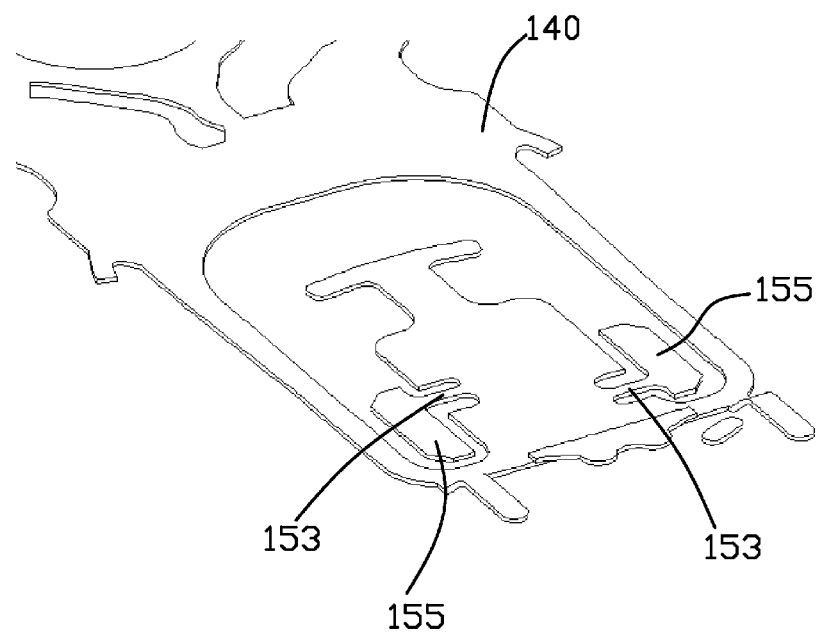
FIG. 13F is the view of FIG. 13E but with the dielectric material layer removed.

FIG. 12 is a detailed isometric view of the stainless steel-side of the flexure 112 and DSA structure 114 shown in FIG. 9. FIGS. 13A-13F are isometric views of the flexure 112 and DSA structure 114 showing the side opposite that shown in FIG. 12. Specifically, FIGS. 13A-13F show the various layers that comprise the flexure 112 and DSA structure 114. FIG. 13B is the drawing of FIG. 13A but with the head slider 132 removed to further show details of the motor 134 on the tongue 133. FIG. 13C is the drawing of FIG. 13B but with the motor 134 removed to reveal details of the tongue 133. FIG. 13D is the drawing of FIG. 13C but with the coverlay 146 removed to reveal a conductive material layer 144 including traces 160 and other structures formed in the conductive material layer 144. FIG. 13E is the drawing of FIG. 13D but with the conductive material layer 144 removed to further reveal the dielectric layer 142. FIG. 13F is the drawing of FIG. 13E but with the dielectric layer 142 removed to show only the stainless steel layer 140 of the flexure 112. It will be understood that the stainless steel layer 140 could alternatively be formed from another metal or rigid material. As shown, the flexure 112 is formed from overlaying spring metal such as stainless steel layer 140, polyimide or other dielectric layer 142, copper or other conductive material layer 144, and coverlay 146. The dielectric layer 142 generally electrically isolates structures formed in the conductive material layer 144 from adjacent portions of the stainless steel layer 140. Coverlay 146 generally covers and protects the structures formed in the conductive material layer 144.

The gimbal 124 includes spring arms 152 and the tongue 133. The base portion 150, the spring arms 152, and the center region 154 are each formed from the stainless steel layer 140. The spring arms 152 extend from the base portion 150. The center region 154, which is a center part of the tongue 133, is connected to the distal ends of the spring arms 152 and is supported between the spring arms 152. Also formed in the stainless steel layer 140 is a pair of struts 153. Each of the struts 153 extends from one of the opposite lateral sides of the center region 154 and has a motor mounting flag or pad 155 on its outer end. As shown, the struts 153 are offset from one another with respect to the longitudinal axis of the flexure 112 or otherwise configured so as to provide for rotational movement of the motor 134 and the head slider 132 mounted thereto about the tracking axis with respect to the center region 154. Each strut 153 comprises a longitudinal axis that extends generally perpendicular with respect to the longitudinal axis of the suspension 110. The longitudinal axes of the struts 153 extend parallel but do not intersect or otherwise overlap with each other when the struts 153 are not stressed (e.g., not bent). The struts 153 can be the only structural linkage between the center region 154 and the pads 155 (e.g., the only part of the stainless steel layer 140 connecting the center region 154 with the pads 155 is the struts 153, a single strut 153 for each pad 155). As shown in FIG. 13F, the struts 153 can each be the narrowest part of the stainless steel layer 140 in an X-Y plane (as viewed from the overhead perspective of FIG. $16B_1$) while the thickness of the stainless steel layer 140 can be consistent along the flexure 112.

As shown in FIG. 13D, a plurality of traces 160 are formed in the conductive material layer 144 and extend between the base portion 150 and tongue 133 along paths generally laterally outside the spring arms 152 and along the flexible circuit 162 formed in the dielectric layer 142. A number of the traces 160 terminate at locations adjacent the distal region of the tongue 133 and are configured to be electrically attached to read/write head terminals (not shown) on the slider 132. A pair of power traces 161 for powering the motor 134 are also formed in the conductive material layer 144, and extend between the base portion 150 and a proximal portion of the tongue 133 along paths generally inside the spring arms 152 and along the flexible circuit 163 formed in the dielectric layer 142. The motor power traces 161 terminate at a first motor terminal pad 167 on one of the motor mounting pads 155. A second motor terminal pad 169 is formed in the conductive material layer 144 on the other motor mounting pad 155, and is coupled by a trace 171 to a conductive via 173 that is shown on the tongue 133 at a location between the motor mounting pads 155. As best viewed in FIG. 13D, via 173 extends through an opening 175 in the dielectric layer 142 (shown in FIG. 13E) to electrically contact the stainless steel layer 140 of the flexure 112. The motor terminal pad 169 can be electrically connected to a ground potential at the stainless steel layer 140 by the trace 171 and the via 173. As shown in FIG. 12, structures such as tabs 157 in the stainless steel layer 140 are formed out of the plane of the stainless steel layer and engage the distal portion of the trace flexible circuit 162 to push the terminal ends of the traces 161 down so the terminals on the slider 132 can be correctly electrically attached (e.g., by solder bonds) to the traces while accommodating the thickness of the motor 134. FIG. 13E also illustrates other holes in the dielectric layer that can be used in connection with conductive vias to electrically connect (e.g., ground) traces and other structures in the conductive material layer 144 to the stainless steel layer 140. In other embodiments, other approaches and structures can be used to couple the tracking drive signals to the terminals on the motor 134.

The electrical terminals on the motor 134 may be on the same side (e.g., top or bottom) but opposite longitudinal ends of the motor 134. As shown in FIGS. 13B and 13C, the motor 134 can be attached to the gimbal 124 by bonding the electrical terminals of the motor 134 to the motor terminal pads 167 and 169 using conductive adhesive. By this approach, the motor 134 is both structurally and electrically connected to the gimbal 124. As shown in FIG. 13C, the motor terminal pads 167 and 169 are exposed through openings in the coverlay 146 to provide access for the conductive adhesive.

Figure 14:
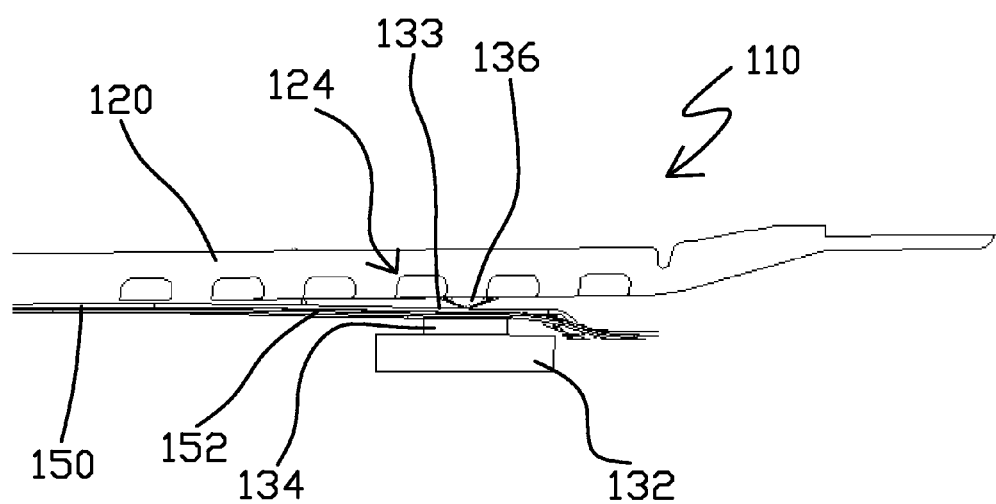
FIG. 14 is a side view of the distal end of the suspension shown in FIG. 9.
Figure 15:
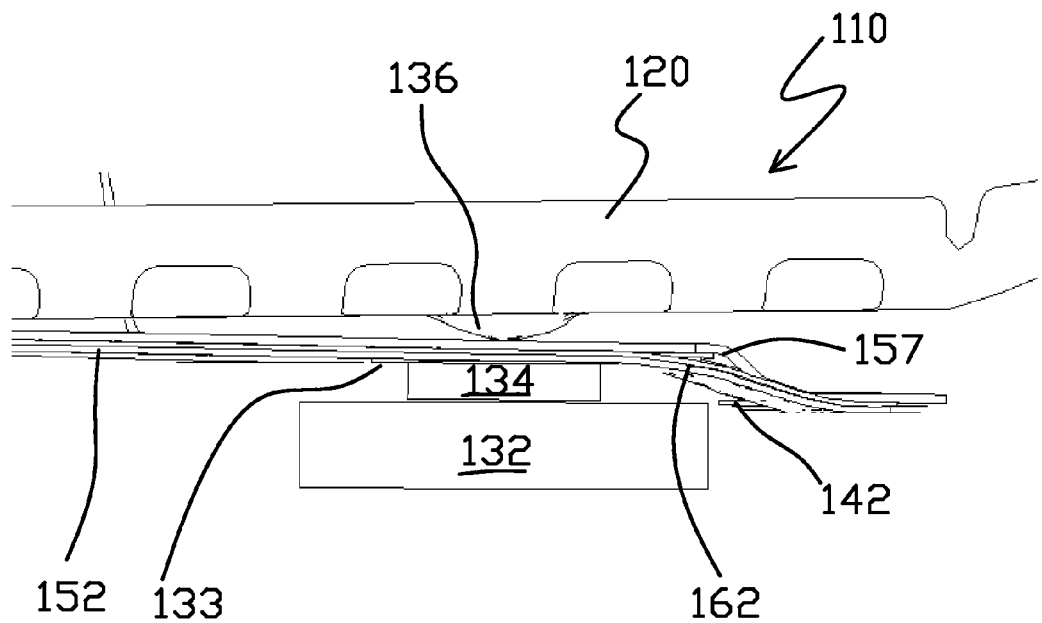
FIG. 15 is a closer view of the portion of FIG. 14 showing the dimple, motor, and head slider.

FIGS. 14 and 15 are side views of the suspension 110, illustrating the gimbal 124 and DSA structure 114. As shown, the dimple 136, which is a structure formed in the stainless steel of the loadbeam 118 and which projects from the loadbeam 118, engages the center region 154 of stainless steel layer 140 on the side of the tongue 133 opposite the motor 134. Dimple 136 functions as a load point by urging the portion of the gimbal 124 to which the motor 134 is connected out of plane with respect to the base portion 150 of the flexure 112. In the illustrated embodiment, the motor 134 is located between the tongue 133 and the head slider 132 (e.g., the motor 134 is sandwiched in a vertical axis). As shown in FIGS. 14 and 15, the slider 132 is structurally supported by the motor 134 such that the only structural linkage between the flexure 112 and the slider 132 runs through or otherwise includes the motor 134. The manner by which the stainless steel tabs 157 locate the portion of dielectric layer 142 with the terminal ends of the traces 160 at the correct z-height and adjacent to the portion of the head slider 132 that includes the read/write head terminals is shown in FIG. 15.

The operation of DSA structure 114 can be described with reference to FIGS. $16A_1$, $16A_2$, $16B_1$, $16B_2$, $16C_1$ and $16C_2$ that are plan views of the gimbal 124 of the flexure 112. FIGS. $16A_1$, $16B_1$ and $16C_1$ illustrate the stainless steel side of the flexure 112, and FIGS. $16A_2$, $16B_2$ and $16C_2$ illustrate the trace side of the flexure 112, with the motor 134 and head slider 132 shown. As shown in FIGS. $16B_1$ and $16B_2$, the DSA structure 114 and tongue 133, as well as the motor 134 on the linkage formed by the motor mounting pads 155 and struts 153, are in a neutral, undriven state with the head slider positioned generally parallel to the longitudinal axis of the flexure 112 when no tracking drive signal is applied to the motor 134. The struts 153 are not bent or otherwise stressed in this state. As shown in FIGS. $16A_1$ and $16A_2$, when a first potential (e.g., positive) tracking drive signal is applied to the motor 134, the shape of the motor changes and its length generally expands. This change in shape increases the distance between the motor mounting pads 155, which in connection with the mechanical action of the linking struts 153, causes the motor 134, and therefore the head slider 132 mounted thereto, to move or rotate in a first direction with respect to the longitudinal axis of the flexure 112 about the tracking axis. As shown, the lengthening of the motor 134 stretches the struts 153 laterally and causes the struts 153 to bend (e.g., bow inward). Because of the offset arrangement of the struts 153, the struts 153 bend such that the motor 134 and the head slider 132 rotate in the first direction.

As shown in FIGS. $16C_1$ and $16C_2$, when a second potential (e.g., negative) tracking drive signal is applied to the motor 134, the shape of the motor changes and its length generally contracts. This change in shape decreases the distance between the motor mounting pads 155, which in connection with the mechanical action of the linkage including struts 153, causes the motor 134, and therefore the head slider 132 mounted thereto, to move or rotate in a second direction with respect to the longitudinal axis of the flexure 112 about the tracking axis. The second direction is opposite the first direction. As shown, the shortening of the motor 134 compresses the struts 153 laterally and causes the struts 153 to bend (e.g., bow outward). Because of the offset arrangement of the struts 153, the struts 153 bend such that the motor 134 and the head slider 132 rotate in the second direction.

Some, although relatively little, out-of-plane motion of other portions of the gimbal 124 may be produced during the tracking action of DSA structure 114. The linkage provided by the struts 153 accommodates the motion of the motor 134 so the remaining portions of the tongue 133 remain generally aligned with respect to the longitudinal axis of the flexure 112 during this tracking action. For example, the motor 134 and slider 132 rotate, but the center region 154 (or more broadly the tongue 133) does not rotate or rotates only an insignificant or trivial amount.

FIG. 17 is an illustration of a suspension 210 in accordance with another embodiment of this disclosure. As shown, the suspension 210 includes a co-located or gimbal-based DSA structure 214 and a loadbeam or baseplate-type DSA structure 290. In this way, the suspension 210 is a tri-stage actuated suspension. In one embodiment, the DSA structure 214 is substantially the same as the DSA structure 114 described above (e.g., is configured with any aspect described or shown in connection with FIGS. 9-16C$_2$) except as otherwise specified or shown. In another embodiment, the DSA structure 214 is substantially the same as the DSA structure 14 described above (e.g., is configured with any aspect described or shown in connection with FIGS. 1-8C) except as otherwise specified or shown. Other embodiments of suspension 210 include other gimbal-based DSA structures. The DSA structure 290 can be any known or conventional DSA structure such as any of those described above in the background section.

Bowing, twisting, and/or asymmetric bending can be present in various suspensions such as those described above. For example, returning the suspension of FIGS. 1-8C, when the motor 34 on the suspension 10 is actuated to expand, the motor 34 can vertically deflect by bowing such that the lateral ends of the motor 34 move toward the slider 32 and the stainless steel layer 40 of the gimbal 24 relative to the middle of the motor 34. In other words, upon expansion, the lateral ends of the motor 34 bend downward and/or the middle of the motor 34 bends upwards. The deflection of the motor 34 in this manner can be due to the resistance provided by the gimbal 24. For example, the gimbal 24, being on one side of the motor 34 while the other side of the motor 34 is unrestrained, resists the expansion of the motor 34 and therefore causes the motor 34, along with the attached gimbal 24, to vertically deflect. Conversely, when the motor 34 is electrically activated with the opposite polarity to contract, the motor 34 can deflect by bowing in the opposite direction such that the lateral ends of the motor 34 move away the slider 32 and the stainless steel layer 40 of the gimbal 24 relative to the middle of the motor 34 which moves toward the slider 32 and the stainless steel layer 40. In other words, upon expansion, the lateral ends of the motor 34 bend upward and/or the middle of the motor 34 bends downwards. The deflection of the motor 34 in this manner can likewise be due to the resistance provided by the gimbal 24 on one side of the motor 34. The vertical direction of this bending can reduce stroke efficiency of the motor 34. For example, the motor 34 cannot fully extend or contract along its longitudinal axis when also bending in a vertical direction, and as such some stroking range is lost. Furthermore, the motor 34 can twist about its longitudinal axis (typically transversely oriented on the gimbal 24) during expansion and contraction. This twist can be due to asymmetric bending stiffness of the offset gimbal struts 56. Asymmetric bending and twisting can also lead to increased gimbal modes (natural frequencies) causing resonance performance issues. Reduced resonance performance can lead to lower servo bandwidth in the disk drives into which the suspensions are incorporated. This, in turn, can increase the distance that the individual tracks are spaced from each other on the disks, and thereby reduce the overall amount of data that can be packed onto the disk surface.

Various embodiments of this disclosure include a stiffener component that is bonded or otherwise attached to a side (e.g., a top or free side) of a motor. Such a stiffener can limit the bending of the motor and/or gimbal during motor activation. FIGS. 18-32B show various embodiments of suspensions having a stiffener mounted on a motor to address the issues discussed above.

FIG. 18 is an isometric view of the stainless steel side of a flexure 212. FIG. 19 is a side view of the flexure 212. The flexure 212 is part of a DSA structure 214 that can be similar to that of the DSA structure 14 described above or other DSA structure referenced herein except where noted. Features of flexure 212 that are the same or similar to those of flexure 12 are indicated by similar reference numbers. A stiffener 280 is mounted on the motor 234. The stiffener 280 is attached to the motor 234 by adhesive 282 disposed between the stiffener 280 and the motor 234. Specifically, the adhesive 282 can be a layer of adhesive that is bonded to a bottom side of the stiffener 280 and a top side of the motor 234. In the embodiment shown in FIG. 18, the stiffener 280 is located over the entire top or free surface of the motor 234 (i.e., the surface of the motor 234 that is opposite the bottom side of the motor 234 that faces the tongue 233). As shown, the four edges (lateral sides, front, and back) of the stiffener 280 are aligned with the four edges (lateral sides, front, and back) of the motor 234.

The stiffener 280 will generally have sufficient stiffness to at least partially offset the stiffness of the portion of gimbal 224 that is resisting motion of the motor 234 and causing the stroke-reducing bending. In some embodiments, the stiffener 280 is made from metal such as stainless steel, aluminum, nickel, titanium or other structural metal. In various other embodiments, the stiffener 280 is formed from a polymer material. A polymer stiffener may have increased thickness (as compared to a metal stiffener) to provide the desired bending stiffness. The stiffener 280 can, for example, be etched, cut or otherwise formed from sheet or film stock. In some embodiments, the stiffener 280 can be about 10-25 μm in thickness. The stiffener can be thicker or thinner in other embodiments.

The embodiment of FIG. 18 further includes a reduced thickness region 284 at the center of the stiffener 280. In this or in other ways, a stiffener can have a first thickness along a first portion of the stiffener and a second thickness along a second portion of the stiffener, the second thickness less than the first thickness. The reduced thickness region 284 can be a surface of the stiffener 280 that is positioned and configured to make contact with a load point dimple of the loadbeam (not shown). Reducing the thickness of the stiffener 280 at the dimple contact location can allow the dimple to extend into the cavity created by the reduced thickness region 284, which reduces the overall height of the suspension 210 because the loadbeam can be closer to the flexure 212. Various other embodiments do not include the partial thickness region 284. Other configurations for a reduced thickness region are further discussed herein.

Adhesive 282 forms a relatively thin material layer between the motor 234 and stiffener 280 (e.g., about 2-25 μm in some embodiments). In some embodiments, the adhesive 282 has a relatively low elastic modulus to enhance the operation of the DSA structure 214. Low elastic modulus adhesives 282 can provide reduced resistance of the stiffener 280 on expansion and contraction of the motor 234, while still enhancing the bending stiffness of the DSA structure 214. Embodiments of flexure 212 with adhesive 282 having an elastic modulus of about 100 MPa have demonstrated enhanced performance. Other embodiments can have adhesive 282 with a different elastic modulus.

The motor 234 is mounted on the flexure 212 by being connected to a pair of connectors 245. The connectors 245 can connect with respective anode and cathode terminals of the motor 234. The connectors 245 can further connect with respective traces running along the flexure 212 to electrically activate the motor 234. The connectors 245 can comprise solder, conductive epoxy (e.g., silver filled), or other material for forming an electrode connection. The connectors 245 can structurally attach the motor 234 to the flexure 212. Specifically, the pair of connectors 245 can connect the lateral ends of the motor 234 to the pair of spring arms 252, respectively.

The slider 232 is mounted to a slider mounting of the tongue 233. The slider mounting is a surface of the tongue 233 to which the slider 232 can be attached, such as with an adhesive such as epoxy. Rotation of the tongue 333 by actuation of the motor 234 rotates the slider mounting, and thereby the slider 332, about a tracking axis.

FIG. 20 is an isometric view of the flexure 212 and shows an example of a state of the flexure 212 when the motor 234 is electrically activated to expand to an expanded state. As shown, the motor 234 bends toward the stiffener 280 (i.e., in the direction opposite of the bending in embodiments of the same flexure 212 when the motor 234 expands without the stiffener 280) such that the lateral ends of the motor 234 move away from the slider 232 and the stainless steel layer 240 relative to the middle of the motor 234 which moves toward the slider 232 and the stainless steel layer 240. In other words, upon expansion while restrained by the stiffener 280, the lateral ends of the motor 234 bend upward while the middle of the motor 234 bends downwards, which is the opposite bending profile had the stiffener 280 not been attached to the motor 234. Conversely, FIG. 21 is the same isometric view of the flexure 212 as FIG. 20 when the motor 234 is electrically activated to contract. As shown, the motor 234 bends away the stiffener 280 (i.e., in the direction opposite of the bending in embodiments of the same flexure 212 when the motor 234 contacts without the stiffener 280) such that the lateral ends of the motor 234 move toward the slider 232 and the stainless steel layer 240 relative to the middle of the motor 234 which moves away the slider 232 and the stainless steel layer 240. In other words, upon contraction while restrained by the stiffener 280, the lateral ends of the motor 234 bend downward while the middle of the motor 234 bends upwards, which is the opposite bending profile had the stiffener 280 not been attached to the motor 234. However, it is noted that not all embodiments are so limited and that the stiffener 280 can change the bending profile of the flexure 212 in additional or alternative ways.

It is noted that the presence of the stiffener 280 on the motor 234 can change the amount of deflection of the motor 234 when contracted. This bending action is produced because the overall stiffness of the stiffener 280 and motor 234 is stronger than the stiffness of the associated portion of the flexure 212 (e.g., the stainless steel layer 240 specifically) on the other side of the motor 234 with respect to the stiffener 280. In this way, the stiffener 280 can balance or counteract the stiffness of the flexure 212 about the motor 234 to control or limit vertical deflection. Limiting the vertical deflection increases the stroke because the motor 234 is allowed to more fully expand or contract along an axis that pushes or pulls the areas at which the motor 234 is attached to the flexure 212 to move the tongue 233 and the slider 232. Increasing the stroke of the motor 234 increases the rotational stroke of the DSA structure 214. In some embodiments, the stiffener 280 can increase the stroke by over 70% (e.g., over embodiments of a similar flexure without the stiffener 280). As such, the presence and configuration (e.g., shape, elastic modulus) of the stiffener 280 can be balanced with the mechanics of the flexure 212 to minimize bending of the motor 234 and flexure 212, maximize longitudinal stroke of the motor 234, and/or reverse the bending profile of the motor 234.

As shown in FIGS. 20 and 21, the low modulus adhesive 282 deforms in shear during this actuation of the motor 234. While the profile of the stiffener 280 is matched to the profile of the motor 234 when the motor 234 is not activated, as shown in FIG. 18, the motor 234 extends beyond the lateral ends of the stiffener 280 in the embodiment of FIG. 20 as the motor 234 expands such that the respective profiles of the stiffener 280 and the motor 234 no longer match. In FIG. 20, the adhesive 282 is shown stretching between the relatively larger profile of the motor 234 and the relatively smaller profile of the stiffener 280. In FIG. 21, the adhesive 282 is shown stretching between the relatively smaller profile of the motor 234 and the relatively larger profile of the stiffener 280. The relatively low elastic modulus of the adhesive 282 allows the adhesive 282 to stretch to accommodate the shear force generated by the changes between the profiles of the stiffener 280 and the motor 234. A relatively higher modulus adhesive 282 (not shown) may not deform in shear to the extent of a lower modulus adhesive, and may thereby reduce the amount of expansion of the motor 234 to reduce the stroke increase provided by the stiffener 280. Performance advantages can thereby be achieved by balancing the elastic modulus of the adhesive 282 and the elastic modulus of the stiffener 280. The elastic modulus of the adhesive 282 can be approximately 2000 times lower than the modulus of the material that forms the stiffener 280.

During actuation, the motor 234 may twist about the longitudinal axis of the motor 234 during actuation of the motor 234. Also, the stiffener 280 may also be caused to twist about the longitudinal axis of the stiffener 280 by the actuation of the motor 234. However, the presence of the stiffener 280 can limit the degree of twisting of the motor 234 about the longitudinal axis of the motor 234. In some embodiments, because the twisting can be caused by the resistance provided by the flexure 212, as discussed above, the presence of the stiffener 280 on the side of the motor 234 opposite the flexure 212 can reverse the direction of twist as compared to an embodiment without the stiffener 280. As such, the presence and configuration (e.g., shape, elastic modulus) of the stiffener 280 can be balanced with the mechanics of the flexure 212 to minimize twisting, maximize longitudinal stroke of the motor 234, and/or reverse the twisting profile of the motor 234.

FIGS. 22-24 are illustrations of a flexure 312 having a DSA structure 314 with an asymmetric stiffener 380 in accordance with another embodiment of this disclosure. The flexure 312 is part of a DSA structure 314 that can be similar to that of DSA structure 214 described above or other DSA structure referenced herein except where noted. Features of flexure 312 that are the same or similar to those of other flexures are indicated by similar reference numbers. The gimbal 324 is shown with the motor 334 in a neutral or unactuated state in FIG. 22, a contracted actuated state in FIG. 23, and an expanded actuated state in FIG. 24. Stiffener 380 can be attached to motor 334 by adhesive 382. As shown, the stiffener 380 has a central section 387 and a pair of arms comprising a first arm 388 and a second arm 389. A first arm 388 extends laterally away from the central section 387 in a first direction (i.e. to the right and orthogonal relative to the longitudinal axis of the gimbal 324, parallel relative to the longitudinal axis of the motor 334). A second arm 389 extends laterally away from the central section 387 in a second direction (i.e. to the right and orthogonal relative to the longitudinal axis of the gimbal 324, parallel relative to the longitudinal axis of the motor 334) opposite the first direction.

The stiffener 380 is asymmetric about both of the length and width axes of the central section 387. For example, the first arm 388 extends along a first longitudinal axis, the second arm 389 extends along a second longitudinal axis, and the first longitudinal axis is offset from the second longitudinal axis. As shown, the first arm 388 is proximal relative to the second arm 389. The offset relationship of the first arm 388 and the second arm 389 can mirror the offset relationship of the struts 356. It is noted that while strut 356 is shown in FIGS. 22-24, the configuration of the struts 356 can be the same as the struts 56 shown in FIG. 4B. For example, a first strut 356 on the right side of the flexure 312 can be proximal of the second strut 356 on the left side of the flexure 312 while the first arm 388 on the right side of the stiffener 380 is proximal of the second arm 389 on the left side of the stiffener 380. The stiffener 380 can be between the struts 356 (e.g., from a plan view perspective or along a plane that is coplanar with the flexure 312). The offset profile of the first arm 388 and the second arm 389 corresponding to the offset profile of the struts 356 allows the first arm 388 to mechanically counteract the proximal strut 356 and the second arm 389 to mechanically counteract the distal strut 356. In some embodiments, the width of the first arm 388 is different (e.g., less) than the width of the second arm 389. In other embodiments (not shown), the stiffener has other asymmetrical shapes or is symmetric about the central section 387.

The stiffener 380 can provide sufficient stiffness to equally balance and counteract the bending of the motor 334 as the motor 334 is expanded (e.g., as shown in FIG. 23) and contracted (e.g., as shown in FIG. 24). This action is provided at least in part because of the relatively less amount of material, and therefore less stiffness (e.g., compared to embodiments with stiffeners such as 280 described above). The presence and configuration (e.g., shape, elastic modulus, alignment with struts 356) of the stiffener 380 can be balanced with the mechanics of the flexure 312 to minimize bending of the motor 334 and flexure 312, maximize longitudinal stroke of the motor 334, and/or reverse the bending profile of the motor 334. In one embodiment, the stiffener 380 provides a stroke increase of approximately 30% over similar embodiments of the flexure with no stiffener. Stiffener 380 also provides less twist along the long axis of the motor 334 during actuation of the motor. Minimizing twist of the motor 334 can reduce excitation of flexure resonance modes by reducing motion of the flexure arms and traces.

Connectors 345 electrically and mechanically connect the motor 334 to the flexure 312. More specifically, the connectors 345 make electrical connections between traces of the flexure 312 and terminals of the motor 334. The connectors 345 can further attach the motor 334 to the spring arms 352. The slider 332 is mounted to a slider mounting of the tongue 333. The slider mounting can be a surface of the tongue 333 to which the slider 332 can be attached, such as with an adhesive such as epoxy. Rotation of the tongue 333 by actuation of the motor 334 rotates the slider mounting, and thereby the slider 332, about a tracking axis.

FIG. 25 is detailed isometric view of the stainless steel side of the distal end of a flexure 412 having a DSA structure 414 with a stiffener 480 in accordance with another embodiment of this disclosure. FIG. 26 is a distal end view of the flexure 412 shown in FIG. 25. FIG. 27 is an illustration of the flexure 412 shown in FIG. 25 when the motor 434 is actuated into an expanded state. The flexure 412 is part of a DSA structure 414 that can be similar to that of DSA structure 214 described above or other DSA structure referenced herein except where noted. Features of flexure 412 that are the same or similar to those of other flexures are indicated by similar reference numbers. The flexure 412 includes a gimbal 424. As shown, the stiffener 480 has a center section 487 and a pair of opposite side sections 488 and 489. Each of the side sections 488 and 489 are separated from the center section 487 by openings 491. Each opening 491 is a void in the stiffener 480 that extends from a first side of the stiffener 480 to a second side of the stiffener 480 opposite the first side. Each opening 491 is entirely bounded along the plane of the stiffener is lateral (i.e. left and right) as well as proximal and distal directions. Alternatively, an opening 491 can be open on any of the lateral, distal, and/or proximal sides. The stiffener 480 includes a reduced thickness region 484 at the center of the stiffener 480.

The stiffener 480 is attached to the motor 434 by a plurality of adhesive layers $482_1$-$482_2$. As shown, the plurality of adhesive layers $482_1$-$482_2$ are separate and do not contact one another. Each of the adhesive layers $482_1$-$482_2$ can be a different type of adhesive such that each layer has a different elastic modulus. In the illustrated embodiment, for example, the center section 487 of the stiffener 480 is attached to the motor 434 by a first adhesive $482_1$ and the side sections 488 and 489 are attached by a second adhesive $482_2$. The first adhesive $482_1$ can have a relatively low elastic modulus while the second adhesive $482_2$ can have a relatively high elastic modulus such that the elastic modulus of the first adhesive $482_1$ is lower than the elastic modulus of the second adhesive $482_2$. The first adhesive $482_1$ can, for example, have the same properties as the adhesive 282 described above (e.g., by having an elastic modulus of around 100 MPa). The second adhesive $482_2$ can, for example, have an elastic modulus of about 2800 MPa. Other stiffeners, and other adhesives including adhesives having other elastic moduli, can be used and are within the scope of this disclosure. Since the second adhesive $482_2$ is generally confined to the lateral sides of the motor 434, the higher elastic modulus of the second adhesive $482_2$ resists expansion and contraction over a relatively limited length. As shown in FIG. 27, the second adhesive $482_2$, having a relatively high modulus, does not shear to the degree that a relatively lower elastic modulus adhesive would (e.g., as shown in FIG. 20). The second adhesive $482_2$ remains relatively rigid and can cause an increase in bending of the motor 434 toward the stiffener 480 when the motor 434 expands. The amount of stretch from the motor 434 is thereby enhanced, increasing the stroke (e.g., by amounts of 100% or more) over the stroke of similar gimbals without the stiffener 480.

Connectors 445 electrically and mechanically connect the motor 434 to the flexure 412. More specifically, the connectors 445 make electrical connections between traces of the flexure 412 and terminals of the motor 434. The connectors 445 can further attach the motor 434 to the spring arms 452. The slider 432 is mounted to a slider mounting of the tongue 433. The slider mounting can be a surface of the tongue 433 to which the slider 432 can be attached, such as with an adhesive such as epoxy. Rotation of the tongue 433 by actuation of the motor 434 rotates the slider mounting, and thereby the slider 432, about a tracking axis.

FIG. 28 is detailed isometric view of the stainless steel side of the distal end of a flexure 512 having a DSA structure 514 with a stiffener 580 mounted on the motor 534. FIG. 29 is a detailed side view of the distal end of the flexure 512 shown in FIG. 28. The flexure 512 is part of a DSA structure 514 that can be similar to that of DSA structure 214 described above or other DSA structure referenced herein except where noted. Features of flexure 512 that are the same or similar to those of other flexures are indicated by similar reference numbers. The flexure 512 includes a gimbal 524. The stiffener 580 has multiple thicknesses. Specifically, the stiffener 580 has reduced thickness portions 593 at the distal and proximal ends of the center section 587 and opposite side sections 588 and 589. For example, the distal and proximal ends of the stiffener 580 are thinner than the middle of the stiffener 580. In this way, the reduced thickness portions 593 extend along a perimeter of the stiffener 580. As shown, the sections of the stiffener 580 that bridge between the center section 587 and the side sections 588 and 589 have a smaller thickness with respect to the respective middles of the center section 587 and the side sections 588 and 589. The stiffener 580 also includes openings, such as opening 591. Multiple adhesives 582₁ and 582₂ are attached to the motor 534 and the stiffener 580. The adhesives 582₁ and 582₂ can be the same as or similar to the adhesives 482₁ and 482₂ described above. The adhesive 582₁ is underneath the center section 587 and can have a lower elastic modulus than the adhesives 582₂ that are underneath the side sections 588 and 589. Other embodiments (not shown) can have more than two sections each a having a different thickness (e.g., three sections having different thicknesses) and/or other configurations of different thicknesses.

Connectors 545 electrically and mechanically connect the motor 534 to the flexure 512. More specifically, the connectors 545 make electrical connections between traces of the flexure 512 and terminals of the motor 534. The connectors 545 can further attach the motor 534 to the spring arms 552. The slider 532 is mounted to a slider mounting of the tongue 533. The slider mounting can be a surface of the tongue 533 to which the slider 532 can be attached, such as with an adhesive such as epoxy. Rotation of the tongue 533 by actuation of the motor 534 rotates the slider mounting, and thereby the slider 532, about a tracking axis.

FIG. 30 is detailed isometric view of the stainless steel side of the distal end of a flexure 612 having a DSA structure 614 with an asymmetric stiffener 680 attached to the motor 634 with multiple adhesives 682₁ and 682₂. The flexure 612 is part of a DSA structure 614 that can be similar to that of DSA structure 214 described above or other DSA structure referenced herein except where noted. Features of flexure 612 that are the same or similar to those of other flexures are indicated by similar reference numbers. The flexure 612 includes a gimbal 624. As shown, each side section 688 and 689 of the stiffener 680 forms an "L" shape arm which includes a connecting section 693 that extends laterally from the center section 687 and a longitudinal section 694 that extends longitudinally (e.g., proximally or distally) from the end of the connecting section 693. As shown, the connecting sections 693 extend orthogonal with respect to the center section 687 and the longitudinal sections 694. Only a single connecting section 693 of the stiffener 680 extend between the center section 687 and each longitudinal section 694. As shown, a first one of the connecting sections 693 is proximal with respect to a second one of the connecting sections 693. The offset relationship of the connecting sections 693 can mirror the offset relationship of the struts 656. It is noted that while strut 656 is shown in FIG. 30, the configuration of the struts 656 can be the same as the struts 56 shown in FIG. 4B. For example, a first strut 656 on the right side of the flexure 612 can be proximal of the second strut 656 on the left side of the flexure 612 while a first one of the connecting sections 693 on the right side of the stiffener 680 is proximal of a second one of the connecting sections 693 on the left side of the stiffener 680. The stiffener 680 can be between the struts 656 (e.g., from a plan view perspective or along a plane that is coplanar with the flexure 612). The offset profile of the connecting sections 693 corresponding to the offset profile of the struts 656 allows the connecting sections 693 to respectively mechanically counteract the struts 656. The asymmetric configuration of the stiffener 680 can reduce twist of the motor 634 during expansion and contraction. Portions of center section 687 and longitudinal sections 694, and connecting sections 693, extend beyond the distal and proximal edges of the motor 634 in the illustrated embodiment. In various other embodiments (not shown) the stiffener 680 entirely overlays the top surface of the motor 634 and extends beyond the distal and/or proximal edges of the motor 634. In still other embodiments (not shown) the stiffener 680 has still other shapes and sizes with respect to the shape and size of the motor 634.

Connectors 645 electrically and mechanically connect the motor 634 to the flexure 612. More specifically, the connectors 645 make electrical connections between traces of the flexure 612 and terminals of the motor 634. The connectors 645 can further attach the motor 634 to the spring arms 652. The slider 632 is mounted to a slider mounting of the tongue 633. The slider mounting can be a surface of the tongue 633 to which the slider 632 can be attached, such as with an adhesive such as epoxy. Rotation of the tongue 633 by actuation of the motor 634 rotates the slider mounting, and thereby the slider 632, about a tracking axis.

FIG. 31 is an illustration of a flexure 712 having a DSA structure 714 with an asymmetric stiffener 780 in accordance with another embodiment of this disclosure. The flexure 712 is part of a DSA structure 714 that can be similar to that of DSA structure 214 described above or other DSA structure referenced herein except where noted. Features of flexure 712 that are the same or similar to those of other flexures are indicated by similar reference numbers. The flexure 712 includes a gimbal 724. A stiffener 780 is attached to a motor 734 by adhesive 782 disposed between the stiffener 780 and the motor 734. As shown, the stiffener 780 has a center section 787 and oppositely extending first arm 788 and second arm 789. The first arm 788 on one side of the stiffener 780 has a smaller width (i.e., in a direction of the longitudinal axis of the flexure 712) than the width of the second arm 789 on the other side of the stiffener 780. The first arm 788 can have a width of about one-half the width of the second arm 789. It will be understood that the relative widths of the first and second arms 788 and 789 can be reversed such that second arm 789 can have a smaller width than the first arm 788. Similar embodiments can have other relative dimensions. Alternatively, the first and second arms 788 and 789 can have the same widths. It is also noted that the first arm 788 is proximal with respect to the second arm 789. The asymmetry of the stiffener 780 enables the DSA structure 714 to have different bending characteristics on its opposite transverse sides (i.e., with respect to a longitudinal axis). The offset relationship of the first and second arms 788 and 789 can mirror the offset relationship of the struts 756. It is noted that while strut 756 is shown in FIGS. 31-32C, the configuration of the struts 756 can be the same as the struts 56 shown in FIG. 4B. For example, a first strut 756 on the right side of the flexure 712 can be proximal of the second strut 756 on the left side of the flexure 712 while a first arm 788 on the right side of the stiffener 780 is proximal of a second arm 789 on the left side of the stiffener 780. The stiffener 780 can be between the struts 756 (e.g., from a plan view perspective or along a plane that is coplanar with the flexure 712). The offset profile of the first and second arms 788 and 789 corresponding to the offset profile of the struts 756 allows the first and second arms 788 and 789 to respectively mechanically counteract the struts 756.

FIGS. 32A and 32B are illustrations of the flexure 712 shown in FIG. 31 when the motor 734 is actuated into contracted and expanded states, respectively. As shown, because of the relatively lower stiffness provided by the first arm 788 due to the second arm 789 being wider, the side of the flexure 712 with the first arm 788 bends more than the side of the flexure 712 with the second arm 789. The amount of side-to-side differential bending is related to the difference in stiffness between the first and second arms 788 and 789. The rotational center of the DSA structure 714 can be changed and tuned by the stiffener 780 by adjusting various variables, including the relative widths or thicknesses, and therefore the relative stiffnesses, of the first and second arms 788 and 789.

Connectors 745 electrically and mechanically connect the motor 734 to the flexure 712. More specifically, the connectors 745 make electrical connections between traces of the flexure 712 and terminals of the motor 734. The connectors 745 can further attach the motor 734 to the spring arms 752. The slider 732 is mounted to a slider mounting of the tongue 733. The slider mounting can be a surface of the tongue 733 to which the slider 732 can be attached, such as with an adhesive such as epoxy. Rotation of the tongue 733 by actuation of the motor 734 rotates the slider mounting, and thereby the slider 732, about a tracking axis.

Flexures with DSA structures having stiffeners can provide important advantages. The stiffener changes the deformed shape of the PZT motor when the motor expands and contracts during operation. This shape change can be tailored to increase the stroke amount of the actuator assembly, therefore achieving more stroke for the same input voltage to the motor. Alternatively, the same stroke can be maintained but with a lower voltage as compared to embodiments without a stiffener. Another advantage of the stiffener is that twist or asymmetric bending of the motor can be minimized by design of the stiffener. Increasing stroke performance is an advantage in particular for co-located dual stage actuators since high stroke is difficult to achieve due to the inherent low mechanical advantage when the motor is located close to the slider that the motor is moving. Due to low stroke, gimbal actuator designs may require the use of more expensive multi-layer PZT motors as opposed to simple single layer and lower cost motors. By increasing the stroke performance, stiffeners can reduce the number of PZT motor layers needed for a design and even allow for the use of single layer PZT motors to achieve stroke targets.

In some embodiments, the center of rotation of the motor, tongue, and/or slider can be adjusted by tailoring how the motor bends during actuation with a stiffener. For example, the center of rotation can be located to extend through the dimple load point (e.g., where the dimple contacts the stiffener). If the actuator's center of rotation is not located directly at the dimple load point, then resonance performance may be reduced. The tailored stiffener designs, discussed above, can be used to move the center of rotation by changing how the motor deforms.

The stiffener also provides a protective covering over the motor, which may otherwise be fragile. For example, the stiffener provides a point upon which the dimple can press, wherein equivalent pressure from the dimple directly on the motor may damage the motor. The stiffener can protect the motor surface from mechanical wear due to the dimple and shock loads at the dimple point. Shock loads will be distributed by the stiffener. The stiffener can also provide electrical insulation of the motor. For example, the loadbeam can serve as an electrical ground in some embodiments, and in such case the motor can be insulated from electrical connection through the dimple of the loadbeam by the stiffener. If the stiffener is formed from an electrically conductive metal, then the adhesive layer between the stiffener and the motor can serve as electrical insulation.

While the use of a stiffener has been described in association with various gimbaled flexure embodiments, it is noted that a stiffener can be used with any flexure referenced herein. For example, in the embodiment of FIG. 9-16C$_2$, a stiffener can be positioned on the motor 134 while the slider 132 can be attached to the stiffener (e.g., with an epoxy adhesive) and/or the slider 132 can be attached to the motor 134 at a location not covered by the stiffener.

FIG. 33A is an isometric view of the trace side of flexure 812 having a two-motor co-located DSA structure 814 with stiffeners 880. FIG. 33B is an isometric view of the stainless steel side of the flexure 812 (i.e. the opposite side with respect to FIG. 33A). The flexure 812, DSA structure 814, or other component can be similar to that of any flexure, DSA structure, or other component described above or elsewhere referenced herein except where noted. Features that are the same or similar to those of other embodiments are indicated by similar reference numbers. Flexure 812 can be formed by overlaying, in order, a stainless steel layer 840 (or other spring metal), polyimide or other dielectric layer 842, copper or other conductive material layer 844, and coverlay 846. The dielectric layer 842 generally electrically isolates structures formed in the conductive material layer 844 from adjacent portions of the stainless steel layer 840. Coverlay 846 generally covers, electrically insulates, and protects the structures formed in the conductive material layer 844.

The gimbal 824 includes a base portion 850, spring arms 852, struts 856, and tongue 833. The base portion 850, spring arms 852, struts 856, and tongue 833 can each be formed from the stainless steel layer 840. The spring arms 852 extend from the base portion 850. The tongue 833 is supported between the spring arms 852 by struts 856. Outer struts 856 extend from the spring arms 852 inwardly to the proximal motor mountings 858. The slider 832 can be attached to the tongue 833 at the slider mounting 854 (e.g., with adhesive) of the tongue 833. The proximal motor mounting 858 serve as proximal mountings for the motors 834. Inner struts 856 extend from the proximal motor mounting 858 inwardly to connect with the tongue 833. In this way, the struts 856 and the proximal motor mounting 858 form linkages between the spring arms 852 and the tongue 833. In some embodiments, the struts 856 are the only part of the stainless steel layer 840 that mechanically supports the tongue 833 between the spring arms 852. Specifically, the struts 856 can be the only structural linkage between the spring arms 852 and the tongue 833, which may or may not include the proximal motor mounting 858 as an intermediary between inner struts 856 (attached to the tongue 833) and outer struts 856 (attached to the spring arms 852). The flexible circuit 862, containing traces, may only minimally or negligibly mechanically support the tongue 833 as compared to the stainless steel layer 840. Also, the struts 856, in connecting with the tongue 833, can be the only part of the stainless steel layer 840 that connects between the spring arms 852 distal of the base portion 850. As shown, the struts 856 can each be the narrowest part of the stainless steel layer 840 in an X-Y plane (as viewed from an overhead perspective) while the thickness of the stainless steel layer 840 can be consistent along the flexure 812. In the illustrated embodiments, the linkage portions formed by the struts 856 and proximal motor mountings 858 extend generally transversely from a proximal portion of the tongue 833.

A pair of distal motor mountings 859 extend generally transversely or laterally from the tongue 833 at locations spaced distally from the proximal motor mounting 858. The opposite ends of each of motors 834 are attached (e.g., by structural adhesive such as epoxy) to the proximal motor mounting 858 and the distal motor mounting 859. While the proximal motor mountings 858 are part of linkages between struts 856 connecting the spring arms 852 to the tongue 833, and the distal motor mountings 859 extend as tabs from the tongue 833, this arrangement can be reversed. For example, the distal motor mountings can be part of linkages between struts connecting the spring arms 852 to the tongue 833 while proximal motor mountings extend as tabs from the tongue 833. Other configurations are also possible.

The motors 834 are arranged to have a parallel relationship. For example, each of the motors 834 has a longitudinal axis and the longitudinal axes of the motors 834 extend parallel with each other, and parallel with the longitudinal axes of the slider 832 and the flexure 812. As shown, the motors 834 are positioned on the flexure 812 on opposite lateral sides (e.g., left and right) of the slider 832.

A plurality of traces 860 are formed in the conductive material layer 844 and extend between the base portion 850 and tongue 833 along the flexible circuit 862 formed in the dielectric layer 842. A number of the traces 860 terminate at locations on a distal region on the tongue 833 and are configured to be electrically attached to terminals of the read/write head (not shown) on the slider 832 to support read/write functions. Other traces 860 terminate at contacts (not shown) on the tongue 833, below or adjacent the motors 834, and are configured to be electrically attached to terminals of the motors 834 to electrically activate the motors 834. Terminals can be on the tops and/or bottoms of the motors 834 and can be electrically connected to the traces via solder or conductive adhesive, for example. Additional or other electrical connections to the motors 834 can be made by connecting the electrical terminals of the motors 834 to the stainless steel layer 840, such as a grounding connection. In some other embodiment, the electrical connections to the motors 834 can be made by other approaches and structures (e.g., including approaches described herein in connection with other embodiments).

Stiffeners 880 can be structurally similar to any of those described above in connection with other embodiments (e.g., stiffeners 280) and can be attached to the motors 834 using adhesive 882 or other approaches, as described above. As shown, the stiffeners 880 are mounted to free surfaces on the sides of the motors 834 (e.g., top sides) opposite the stainless steel layer 840. The stiffeners 880 can additionally or alternatively be mounted to respective surfaces of the motors 834 that face the stainless steel layer 840. In such embodiments, the surface of the first or bottom side of each motor 834 is attached to the flexure 812 (e.g., at both of the proximal motor mounting 858 and the distal motor mounting 859) and the stiffeners 880 are also attached to the surface of the first or bottom side of each motor 834.

The operation of gimbal 824 and DSA structure 814 is further described with reference to FIGS. 34A and 34B. FIG. 34A shows a plan view of the DSA structure 814 of FIGS. 33A-B in a neutral or unactuated state with no actuation drive signals applied to the motors 834. FIG. 34B shows a plan view of the DSA structure 814 of FIGS. 33A-B in a first actuated state. The motors 834 typically are orientated to have opposite arrangements such that a first polarity actuation drive signal is applied to the anode terminal of one motor 834 and the cathode terminal of the other motor 834 such that one motor 834 expands while the other motor 834 contracts. Such motor 834 expansion and contraction on opposite lateral sides of the flexure 812 rotates the slider mounting 854 on the tongue 833 (and the slider 832 thereon) about a tracking axis. Similarly, the tongue 833 can be rotated in the opposite direction by the application of a second polarity actuation drive signal to the motors 834. For example, FIG. 34B shows the right motor 834 expanding, including expansion along a lengthwise direction, while the left motor 834 contracts, including contraction along the lengthwise direction. Such movement pivots the tongue 833 off of the spring arms 852 via the expanding and contracting motors 834 attached to the proximal motor mounting 858 and the distal motor mounting 859. The rotational tracking motion of the tongue 833 is facilitated by the struts 856 bending. While the struts of previous embodiments are offset, the inner and outer struts 856 are laterally aligned and located at the same position along a longitudinal axis of the flexure 812, respectively.

Out-of-plane bowing, twisting, and/or asymmetric bending can be present upon activation of the motors 834 as discussed and illustrated herein. However, the stiffeners 880 can limit or reverse the bending of the motor 834 and/or gimbal 824 during activation as discussed herein. For example, the stiffeners 880 can balance or counteract the stiffness of the flexure 812 about the motor 834 to control or limit vertical deflection. The stiffeners 880 can substantially reduce bending of the motors 834 during the actuation strokes. Stroke efficiency of the DSA structure 814 can be increased substantially (e.g., by 15-75%) using stiffeners 880. Adhesive 882 can deform (e.g., in shear) between the stiffeners 880 and motors 834 as discussed above. Multiple types of adhesives may be applied under stiffeners 880, as discussed in the previous embodiments. The multiple types of adhesives may have different properties, such as different elastic moduli under different areas of each stiffener 880.

The stiffeners 880 shown in FIGS. 33A and 33B have a shape and expanse that are the same as the surface of the motors 834 on which the stiffeners 880 are mounted. For example, the stiffeners 880 entirely cover the top sides of the motors 834. In other embodiments, stiffeners can have different sizes, shapes, and thicknesses (e.g., as described above), and the sizes, shapes, and thicknesses of the stiffeners can be tailored to provide specific and desired mechanical effects on the bending that might otherwise be produced by the motors 834.

FIG. 35A is an isometric view of the trace side of flexure 912 having a two-motor co-located DSA structure 914. FIG. 35B is an isometric view of the stainless steel side of the flexure 912 (i.e. the opposite side with respect to FIG. 35A) with stiffeners 980 mounted on the motors 934. The flexure 912, tongue 933, DSA structure 914, or other component can be similar to that of any flexure, DSA structure, or other component described above or elsewhere referenced herein except where noted. Features that are the same or similar to those of other embodiments are indicated by similar reference numbers.

The flexure 912 includes a gimbal 924. The motors 934 are mounted on the gimbal 924. As shown, motors 934 are mounted to the proximal motor mounting 958 and the distal motor mounting 959. While the motors 834 and slider 832 are mounted on the same side of the flexure 812 in the embodiment of FIGS. 33A-B, the motors 934 and slider 932 are mounted on opposite sides of the flexure 912 in the embodiment of FIGS. 35A-B. Besides the mounting of the motors 934 and slider 932 on opposite sides of the flexure 912, the components of the embodiment of FIGS. 35A-B may have the same configuration as those of the embodiment of FIGS. 33A-B.

FIG. 36A is an isometric view of the trace side of flexure 1012 having a two-motor co-located DSA structure 1014. FIG. 36B is an isometric view of the stainless steel side of the flexure 1012 (i.e. the opposite side with respect to FIG. 36A) with stiffeners 1081 mounted on the motors 1034. FIG. 37 is an isometric view of the trace side of the flexure 1012 but with the motors 1034 removed to show additional detail. The flexure 1012, DSA structure 1014, or other component can be similar to that of any flexure, DSA structure, or other component described above or elsewhere referenced herein except where noted. Features that are the same or similar to those of other embodiments are indicated by similar reference numbers.

Flexure 1012 can be formed by overlaying, in order, a stainless steel layer 1040 (or other spring metal), polyimide or other dielectric layer 1042, copper or other conductive material layer 1044, and coverlay 1046. The flexure 1012 includes a gimbal 1024. Motors 1034 are mounted on the gimbal 1024. The gimbal 1024 includes spring arms 1052, struts 1056, and tongue 1033. The spring arms 1052, struts 1056, and tongue 1033 can each be formed from the stainless steel layer 1040. The slider mounting 1054, which is part of the tongue 1033, is supported between the spring arms 1052 by struts 1056. Outer struts 1056 extend from the spring arms 1052 inwardly to the proximal motor mounting 1058. The slider 1032 can be attached to the tongue 1033 at the slider mounting 1054 (e.g., with adhesive). The proximal motor mountings 1058 serve as proximal mountings for the motors 1034. Inner struts 1056 extend from the proximal motor mountings 1058 inwardly to connect with the tongue 1033. In this way, the struts 1056 and the proximal motor mountings 1058 form linkages between the spring arms 1052 and the tongue 1033. In some embodiments, the struts 1056 are the only part of the stainless steel layer 1040 that connects or otherwise supports the tongue 1033 between the spring arms 1052. Specifically, the struts 1056 can be the only structural linkage between the spring arms 1052 and the tongue 1033. Also, the struts 1056, in connecting with the tongue 1033, can be the only part of the stainless steel layer 1040 that connects between the spring arms 1052 distal of the base portion 1050. As shown, the struts 1056 can each be the narrowest part of the stainless steel layer 1040 in an X-Y plane (as viewed from an overhead perspective) while the thickness of the stainless steel layer 1040 can be consistent along the flexure 1012. In the illustrated embodiments, the linkage portions formed by the struts 1056 and proximal motor mounting 1058 extend generally transversely from a proximal portion of the tongue 1033.

A pair of distal motor mountings 1059 extend generally transversely or laterally from the tongue 1033 at locations spaced distally from the proximal motor mounting 1058. The distal motor mountings 1059 can be tabs that extend from the tongue 1033. The opposite ends of each of motors 1034 are attached (e.g., by structural adhesive such as epoxy) to the proximal motor mounting 1058 and the distal motor mounting 1059 on the same side of the flexure 1012 as the slider 1032. Electrical activation of the motors 1034 can move the slider 1032 along a tracking axis as discussed herein (e.g., in the manner shown in FIGS. 34A-B). While the proximal motor mountings 1058 are part of linkages between struts 1056 connecting the spring arms 1052 to the tongue 1033, and the distal motor mountings 1059 extend as tabs from the tongue 1033, this arrangement can be reversed. For example, the distal motor mountings can be part of linkages between struts connecting the spring arms 1052 to the tongue 1033 while proximal motor mountings extend as tabs from the tongue 1033.

In various embodiments shown above, stiffeners are entirely located on the motors, usually only on one surface of each motor, and are not connected with other elements (e.g., other than adhesive bonding the stiffeners to the motors). However, as shown in FIGS. 36B and 37, stiffeners 1081 can be a part of, or otherwise attach to, other elements. As shown, the stiffeners 1081 are tabs that extend from the flexure 1012. More specifically, the stiffeners 1081 are formed from the stainless steel layer 1040. The stiffeners 1081 branch from the tongue 1033. Each stiffener 1081 is attached to the tongue 1033 by a connector 1083. Each connector 1083 is a part of the stainless steel layer 1040. As shown, the connectors 1083 can be narrower than the tongue 1033 and the stiffeners 1081.

The narrowing of the connectors 1083 may allow flexing of the connectors 1083 between the stiffeners 1081 and the tongue 1033. The connectors 1083 branch from the tongue 1033 at respective locations between the proximal motor mounting 1058 and the distal motor mounting 1059. Likewise, the stiffeners 1081 are located between the proximal motor mounting 1058 and the distal motor mounting 1059. The stiffeners 1081 are attached to the motors 1034 by adhesive 1082 between the stiffeners 1081 and the motors 1034. For example, a layer of adhesive 1082 can attach to the surfaces of the sections of the stainless steel layer 1040 that form the stiffeners 1081 and can further attach to surfaces of the motors 1034 that face the flexure 1012. The stiffeners 1081 have a generally oval shape. Stiffeners 1081 can have other shapes, sizes, and thicknesses tailored to reduce or otherwise control the bending of the motors 1034. The stiffeners 1081 can substantially reduce bending of the motors 1034 and bending of the flexure 1012 during the actuation strokes as discussed herein.

The motors 1034 are located on the same side of the flexure 1012 (e.g., the trace side, opposite the stainless steel layer 1040 side) as the slider 1032. The stiffeners 1081 are located on the surface of each motor 1034 that faces the flexure 1012. The motors 1034 do not have stiffeners on the side of the motors 1034 that face away from the flexure 1012 (e.g., the stainless steel layer 1040 specifically) in the embodiment shown in FIGS. 36A-37, however stiffeners, as disclosed herein, could be provided on these sides of the motors 1034 as alternatives to, or in addition to, the stiffeners 1081 shown.

FIG. 38A is an isometric view of the trace side of flexure 1112 having a two-motor co-located DSA structure 1114. FIG. 38B is an isometric view of the stainless steel side of the flexure 1112 (i.e. the opposite side with respect to FIG. 38A) with stiffeners 1181 mounted on the motors 1134. The flexure 1112, DSA structure 1114, or other component can be similar to that of the flexures, the DSA structure, or other component described above or elsewhere referenced herein except where noted. Features that are the same or similar to those of other embodiments are indicated by similar reference numbers.

The flexure 1112 includes a stainless steel layer 1140. The flexure 1112 includes a gimbal 1124. Motors 1134 are mounted on the gimbal 1124. As shown, the motors 1134 are mounted to the proximal motor mounting 1158 and the distal motor mounting 1159 on the side of the tongue 1133 opposite the slider 1132. While the motors 1034 and slider 1032 are mounted on the same side of the flexure 1012 in the embodiment of FIGS. 36A-37, the motors 1134 and slider 1132 are mounted on opposite sides of the flexure 1112 in the embodiment of FIGS. 38A-B. Besides the mounting of the motors 1134 and slider 1132 on opposite sides of the flexure 1112, the components of the embodiment of FIGS. 38A-B may have the same configuration as the embodiment of FIGS. 36A-37.

Any of the embodiments presented herein can be modified in view of the features presented in any of commonly owned U.S. patent application Ser. No. 14/026,427, entitled CO-LOCATED GIMBAL-BASED DUAL STAGE ACTUATION DISK DRIVE SUSPENSIONS, filed Sep. 13, 2013, U.S. patent application Ser. No. 14/044,238, entitled CO-LOCATED GIMBAL-BASED DUAL STAGE ACTUATION DISK DRIVE SUSPENSIONS WITH MOTOR STIFFENERS, filed Oct. 2, 2013, and U.S. patent application Ser. No. 13/972,137, entitled CO-LOCATED GIMBAL-BASED DUAL STAGE ACTUATION DISK DRIVE SUSPENSIONS WITH OFFSET MOTORS, filed Aug. 21, 2013, each of which is incorporated herein by reference in its entirety. Likewise, any of the embodiments presented in such applications can be modified with any of the features of the present disclosure.

Although the present invention has been described with reference to preferred embodiments, those skilled in the art will recognize that changes can be made in form and detail without departing from the spirit and scope of the invention. For example, although described in connection with certain co-located DSA structures, stiffeners and associated features described herein can be used in connection with motors on other DSA structures, including other co-located DSA structures. Furthermore, while various example embodiments have been provided to demonstrate various features, these are not the exclusive embodiments contemplated. As such, any embodiment can be modified with a feature of any other embodiment.

The following is claimed:

1. A dual stage actuation flexure comprising:
a flexure comprising a gimbal, the gimbal comprising a pair of spring arms, a tongue between the spring arms, and a pair of linkages respectively connecting the pair of spring arms to the tongue;
a pair of motors mounted on the gimbal;
a pair of stiffeners respectively mounted on the motors, each stiffener bonded to the motor on which the stiffener is mounted by a respective layer of adhesive that is between the motor and the stiffener; and
a slider mounting, wherein electrical activation of the motors bends the pair of linkages to move the slider mounting about a tracking axis while the stiffeners limit the degree of bending of the motors during the electrical activation.

2. The dual stage actuation flexure of claim 1, wherein the tongue comprises a pair of first motor mountings, the pair of motors respectively attached to the first motor mountings.

3. The dual stage actuation flexure of claim 2, wherein the pair of linkages comprises a pair of second motor mountings, the pair of motors respectively attached to the pair of second motor mountings.

4. The dual stage actuation flexure of claim 1, wherein each linkage of the pair of linkages comprises a strut, and electrical activation of the motor bends the struts to move the slider mounting about the tracking axis.

5. The dual stage actuation flexure of claim 1, wherein each linkage of the pair of linkages comprises an outer strut extending inward from a respective one of the pair of arms and an inner strut extending outward from the tongue, each of the inner and outer struts connecting with a respective one of a pair of motor mountings located respectively between the spring arms and the tongue, the motors respectively attached to the pair of motor mountings.

6. The dual stage actuation flexure of claim 1, wherein the pair of stiffeners are respectively stiffer than the portions of the gimbal on which the motors are respectively mounted.

7. The dual stage actuation flexure of claim 1, wherein each stiffener limits the degree of bending of the motor on which the stiffener is mounted during electrical activation of the motor.

8. The dual stage actuation flexure of claim 1, wherein each motor bends in a first direction when the motor is activated to expand and the motor bends in a second direction, opposite the first direction, when the motor is activated to contract.

9. The dual stage actuation flexure of claim 1, wherein each stiffener limits the degree of twisting of a respective one of the pair of motors during activation of the motors.

10. The dual stage actuation flexure of claim 1, wherein each stiffener comprises a layer of metal.

11. The dual stage actuation flexure of claim 1, wherein each stiffener comprises a layer of polymer.

12. The dual stage actuation flexure of claim 1, wherein each stiffener is only in contact with the adhesive that bonds the motor to the stiffener.

13. The dual stage actuation flexure of claim 1, wherein the layer of adhesive has an elastic modulus of about 100 MPa.

14. The dual stage actuation flexure of claim 1, wherein the layer of adhesive has an elastic modulus that is about 2000 times lower than the elastic modulus of the stiffeners.

15. The dual stage actuation flexure of claim 1, wherein each stiffener is bonded to the motor on which the stiffener is mounted by a plurality of adhesive layers including the respective layer of adhesive, each adhesive layer of the plurality of adhesive layers formed from a different type of adhesive and located underneath a different area of the stiffener.

16. The dual stage actuation flexure of claim 15, wherein each adhesive layer of the plurality of adhesive layers has a different elastic modulus.

17. The dual stage actuation flexure of claim 1, further comprising an additional pair of stiffeners respectively mounted on the motors, wherein the pair of stiffeners is respectively mounted on the top sides of the motors and the additional pair of stiffeners is respectively mounted on the bottom sides of the motors.

18. The dual stage actuation flexure of claim 1, wherein each stiffener comprises a tab extending from the tongue.

19. The dual stage actuation flexure of claim 1, wherein the slider mounting and the pair of motors are located on the same side of the flexure.

20. The dual stage actuation flexure of claim 1, wherein the slider mounting is located on a first side of the flexure while the pair of motors are located on a second side of the flexure opposite the first side.

21. The dual stage actuation flexure of claim 1, wherein at least one of the stiffeners is asymmetric with respect to one or both of a longitudinal axis of the stiffener and a transverse axis of the stiffener.

22. The dual stage actuation flexure of claim 1, wherein each stiffener entirely covers a side of the motor on which the stiffener is mounted.

23. The dual stage actuation flexure of claim 1, wherein each stiffener does not entirely cover a side of the motor on which the stiffener is mounted.

24. A dual stage actuation flexure comprising:
a flexure comprising a pair of spring arms, a pair of struts, and a tongue between the spring arms;
a pair of motors mounted on the flexure, each motor comprising a top side and a bottom side opposite the top side;
a pair of stiffeners respectively mounted on the top sides of the motors, wherein the bottom sides of the motors face the flexure;
adhesive located between the stiffeners and the motors and bonded to the stiffeners and the motors; and
a slider mounting, wherein electrical activation of the motors bends the pair of struts to move the slider mounting while the stiffeners limit the degree of bending of the motors during the electrical activation.

25. The dual stage actuation flexure of claim 24, wherein each stiffener is only in contact with the adhesive.

26. The dual stage actuation flexure of claim 24, wherein the motors are at least partially mounted on the spring arms.

27. A dual stage actuation flexure comprising:
a flexure;
a pair of motors mounted on the flexure;
a pair of stiffeners respectively mounted on the motors;

adhesive located between the stiffeners and the motors and bonded to the stiffeners and the motors, each stiffener mounted over a single side of the motor on which the stiffener is mounted, each stiffener only in contact with the adhesive; and a slider mounting, wherein electrical activation of the motors moves the slider mounting while the stiffeners limit the degree of bending of the motors during the electrical activation.

28. A dual stage actuation flexure comprising:

a flexure comprising a gimbal, the gimbal comprising a pair of spring arms, a tongue between the spring arms, and a pair of linkages respectively connecting the pair of spring arms to the tongue;

a pair of motors mounted on the gimbal;

a pair of stiffeners respectively mounted on the motors, each stiffener stiffer than the portion of the gimbal on which the respective motor and stiffener are mounted; and a slider mounting, wherein electrical activation of the motors bends the pair of linkages to move the slider mounting about a tracking axis while the stiffeners limit the degree of bending of the motors during the electrical activation.

* * * * *